United States Patent
Willems et al.

(10) Patent No.: US 10,428,776 B2
(45) Date of Patent: Oct. 1, 2019

(54) FLUID FILTER CARTRIDGE, FLUID FILTER ARRANGEMENT, AND METHOD FOR SERVICING A FLUID FILTER ARRANGEMENT

(71) Applicant: Donaldson Company, Inc., Minneapolis, MN (US)

(72) Inventors: Gert Louis Willems, Wilsele (BE); Joost Peeten, Leuven (BE)

(73) Assignee: Donaldson Company, Inc., Minneapolis, MN (US)

( * ) Notice: Subject to any disclaimer, the term of this patent is extended or adjusted under 35 U.S.C. 154(b) by 204 days.

(21) Appl. No.: 15/313,057

(22) PCT Filed: Jun. 5, 2015

(86) PCT No.: PCT/US2015/034522
§ 371 (c)(1),
(2) Date: Nov. 21, 2016

(87) PCT Pub. No.: WO2015/188124
PCT Pub. Date: Dec. 10, 2015

(65) Prior Publication Data
US 2017/0204821 A1 Jul. 20, 2017

Related U.S. Application Data

(60) Provisional application No. 62/149,791, filed on Apr. 20, 2015.

(30) Foreign Application Priority Data

Jun. 5, 2014 (DE) .................. 10 2014 210 723

(51) Int. Cl.
*F02M 37/24* (2019.01)
*B01D 36/00* (2006.01)
(Continued)

(52) U.S. Cl.
CPC ............ *F02M 37/24* (2019.01); *B01D 29/33* (2013.01); *B01D 29/54* (2013.01); *B01D 29/58* (2013.01);
(Continued)

(58) Field of Classification Search
CPC ...... F02M 37/24; F02M 37/26; B01D 29/005; B01D 29/0052; B01D 29/0054;
(Continued)

(56) References Cited

U.S. PATENT DOCUMENTS 3,312,350 A * 4/1967 Kasten ............... B01D 17/0214
210/307
6,692,639 B1 * 2/2004 Spearman ............ B01D 29/117
210/323.2
(Continued)

FOREIGN PATENT DOCUMENTS

DE 102016010778 A1 * 3/2018 ............ B01D 17/04
EP 0442365 A2 8/1991
(Continued)

OTHER PUBLICATIONS

International Search Report and Written Opinion for PCT/US2015/034522, dated Feb. 10, 2016.

*Primary Examiner* — David C Mellon
(74) *Attorney, Agent, or Firm* — Merchant & Gould P.C.

(57) ABSTRACT

A fluid filter cartridge has a first filter element and a second filter element. The first and second filter elements are arranged consecutively along a longitudinal extension of the fluid filter cartridge. The first filter element has two opposite end faces, one of the end faces being covered by a connection end cap and the other end face being covered by a first end cap. The second filter element has an end face being covered by the connection end cap and another end face covered by a second end cap. At least one port is at the (Continued)

Figure 1:
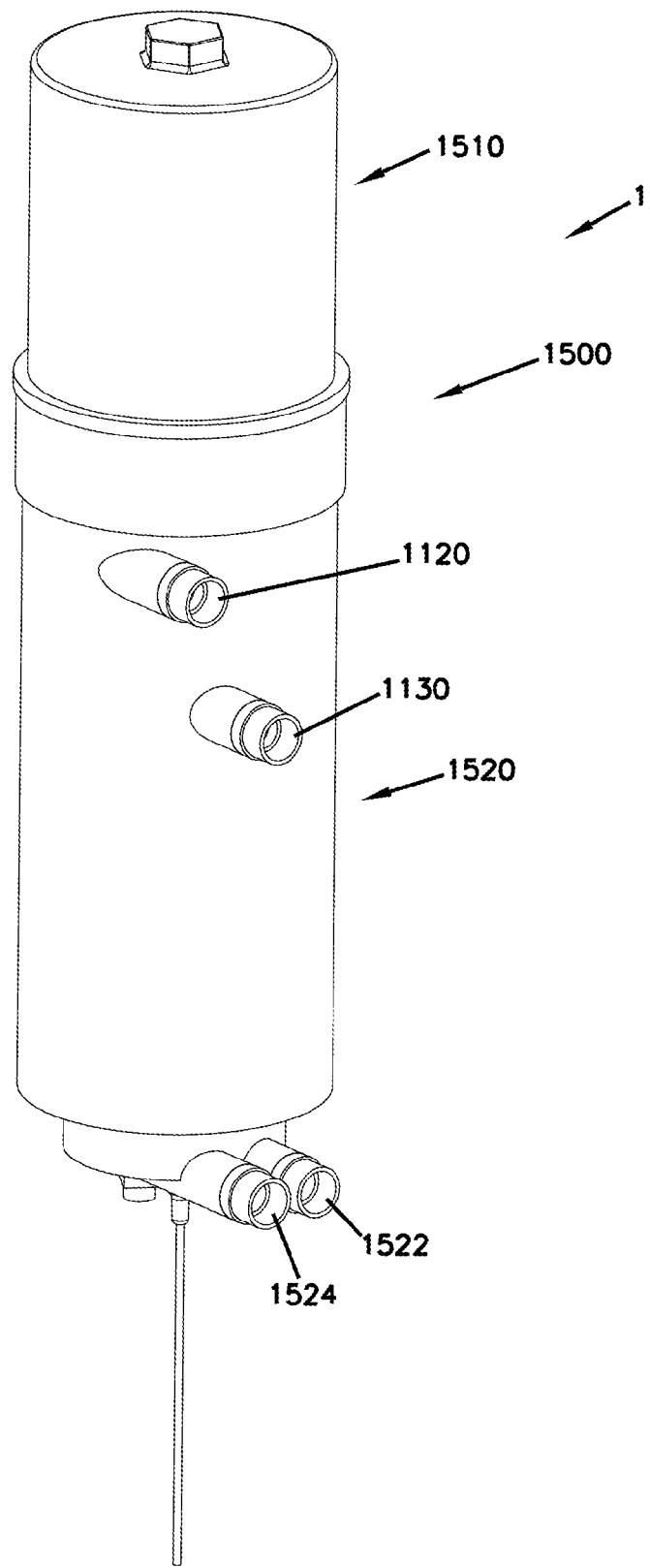

connection end cap in fluid communication with at least one of the first filter element and second filter element. A central axis of the connection end cap orthogonal to a main extension plane of the connection end cap is offset in relation to a central axis of the first end cap orthogonal to a main extension plane of the first end cap and/or a central axis of the second end cap orthogonal to a main extension plane of the second end cap.

15 Claims, 61 Drawing Sheets

(51) Int. Cl.
| | | |
|---|---|---|
| | *B01D 29/54* | (2006.01) |
| | *B01D 29/58* | (2006.01) |
| | *B01D 35/30* | (2006.01) |
| | *B01D 29/33* | (2006.01) |
| | *B01D 35/147* | (2006.01) |

(52) U.S. Cl.
CPC ......... *B01D 35/1475* (2013.01); *B01D 35/30* (2013.01); *B01D 36/003* (2013.01); *B01D 36/006* (2013.01); *B01D 2201/12* (2013.01); *B01D 2201/291* (2013.01); *B01D 2201/316* (2013.01); *B01D 2201/4046* (2013.01); *B01D 2201/4053* (2013.01); *B01D 2201/4084* (2013.01)

(58) Field of Classification Search
CPC .............. B01D 29/0056; B01D 29/0059; B01D 27/14; B01D 27/142; B01D 27/144; B01D 27/146; B01D 27/148; B01D 35/1475; B01D 29/33; B01D 35/30; B01D 36/003; B01D 29/58; B01D 29/54; B01D 36/006; B01D 2201/4046; B01D 2201/4084; B01D 2201/316; B01D 2201/4053; B01D 2201/12; B01D 2201/291; B01D 29/114; B01D 29/15; B01D 29/50; B01D 29/52; B01D 29/56; B01D 35/005; B01D 35/16; B01D 36/005; B01D 36/008

See application file for complete search history.

(56) References Cited

U.S. PATENT DOCUMENTS

| | | | |
|---|---|---|---|
| 7,556,155 | B2 | 7/2009 | Harder et al. |
| 2008/0135469 | A1* | 6/2008 | Fremont ................ B01D 29/21 210/234 |
| 2008/0179263 | A1 | 7/2008 | Wieczorek et al. |
| 2010/0314303 | A1* | 12/2010 | Reyinger ............... B01D 29/21 210/130 |
| 2014/0034580 | A1 | 2/2014 | Chen |

FOREIGN PATENT DOCUMENTS

| | | |
|---|---|---|
| EP | 1556153 B1 | 9/2006 |
| EP | 1932574 B1 | 2/2010 |
| EP | 2263769 A1 | 12/2010 |
| EP | 2283906 A1 | 2/2011 |
| EP | 2490786 B1 | 3/2015 |
| EP | 2878352 A1 | 6/2015 |
| WO | 2010/117799 A2 | 10/2010 |

* cited by examiner

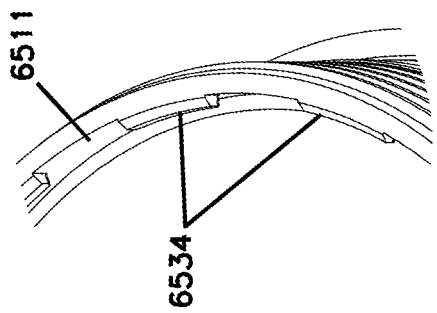
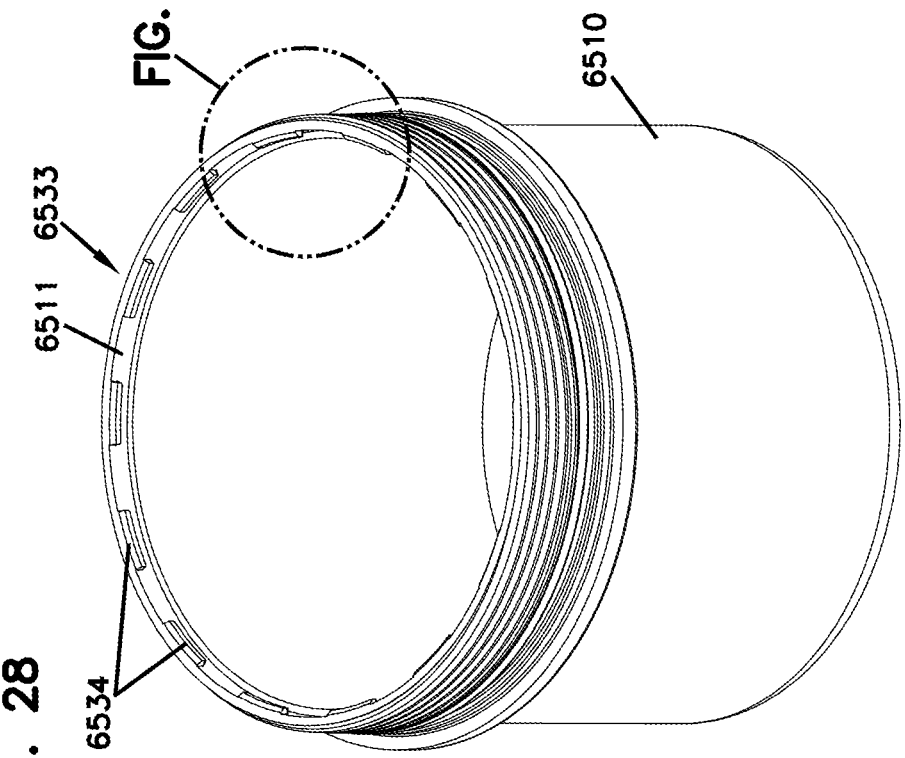

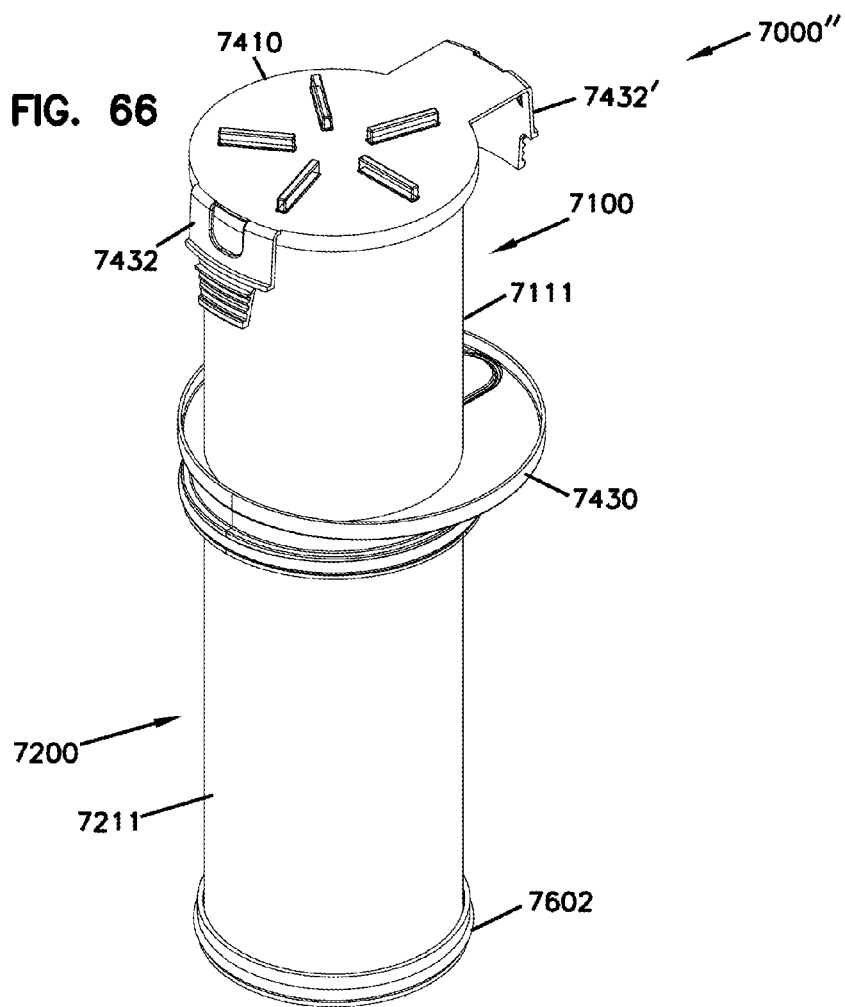
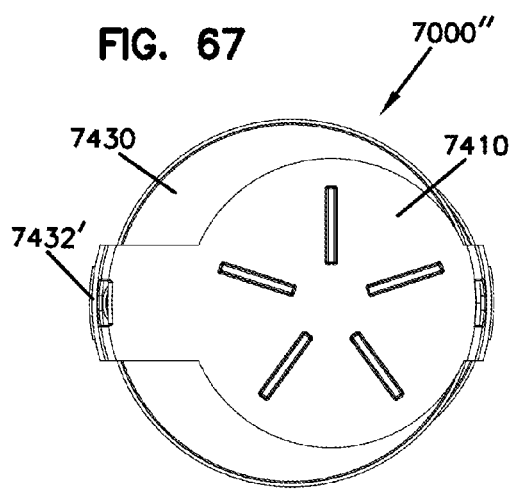
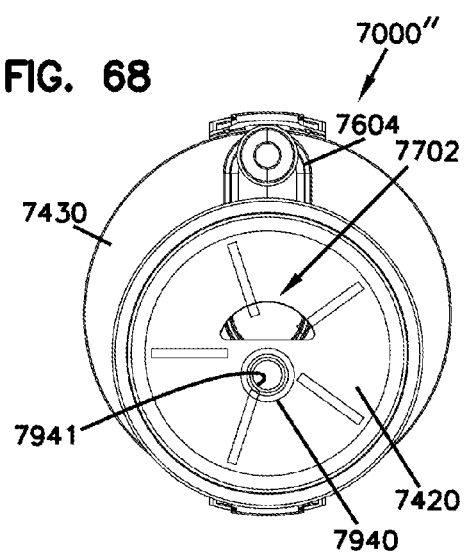

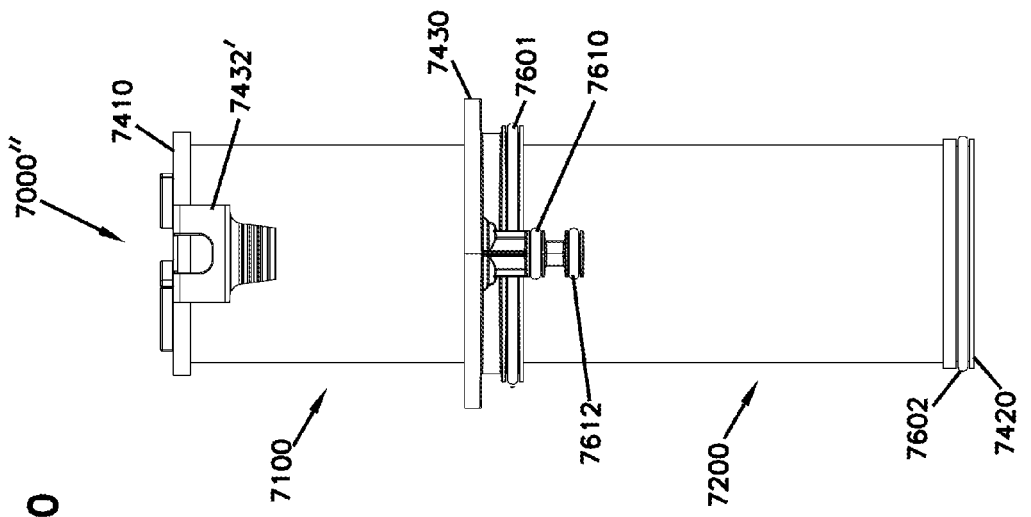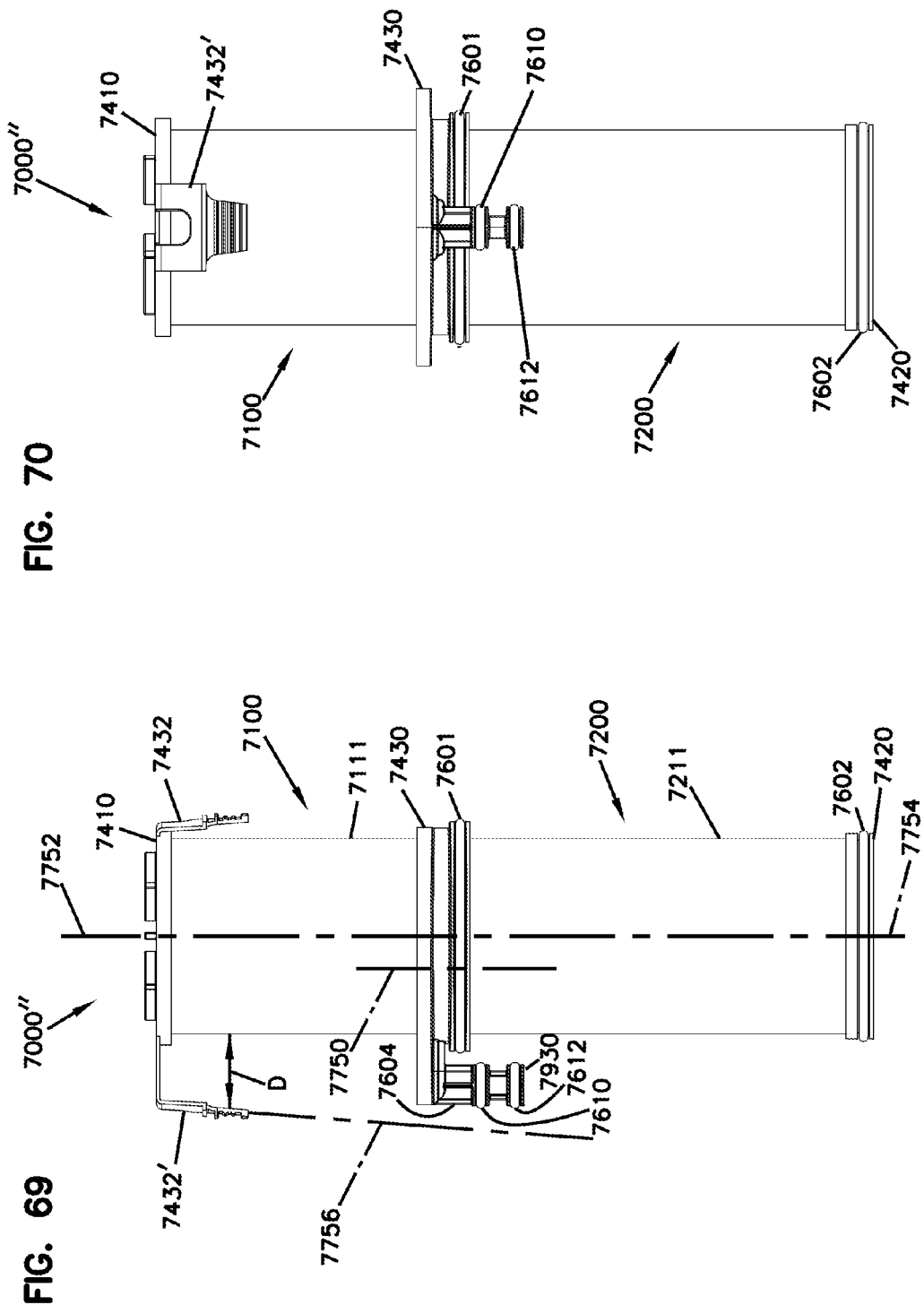

FLUID FILTER CARTRIDGE, FLUID FILTER ARRANGEMENT, AND METHOD FOR SERVICING A FLUID FILTER ARRANGEMENT

This application is being filed as a US National Stage application of PCT International Patent application No. PCT/US2015/034522, filed Jun. 5, 2015, which claims priority to German Patent Application No. 102014210723.7, filed 5 Jun. 2014, and U.S. Provisional patent application Ser. No. 62/149,791, filed Apr. 20, 2015, which applications are incorporated herein by reference. To the extent appropriate, a claim of priority is made to each of the above disclosed applications.

The present disclosure relates to fluid filter cartridges, in particular fuel filter cartridges. Further, the disclosure relates to a fluid filter arrangement comprising a fluid filter cartridge and a housing with a filter cartridge receiving space and a removable access cover. The disclosure further in relates to an access cover for a housing for a fluid filter arrangement. Further, the disclosure relates to a method for servicing a fluid filter arrangement and methods for installing a fluid filter cartridge in a fluid filter arrangement and for removing a fluid filter cartridge from a fluid filter arrangement.

In particular, the disclosure relates to a fluid filter cartridge, in particular a fuel filter cartridge, comprising a first filter element and a second filter element; the first filter element being an element for separating water from fluid; the second filter element being a tubular filter element with an open filter interior; the first and the second filter element being arranged consecutively with respect to a longitudinal extension of the fluid filter cartridge.

Further, the disclosure in particular relates to a fluid filter cartridge, in particular a fuel filter cartridge, comprising a filter element with two opposite end faces, one of the end faces being covered by a connection end cap and the other end face being covered by a second end cap.

By "connection end cap", it is meant one end cap piece that non-removably secures the filter element to another member. In one or more example embodiments, the other member is a second filter element.

Further, the disclosure in particular relates to a fluid filter cartridge, in particular a fuel filter cartridge, comprising a first filter element and a second filter element; the first and the second filter element being arranged consecutively with respect to a longitudinal extension of the fluid filter cartridge; the first filter element having two opposite end faces, one of the end faces being covered by a connection end cap and the other end face being covered by a first end cap; and the second filter element having two opposite end faces, one of the end faces being covered by the connection end cap and the other end face being covered by a second end cap.

The present disclosure in general relates to fluid filtration, in particular to liquid filtration, and further in particular to fuel filtration. Therefore, if reference is made to fluid filtration, fluid filter cartridges, fluid filter arrangements and so forth, this disclosure also applies to liquid filtration, liquid filter cartridges, liquid filter arrangements and so forth, and in particular to fuel filtration, fuel filter cartridges, fuel filter arrangements and so forth.

Fluid filter cartridges, in particular fuel filter cartridges, are usually installed in a housing to form a fluid filter arrangement. Usually, fluid filter cartridges are replaceable and removably installed or positioned in a housing. A preferred area of application of fluid filter cartridges described in this disclosure is so-called "top loading" or "top servicing" where typically the filter cartridge is placed in a filter cartridge receiving space of a housing that is fixed in an engine compartment of a vehicle and the (usually upwardly directed) opening of this filter cartridge receiving space of the housing is covered by an access cover.

Fluid filters, in particular fuel filters, are known in the prior art. Fuel filters, for example, can be part of a low pressure fuel system of a combustion engine deployed for example in a vehicle. A fuel filter assembly, filter element and method for draining water from a fuel filter assembly is, for example, described in European patent application EP 131 951 61. A two-level fuel filter device is described in EP 1 932 574 B1. A three-level fuel filter is described in EP 2 263 769 A1. Different liquid filter cartridges and assemblies are known, for example, from EP 1 556 153 B1, U.S. Pat. No. 7,556,155 B2, or WO 2010/117799 A2. However, further improvements are sought. Therefore, the present disclosure to provides for an improved fluid filter cartridge, an improved fluid filter arrangement, an improved access cover of a housing for a fluid filter arrangement and/or an improved method for servicing a fluid filter arrangement.

The disclosure to provides for a fluid filter cartridge, a fluid filter arrangement, an access cover of a housing for a fluid filter arrangement and/or a method for servicing a fluid filter arrangement that facilitate the servicing of a liquid filter arrangement and/or facilitate the exchange of a fluid filter cartridge.

In particular, the disclosure provides for a fluid filter cartridge, a fluid filter arrangement, an access cover of a housing for a fluid filter arrangement and/or a method for servicing a fluid filter arrangement that reduce the size of the fluid filter cartridge and/or the space requirements for a fuel filter cartridge and/or a fuel filter arrangement.

Further, the disclosure provides for a fluid filter cartridge, a fluid filter arrangement, an access cover of a housing for a fluid filter arrangement and/or a method for servicing a fluid filter arrangement that improve the separation of water from fuel also in a fuel filter cartridge and/or a fuel filter arrangement with a compact size.

The disclosure provides for a fluid filter cartridge, a fluid filter arrangement, an access cover of a housing for a fluid filter arrangement and/or a method for servicing a fluid filter arrangement with improved inlet and/or outlet arrangements.

According to a first aspect of the disclosure, improvement are provide by a fluid filter cartridge, in particular a fuel filter cartridge, comprising a first filter element and a second filter element; the first filter element being an element for separating water from fluid; the second filter element being a tubular filter element with an open filter interior; the first and the second filter element being arranged consecutively with respect to a longitudinal extension of the fluid filter cartridge; characterized in that a water collecting space for collecting water separated from the fluid by the first filter element is provided that is positioned at least partly within the open filter interior of the second filter element.

The first filter element separates water from the fluid, which is then collected in a water collecting space arranged at least partly within the open filter interior of the second filter element. This arrangement has the advantage that the free space in the open filter interior of the second filter element is used, at least partly, for collecting the water separated at a first filter element. Preferably, the water collecting space has a longitudinal extension that is at least two times, preferably at least three times, four times or five times as large as an extension of the water collecting space in a direction orthogonal to its longitudinal extension.

In additional embodiments, the water collecting space has a longitudinal extension that is at least one time as large as an extension of the water collecting space in a direction orthogonal to its longitudinal extension.

Compared to fluid filter cartridges with a water collecting space outside of the open filter interior of the second filter element, the fluid filter cartridge according to the first aspect of the disclosure has the advantage of requiring less space, in a longitudinal direction of the filter cartridge as well as in a direction or plane orthogonal to the longitudinal axis of the fluid filter cartridge. By using the open filter interior of the second filter element as a water collecting space for collecting water separated from the fluid by the first filter element a very compact design of the fluid filter cartridge can be realized. An additional benefit is that the arrangement of the water collecting space in the open filter interior of the second filter element allows for a tall, but narrow shape of the water collecting space, which improves and facilitates the separation of water from fuel due to gravity. For example, even when a vehicle with a filter cartridge is tilted, e.g. at a slope, the separation surface between the settled water and fuel is little disturbed. A further advantage is that the readings of a water-in-fuel sensor positioned in the water collecting space are less sensitive to tilting positions of the vehicle in case of a tall, but narrow water collecting space.

The two filter elements are provided longitudinally consecutively, i.e. with respect to a longitudinal extension of the filter cartridge, the two filter elements are arranged one after the other. This longitudinally consecutive arrangement of the two filter elements can be such that the two filter elements are arranged on a common longitudinal axis, i.e. are arranged coaxial or aligned, or such that the two filter elements are arranged with their longitudinal axes shifted or offset.

A longitudinal axis of the fluid filter cartridge and/or a longitudinal axis of the first filter element and/or a longitudinal axis of the second filter element can be identical to each other or offset or shifted to each other. Preferably, the longitudinal axis of the fluid filter cartridge and/or the longitudinal axis of the first filter element and/or the longitudinal axis of the second filter element are parallel to each other.

In a preferred embodiment, where the first and/or the second filter elements have a cylindrical outer shape, the longitudinal axis of the first and/or the second filter element correspond to the longitudinal axis of the cylinder formed by their outer peripheries.

In a preferred embodiment, the fluid filter cartridge is characterized in that the first filter element has two opposite end faces, one of the end faces being covered by a connection end cap and the other end face being covered by a first end cap; and the second filter element has two opposite end faces, one of the end faces being covered by the connection end cap and the other end face being covered by a second end cap.

In this embodiment, the opposite end faces of both filter elements are covered by end caps, wherein the end faces of the first and the second filter element facing toward each other are connected by a connection end cap. In other words, while the first and second filter elements together have four end faces, only three end caps are provided covering those four end faces in a way where one end face of the first filter element and one end face of the second filter element are covered and connected by a common or shared connection end cap while the other two end faces of the first and second filter elements are covered by separate, first and second end caps.

The connection end cap can be integral or can comprise two or more separate components that together form the connection end cap. In the latter case, it is preferred that the connection end cap is not designed to be disassembled during intended use. In a preferred embodiment, the connection end cap is constructed out of separate components for manufacturability, which are connected to each other or assembled to form the connection end cap. The connection preferably is not releasable in normal operating conditions or by application of regular manual force. Preferably, the connection is releasable only by applying excessive force or not releasable at all. The connection end cap could, for example, be constructed out of two separate end caps (possibly with different diameters) which are connected, via a high-strength clip-connection, for example, to form a single connection end cap.

According to a further preferred embodiment, a central axis of the connection end cap orthogonal to a main extension plane of the connection end cap is offset in relation to a central axis of the first end cap orthogonal to a main extension plane of the first end cap and/or a central axis of the second end cap orthogonal to a main extension plane of the second end cap.

Generally, an end cap preferably has a central axis which is orthogonal to a plane of the end cap in which the end cap has its main extension. For example, in case the first and second filter elements have a substantially cylindrical outer periphery, the end caps usually also have a substantially cylindrical outer periphery. In such a case, the central axis of the end cap would pass through the central point of the circular cross-section of the cylinder.

In this embodiment, it is preferred, that such a central axis of the connection end cap is not identical with the central axis of the first and/or the second end cap. While it is preferred that the central axis of the connection end cap is parallel to the central axes of both the first and the second end cap, the central axis of the connection end cap is preferably spaced from the central axes of the first and/or the second end cap. This results in an arrangement where the connection end cap is not arranged coaxial with the first and/or the second end cap, i.e. where the connection end cap is shifted or offset in relation to the first and/or the second end cap.

Preferably, the cross-section of the connection end cap in its main extension plane is different from, in particular larger than, a cross-section of the first and/or the second end cap in their main extension planes. In particular, it is preferred that a diameter of a preferably circular connection end cap is larger than a diameter of a preferably circular first end cap and/or larger than a diameter of a preferably circular second end cap.

According to a further preferred embodiment, the fluid filter cartridge is characterized by at least one outwardly projecting tab being provided at the connection end cap of the fluid filter cartridge, the at least one tab having a first engagement element for engaging a second engagement element on an access cover of a housing for the fluid filter cartridge in a snap-fit connection.

Advantages of the features of the embodiments and further embodiments of this aspect will be described below with respect to further aspects of the disclosure.

According to a second aspect of the disclosure, an improvement is provided by a fluid filter cartridge, in particular a fuel filter cartridge, comprising a filter element with two opposite end faces, one of the end faces being covered by a connection end cap and the other end face being covered by a second end cap; characterized in that a central axis of the connection end cap orthogonal to a main extension plane of the connection end cap is offset in relation to a central axis of the second end cap orthogonal to a main extension plane of the second end cap.

The fluid filter cartridge according to this second aspect is characterized in that the connection end cap covering one end face of a filter element is offset in relation to a second end cap covering the other end face of a filter element. Preferably, the central axis of the connection end cap is parallel to but spaced from the central axis of the second end cap. A fluid filter cartridge with a filter element with two end caps offset in relation to each other allows for more flexible and improved installation in a connection to a housing.

In general, the filter element of the fluid filter cartridge according to the second aspect of the disclosure can be any kind of fluid filter element. Preferably, the filter element of the fluid filter cartridge according to the second aspect of the disclosure can be a filter element for separating water from fluid and/or a filter element for separating particles from fluid. Preferably, the filter element is a tubular filter element with an open filter interior.

Preferably, the cross-section of the connection end cap in its main extension plane is different from, in particular larger than, the cross-section of the second end cap in its main extension plane. In particular, it is preferred that a diameter of a preferably circular connection end cap is larger than a diameter of a preferably circular second end cap.

According to a preferred embodiment, the fluid filter cartridge preferably comprises a further filter element with two opposite end faces, one of the end faces being covered by the connection end cap and the other end face being covered by a first end cap; the two elements being arranged consecutively with respect to a longitudinal extension of the fluid filter cartridge.

Further, it is preferred that the filter element with its end faces covered by the connection end cap and the first end cap is a first filter element for separating water from fluid; the filter element with its end faces covered by the connection end cap and the second end cap is a second filter element being a tubular filter element with an open filter interior.

A further embodiment of the filter cartridge according to the second aspect of the disclosure is characterized in that a water collecting space for collecting water separated from the fluid by the first filter element is provided that is positioned at least partly within the open filter interior of the second filter element.

In a further preferred embodiment, the fluid filter cartridge according to the second aspect of the disclosure is characterized by at least one outwardly projecting tab being provided at the connection end cap, the at least one tab having a first engagement element for engaging a second engagement element on an access cover of a housing for the fluid filter cartridge in a snap-fit connection.

Advantages of the features of the embodiments and further embodiments of this aspect will be described below with respect to further aspects of the disclosure.

According to a third aspect of the disclosure, an improvement is provided by a fluid filter cartridge, in particular a fuel filter cartridge, comprising a first filter element and a second filter element; the first and the second filter element being arranged consecutively with respect to a longitudinal extension of the fluid filter cartridge; the first filter element having two opposite end faces, one of the end faces being covered by a connection end cap and the other end face being covered by a first end cap; and the second filter element having two opposite end faces, one of the end faces being covered by the connection end cap and the other end face being covered by a second end cap; characterized by at least one outwardly projecting tab being provided at the connection end cap, the at least one tab having a first engagement element for engaging a second engagement element on an access cover of a housing for the fluid filter cartridge in a snap-fit connection.

According to the third aspect of the disclosure, the connection end cap has at least one outwardly projecting tab for creating a snap-fit connection with an access cover of a housing. The at least one outwardly projecting tab has a first engagement element which is suitable and designed for engaging a corresponding second engagement element on the access cover of a housing to create a snap-fit connection. The snap-fit connection preferably prevents a relative translational movement between the fluid filter cartridge and the access cover, in particular in a direction substantially parallel to the longitudinal axis of the filter cartridge, but preferably allows for a relative rotational movement of the access cover in relation to the fluid filter cartridge and vice versa.

The at least one flexible tab preferably is arranged at an outer periphery of the connection end cap. The at least one outwardly projecting tab may be integral with the connection end cap.

Herein, the terms "inwardly" and "outwardly" are meant to relate to directions facing towards a center of an element or away from such a center. If the element has a circular cross-section, the terms inwardly and outwardly preferably mean radially inwardly or radially outwardly.

According to a preferred embodiment, the fluid filter cartridge according to the third aspect of the disclosure is further characterized in that a water collecting space for collecting water separated from the fluid by the first filter element is provided that is positioned at least partly within the open filter interior of the second filter element.

According to a further embodiment, the fluid filter cartridge according to the third aspect of the disclosure can be further characterized in that a central axis of the connection end cap orthogonal to a main extension plane of the connection end cap is offset in relation to a central axis of the first end cap orthogonal to a main extension plane of the first end cap and/or a central axis of the second end cap orthogonal to a main extension plane of the second end cap.

In this disclosure, features described with respect to one aspect of the disclosure are in general combinable with features of further aspects of the disclosure and also may be described in several instances throughout this description. Unless stated otherwise, the features, advantages and/or functions of the features described with respect to one aspect are also applicable to and combinable with features described with respect to other aspects of the disclosure. Features described with respect to one aspect of the disclosure may correspond to features described with respect to another aspect of the disclosure. Unless stated otherwise, features described with respect to different aspects of the disclosure can be combined, but do not have to be combined. In particular, features described without reference to a specific aspect of the disclosure, may be combined, unless stated otherwise, with any of the further aspects and any further features described herein, but do not have to be combined.

The features described in particular with respect to the following embodiments, are preferably combinable with any of the main aspects of the disclosure and any combination thereof.

The first and/or the second filter element preferably contains a media pack extending between two opposite end faces, which are preferably covered by end caps.

The first filter element, which is an element for separating water from fluid, preferably contains a coalescing member and/or a stripping member. In the first filter element, for example, a coalescing member can be provided which allows water droplets to enter the media pack and grow in size while migrating through the media pack. Alternatively or additionally, the first filter element could include a stripping member, which will collect the water upstream of the media, like a membrane. The first filter element for separating water from fluid can also, additionally, serve for particle filtration. Further, it is preferred that the first element is a tubular filter element with an open filter interior.

Further, it is particularly preferred that the second filter element is a particle filter element for separating particles from the fluid.

The first and/or the second filter element may comprise a media pack with filter media, wherein preferably the filter media is pleated filter media.

The open filter interior of the first and/or second filter element preferably is surrounded by filter media of a media pack. Preferably, the open filter interior of the first and/or second filter element is completely surrounded by filter media of a media pack. Further preferably, a support structure can be provided on the inner periphery of a media pack of the first and/or second filter element. Such a support structure preferably is partly open and/or porous. The first and/or second filter element preferably has a circular, oval, or race-track cross-sectional shape with an inner opening or open filter interior.

Further, a fluid filter cartridge preferably has a fluid inlet for raw fluid, i.e. for fluid to be filtered, and a fluid outlet for filtered fluid. Preferably, the fluid inlet and/or the fluid outlet preferably is arranged at the upper and/or lower end or region of a fluid filter cartridge. The fluid inlet and outlet of the fluid filter cartridge preferably is in fluid communication with a corresponding fluid inlet/outlet of a housing containing the fluid filter cartridge.

It is further preferred that the second filter element is positioned downstream of the first filter element. This means that fluid to be filtered will flow through the first filter element before it flows to the second filter element. Further, it is preferred that the fluid flow paths through the first and second filter elements are separated or isolated from each other, except for a dedicated provision of fluid filtered by one of the filter elements to the upstream side of the other one of the filter elements.

Further, it is preferred that in an operational orientation of the filter cartridge, the second filter element is positioned below the first filter element. This arrangement of the second filter element below the first filter element in an operational orientation of the filter cartridge is particularly advantageous for collecting water separated from the first element in a water collecting space positioned at least partly within the open filter interior of the second filter element by gravitation.

In a further preferred embodiment, the fluid filter cartridge is characterized by the first filter element and/or the second filter element being configured for outside-in fluid flow. In a filter element configured for outside-in fluid flow, fluid is provided to an outer periphery of the filter element, enters the filter element through this outer periphery and exits the filter element typically on an inner periphery surrounding an open filter interior. It is particularly preferred that the first filter element and the second filter element both being configured for outside-in fluid flow. Further, it is preferred that the fluid filter cartridge, and preferably also a housing for such a fluid filter cartridge, is configured for a fluid flow through the filter cartridge with an outside-in fluid flow through the first filter element and/or the second filter element.

In a further preferred embodiment, the fluid filter cartridge is further characterized in that a sealing member is positioned on the outer periphery of the filter cartridge separating an outer flow path of the first filter element from an outer flow path of the second filter element. The sealing member preferably creates a seal with a housing that receives the fluid filter cartridge. In particular, when the fluid flow through the filter cartridge contains flow paths on the outer periphery of the filter cartridges, it is preferred to separate these outer flow paths of the first and the second filter element from each other to maintain isolated flow paths through the first filter element and the second filter element. By isolated flow paths it is meant that fluid flow to a filter element can only happen through a dedicated fluid inlet to this filter element at its upstream side and fluid flow from the filter element can only happen through a dedicated fluid outlet of this filter element at its downstream side and that between the inlet and the outlet of a filter element the fluid flow has to pass through the filter element.

In a further preferred embodiment, the first filter element and the second filter element have different longitudinal extensions, wherein preferably the longitudinal extension of the second filter element is larger than the longitudinal extension of the first filter element. Different lengths of the filter elements have the advantage that the risk of installing a fluid filter cartridge in a wrong orientation is reduced, in particular if connection means like outwardly projecting tabs are provided at the connection end cap.

It is further preferred that the first end cap is a closed end cap and/or that the second end cap is an open end cap.

A further particularly preferred embodiment of the fluid filter cartridge is characterized in that the larger part, in particular more than 50%, more than 60%, more than 70%, more than 80%, or more than 90% of the volume of the water collecting space is positioned within the open filter interior of the second filter element. In particular, it is preferred that the larger part of a longitudinal extension of the water collecting space is positioned within the open filter interior of the second filter element, in particular more than 50%, more than 60%, more than 70%, more than 80%, or more than 90% of a longitudinal extension or length of the water collecting space. It is particularly preferred that the water collecting space is positioned fully within the open filter interior of the second filter element.

Further, it is preferred that the water collecting space is isolated from a fluid flow of the second filter element, wherein the water collecting space preferably is surrounded by a closed tube.

Although the water collecting space is positioned at least partly within the open filter interior of the second filter element, it is preferably separated from a fluid flow of the second filter element. Rather, the water collecting space is in fluid connection with the first filter element to receive the water separated from the fluid by the first filter element. Preferably, the closed tube surrounding the water connecting space has an open upper end (in operational orientation of the filter cartridge) through which water separated from the fluid by the first filter element can enter the water collecting space via gravitation.

A further preferred embodiment of the fluid filter cartridge is characterized in that, in operable orientation of the filter cartridge, the water collecting space has a water outlet positioned at a lower end of the water collecting space. A lower end of the water collecting space preferably is a volume of the water collecting space in a lower region of the water collecting space, in particular in the lower half, lower third, lower fourth, lower sixth or lower tenth of a longitudinal extension of the water collecting space. The longitudinal extension of the water collecting space preferably is parallel to or identical with a longitudinal extension of the fluid filter cartridge.

In a further preferred embodiment in the water collecting space, preferably in a part of the water collecting space that is positioned within the open filter interior of the second filter element, sufficient space is provided to receive a water-in-fuel sensor.

A further preferred embodiment of the fluid filter cartridge is characterized by an inlet of the water purification filter being in fluid communication directly or indirectly with the water outlet of the water collecting space.

Preferably, the outlet of the water collecting space is provided with or connected to a pressure-actuated drain valve and the outlet of this pressure-actuated drain valve is connected with an inlet of the water purification filter.

In one or more example embodiments, the outlet of the water collecting space is provided with or connected to a valve, which could be electro-mechanically driven or pressure-actuated. The valve may connected with the inlet of a water purification filter or connected to the environment, container, water tank, etc.

The water purification filter preferably contains active carbon. It is further preferred that the larger part of the water purification filter, in particular more than 50%, more than 60%, more than 70%, more than 80%, or more than 90% is position within the open filter interior of the second filter element. In particular, the water purification filter may be fully positioned within the open filter interior of the second filter element. Also the water purification filter is preferably isolated from fluid flow of the first and/or second filter elements. The water purification filter is preferably positioned downstream of the water collecting space and in fluid communication with the water collecting space, preferably via a connection tube, which, however, does not need to be part of the fluid filter cartridge but can also be provided in a housing or as a separate element outside of the housing. Preferably, an inlet of the water purification filter is connected to the water outlet of the water collecting space. However, a connection element for creating this connection may be part of the fluid filter cartridge, a housing or may be a separate element outside of the housing.

In a further embodiment it is preferred that in operable orientation of the filter cartridge, the water purification filter has a water outlet positioned at a lower end of the water purification filter and preferably connected to an outlet tube connecting the water outlet of the water purification filter to a volume in an upper region inside the water purification filter.

The water outlet of the water purification filter is preferably positioned at a lower end or region of the water purification filter, in particular at the lower 50%, lower 30%, lower 20%, lower 10% of a longitudinal extension of the water purification filter. However, inside the water purification filter, an outlet tube preferably connects the water outlet to a volume in an upper region inside the water purification filter, preferably the upper 50%, upper 30%, upper 20%, or upper 10% of the region inside the water purification filter or interior of the water purification filter. Such an outlet tube ensures that the water drained from the water purification filter through the water outlet is removed from an upper region inside the water purification filter. Preferably, a water inlet of the water purification filter is positioned in operable orientation of the filter cartridge at a lower end of the water purification filter, n particular at the lower 50%, lower 30%, lower 20%, lower 10% of a longitudinal extension of the water purification filter. In such an embodiment, water provided to the water purification filter from the water collecting space will be fed to a lower end or lower region inside the water purification filter while the water drained from the water purification filter will be taken from an upper region inside the water purification filter. Since preferably a water purification agent is provided inside the water purification filter, by draining the water from another region inside the water purification filter than the region where the water is provided to the water purification filter, the exposure of the water to the water purification agent can be improved.

Further, it is preferred that the water outlet of the water purification filter and/or of the water collecting space is provided with a pressure-actuated drain valve. A pressure-actuated drain valve preferably is positioned between a water outlet of the water collecting space and a water inlet of the water purification filter and/or downstream of the water outlet of the water purification filter. The pressure-actuated drain valve preferably is a one-way valve allowing the passage of water from the water purification filter and/or the water collecting space through the water outlet in case the pressure inside the water collecting space and/or in the water purification filter reaches or exceeds the actuation pressure of the pressure-actuated drain valve. In this way, it can be ensured that water is drained from the water collecting space and/or the water purification filter only when a predetermined pressure inside the water collecting space and/or the water purification filter is reached or exceeded. Preferably, this is the case when a fuel pump in fluid connection with the filter cartridge is operated in reverse mode. The pressure-actuated drain valve may be part of the fluid filter cartridge, a housing of the fluid filter cartridge or a separate element, preferably positioned in an engine compartment of a vehicle.

In certain preferred embodiments, it may be preferred that a longitudinal axis of the first filter element and a longitudinal axis of the second filter element are aligned. In such an embodiment, the first and the second filter elements are arranged coaxial. It may also be preferred that the first and the second filter elements have substantially identical cross-sectional shapes.

An embodiment where the longitudinal axes of the first and second filter elements are aligned may be combined, for example, with the features that the connection end cap connecting the two filter elements may be offset to the first and/or the second end cap. For example, the first and second filter elements and first and second end caps may have substantially identical cross-sectional shapes and, for example, substantially identical diameters, while the connection end cap has a larger cross-sectional shape and, for example, a larger diameter and thus covers the end faces of both filter elements while at the same time being offset relative to the first and second end caps as well as the first and second filter elements.

Alternatively, the longitudinal axes of the first and second filter elements may be offset relative to each other.

Further, the first and second filter elements may have different cross-sectional shapes. Further, it may be preferred that a diameter of the first filter element and a diameter of the second filter element are different.

In a further embodiment, the fluid filter cartridge is further characterized in that the difference in diameter of the first filter element and second filter element is at least 10% of the offset between the central axis of the connection end cap and the central axis of the first and/or second end cap and/or at least 10% of an offset between a longitudinal axis of the first filter element and a longitudinal axis of the second filter element.

In a further embodiment, it is preferred that the difference in diameter between the first filter element and second filter element is at least the offset between the central axis of the connection end cap and the central axis of the first and/or second end cap and/or an offset between a longitudinal axis of the first filter element and a longitudinal axis of the second filter element.

In a further embodiment of the fluid filter cartridge, it may be preferred that the connection end cap has a diameter which is larger than a diameter of the first end cap by at least 50% of the offset between the connection end cap and the first end cap and/or the connection end cap has a diameter which is larger than a diameter of the second end cap by at least 50% of the offset between the connection end cap and the second end cap.

A further preferred embodiment of the fluid filter cartridge is characterized in that the connection end cap provides for at least one port for fluid flow to and/or from the filter cartridge.

The at least one port at the connection end cap or adjacent the end cap may be an inlet port for fluid flow to the filter cartridge and/or an outlet port for fluid flow from the filter cartridge. In particular, the at least one port may allow for fluid flow to and/or from one or both of the filter cartridges, in particular to an upstream side or from a downstream side of one or both of the filter cartridges.

The provision of at least one port at a connection end cap has the advantage that such a port is provided at a region of the fluid filter cartridge between the first and second end caps. The space on the first and second end caps and the corresponding space in the housing or the corresponding space in the engine compartment of a vehicle often is limited. Therefore, it may be advantageous to provide for the inlet and outlet ports of the fluid cartridge and/or additional ports, in general at least one port, on the connection end cap, i.e. a location spaced apart from the first and second end caps.

It is particularly preferred that the at least one port faces in a direction towards the first or the second end cap.

Preferably, the at least one port faces in axial direction, or in a longitudinal direction or in a direction orthogonal to the main extension plane of the connection end cap. Preferably, the at least one port has an opening substantially parallel to a main extension plane of the connection end cap. It is further particularly preferred that the at least one port faces in a direction towards the second end cap of the fluid filter cartridge. Preferably, in such an embodiment, this at least one port facing in a direction towards the second end cap will—in operational orientation of the filter cartridge—face downwardly. When the filter cartridge is to be installed in a "top loading" housing, this orientation of the at least one port facilitates the connection of this port with a corresponding connection on the housing.

In one or more example embodiments, the fluid filter cartridge is further characterized in that the connection end cap provides for at least two ports for fluid flow to and/or from the filter cartridge, wherein the at least two ports are positioned within an angle of less than 180° from each other within a cross-section or a main extension plane of the connection end cap. The connection end cap can also provide for two, three or more ports for fluid flow to and/or from the filter cartridge, wherein the at least two, three or more ports are positioned within an angle of less than 180° from each other within a cross-section or a main extension plane of the connection end cap. In particular, the at least two ports are preferably positioned within an angle of less than 170°, 160°, 150°, 140°, 130°, 120°, 110°, 100°, 90°, 80°, 70°, 60°, 50°, 40°, 30°, 20°, or 10° from each other within a cross-section or a main extension plane of the connection end cap.

In a preferred embodiment, the at least one port is provided on a portion of the connection end cap that is covering an end face of the first filter element but not covering an end face of the second filter element.

According to a further embodiment it is preferred that the at least one outwardly projecting tab is oriented such that when an access cover is connected to the filter cartridge via the at least one outwardly projecting tab, one of the two filter element, preferably the first filter element, is fully or at least partly covered by the access cover. It is particularly preferred that—in an operational orientation of the filter cartridge—the upper filter element is fully or at least partly covered by the access cover when the access cover is connected to the filter cartridge via the at least one outwardly projecting tab.

A further preferred embodiment of the fluid filter cartridge is characterized by the at least one outwardly projecting tab having a release portion being manipulable by a user to retract the first engagement element inwardly to release a snap-fit connection between the fluid filter cartridge and an access cover. Preferably, the release portion of the at least one outwardly projecting tab can be grasped by a user and pushed inwardly. Preferably, by pushing the release portion inwardly by a user, the first engagement element of the tab is retracted from engagement with a second engagement element on an access cover and thus the snap-fit connection between the tab and the access cover is released.

In a further embodiment it is preferred that the at least one outwardly projecting tab comprises a living hinge forming a pivoting point about which a part of the tab comprising the first engagement element and the release portion can pivot when the release portion is manipulated by a user.

Further, it is preferred that a distance between a free end of the release portion and the living hinge is at least twice as large, preferably at least three times, four times or five times as large, as a distance between the first engagement element and the living hinge. This allows creating a larger lever effect, which is important to make the servicing of the filter cartridge easier for an end user as the access to the tab provided at the connection end cap is limited by the presence of the first and second filter element on the two opposite sides of the connection end cap.

A further preferred embodiment is characterized in that the at least one projecting tab has a third engagement guide for engaging a guide structure in a filter cartridge receiving space of a filter housing.

The third engagement guide preferably engages a corresponding guide structure on a filter cartridge receiving space of a housing for receiving the filter cartridge preferably in order to avoid a rotation of the filter cartridge relative to the filter cartridge receiving space of the housing. In this way, the third engagement guide on the at least one outwardly projecting tab pre-orients the filter cartridge relative to the filter cartridge receiving space of the housing.

Preferably, the third engagement guide on the at least one outwardly projecting tab is designed such that it engages the guide structure on the filter cartridge receiving space of the filter housing before a part of the filter cartridge contacts the corresponding connection or counterpart on the filter cartridge receiving space of the filter housing during installation of the filter cartridge. In this way, it is ensured that the fluid filter cartridge will be oriented properly in the filter cartridge receiving space of the housing before the fluid filter cartridge is further inserted into the filter cartridge receiving space of the housing such that the proper orientation of the filter cartridge within the filter cartridge receiving space of the housing is reached before the ports contact the respective counterparts or connections on the housing.

It is further preferred that the first engagement element of the tab has an extension in a direction along the outer periphery of the filter cartridge of at least 10 mm, in particular at least 20 mm, at least 25 mm, or at least 30 mm.

Since the second engagement element of the access cover may have a plurality of second engagement portions positioned intermittently along the inner periphery of the access cover, as described below, it is preferred that the first engagement element of the tab has an extension in a direction along the outer periphery of the filter cartridge that is longer than the space between two of the plurality of second engagement portions on the access cover.

Further, it is preferred that the first engagement element of the at least one outwardly projecting tab has rounded ends. Rounded ends of the first engagement element have the advantage that rotation of the fluid filter cartridge relative to an access cover and vice versa is facilitated.

According to a further aspect of the disclosure, an improvement is provided by a fluid filter arrangement comprising a fluid filter cartridge as described above operably and removably installed in a housing with a filter cartridge receiving space and a removable access cover.

The housing of the fluid filter arrangement preferably is designed for "top loading" the filter cartridge, i.e. servicing the fluid filter arrangement from the top by removing an access cover and a fluid filter cartridge from a cartridge receiving space in a basically upward direction from the cartridge receiving space and installing a new filter cartridge by inserting the fluid filter cartridge in a basically downward direction into the cartridge receiving space during installation.

The access cover and the filter cartridge receiving space preferably are releasably connected, for example by a screw connection with mating threads on the access cover and the filter cartridge receiving space or by a clamping connection.

Preferably, the access cover covers an upper end of the filter cartridge—in operable orientation of the filter cartridge—and/or the first filter element.

The cartridge receiving space of the housing preferably has a guide structure for engagement with a third engagement guide of the filter cartridge. The engagement structure preferably is in the form of a slot. The engagement structure preferably is arranged such that the third engagement guide of the at least one upwardly projecting tab of the fluid filter cartridge engages the guide structure on the filter cartridge receiving space before any port of the fluid filter cartridge contacts its respective counterpart or connection on the filter cartridge receiving space.

According to a further aspect of the disclosure, the object is solved by an access cover of a housing for a fluid filter arrangement as described above, characterized in that an inner periphery of the access cover is provided with a second engagement element for engaging a first engagement element of at least one outwardly projecting tab of a fluid filter cartridge in a snap-fit connection.

The snap-fit-connection between the access cover and fluid filter cartridge allows for an installation and removal of the fluid filter cartridge into and out of the filter cartridge receiving space of the housing together with the access cover. The access cover preferably is cup-shaped.

In a preferred embodiment, the access cover is further characterized by the second engagement element having a plurality of second engagement portions positioned intermittently along the inner periphery of the access cover.

Preferably, the plurality of second engagement portions are extending inwardly from the inner periphery of the access cover and extend along a portion of the inner periphery of the access cover.

The access cover further preferably is characterized by the plurality of second engagement portions having an extension in a direction along the inner periphery of the access cover of at least 20 mm and/or being spaced apart from each other by 20 mm, 15 mm, 10 mm, 5 mm or less.

It is particularly preferred to have 3, 4, or 5 second engagement portions having an extension along the inner periphery of the access cover of 90-118° (for 3 second engagement portions), of 75-88° (for 4 second engagement portions), or of 55-70° (for 5 second engagement portions).

It is particularly preferred that the space between two neighboring second engagement portions is less than an extension of the at least one engagement tab of the fluid filter cartridge in a direction along the outer periphery of the fluid filter cartridge.

The access cover preferably is molded. Further, preferably, the access cover consists of or contains plastic material. Preferably, the access cover is made by injection molding.

According to a further aspect of the disclosure, an improvement is provided by a method for servicing a fluid filter arrangement, in particular a previously described fluid filter arrangement, characterized by removing an access cover together with a used filter cartridge from a filter cartridge receiving space of a housing; removing the used filter cartridge from the access cover; connecting a new filter cartridge to the access cover; inserting the filter cartridge into the filter cartridge receiving space of the housing; fastening the access cover on the filter cartridge receiving space of the housing.

Preferably, the removing of the filter cartridge together with an access cover an the insertion of the filter cartridge with the access cover from and into the filter cartridge receiving space basically is a upward or downward movement in the sense of a top loading or top servicing. Preferably, the fluid filter cartridge is connected to the access cover during the removal and insertion of the filter cartridge from the end into the receiving space of the housing.

When a new fluid filter cartridge is inserted into the filter cartridge receiving space of the housing, the filter cartridge preferably is inserted into the filter cartridge receiving space of the housing while an upper end of the filter cartridge—in operable orientation of the filter cartridge—and/or the first filter element is covered by the access cover.

As to the advantages, preferred embodiments and details of the fluid filter arrangement, the housing for a filter cartridge with a filter cartridge receiving space and a removable access cover and the method for servicing a fluid filter arrangement including the removal of a used filter cartridge and the installation of a new fluid filter cartridge and further preferred embodiments of these aspects, reference is made to the corresponding embodiments, advantages and details described above with reference to the further aspects of the disclosure.

Figure 2:
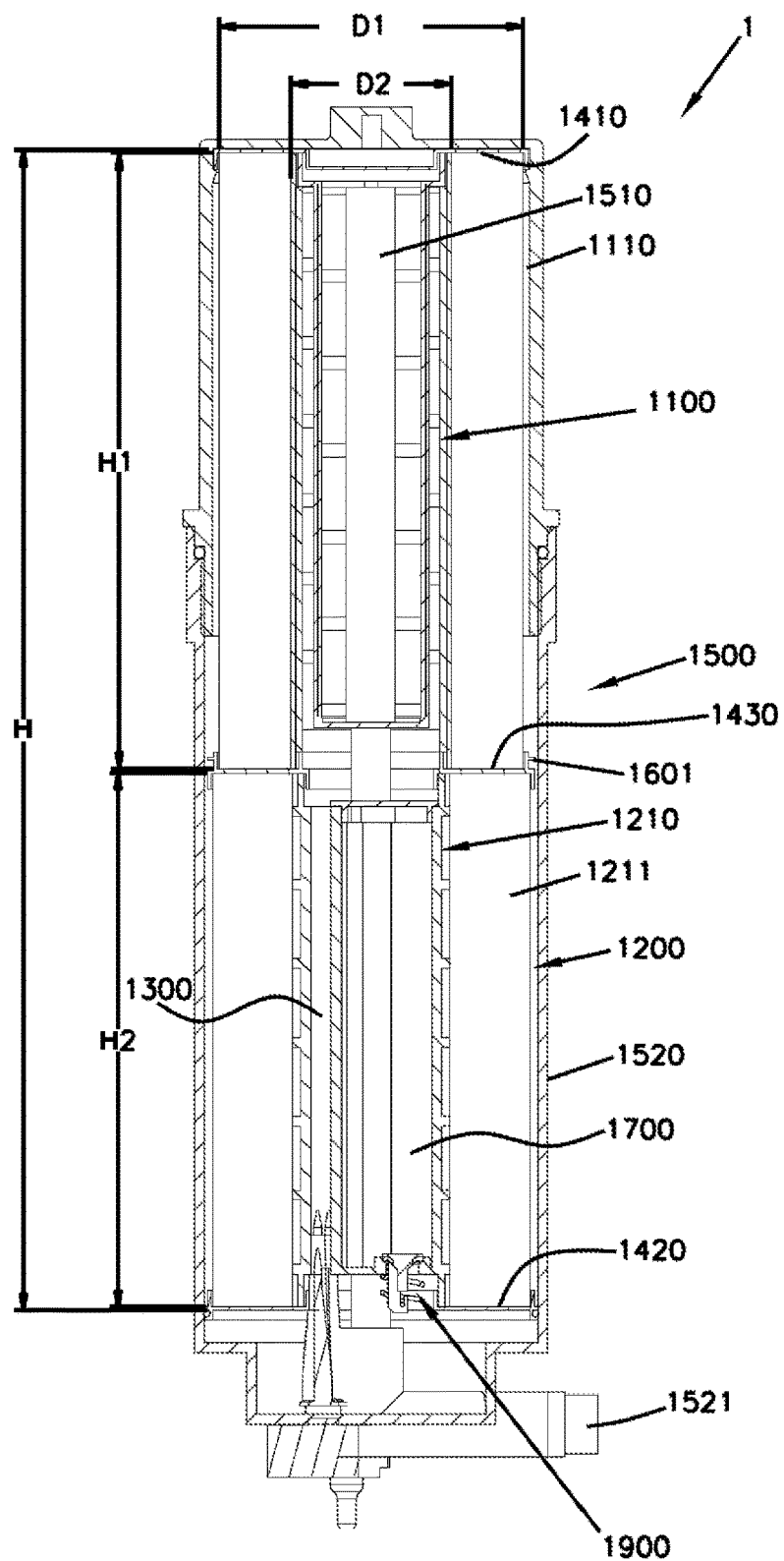
Figure 3:
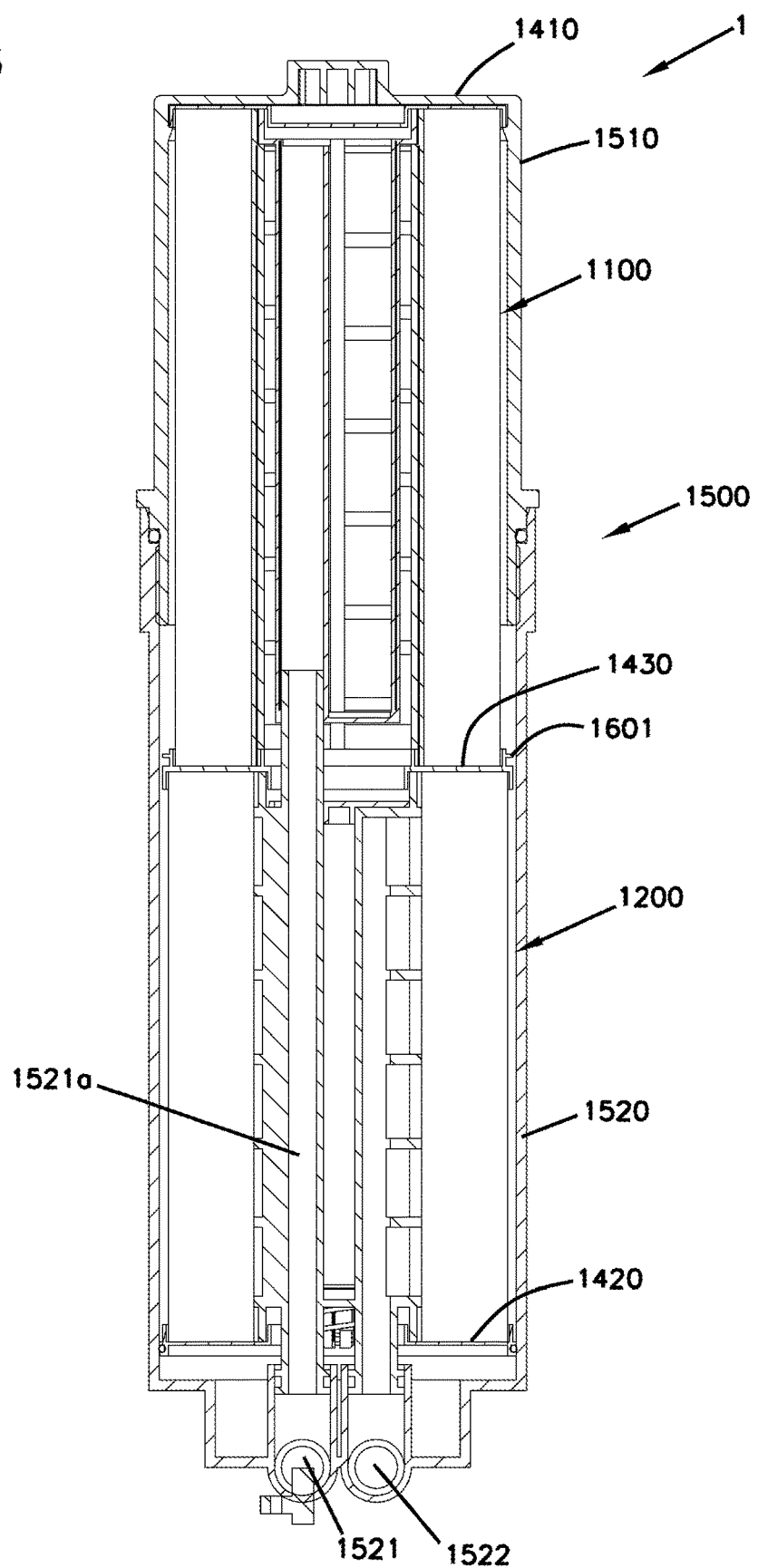
Figure 4:
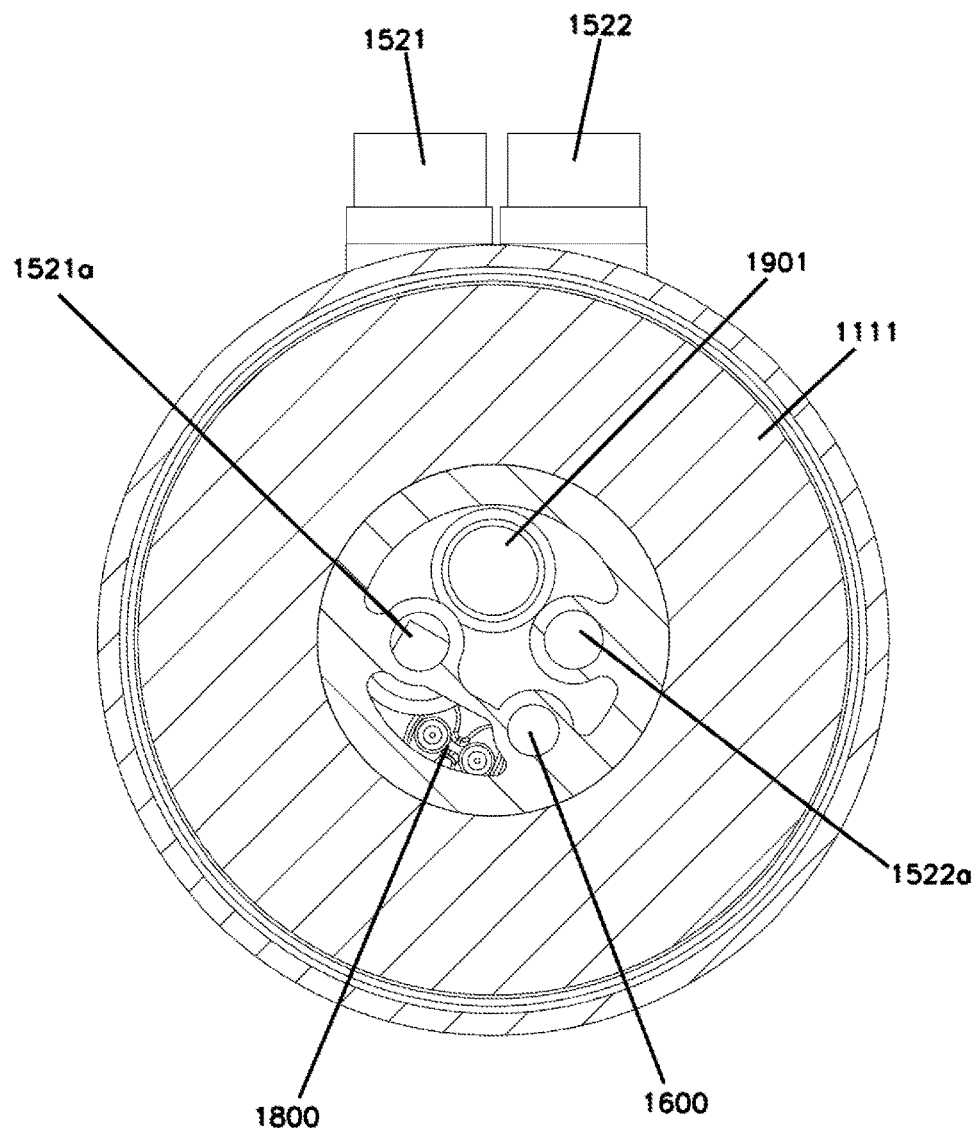
Figure 5:
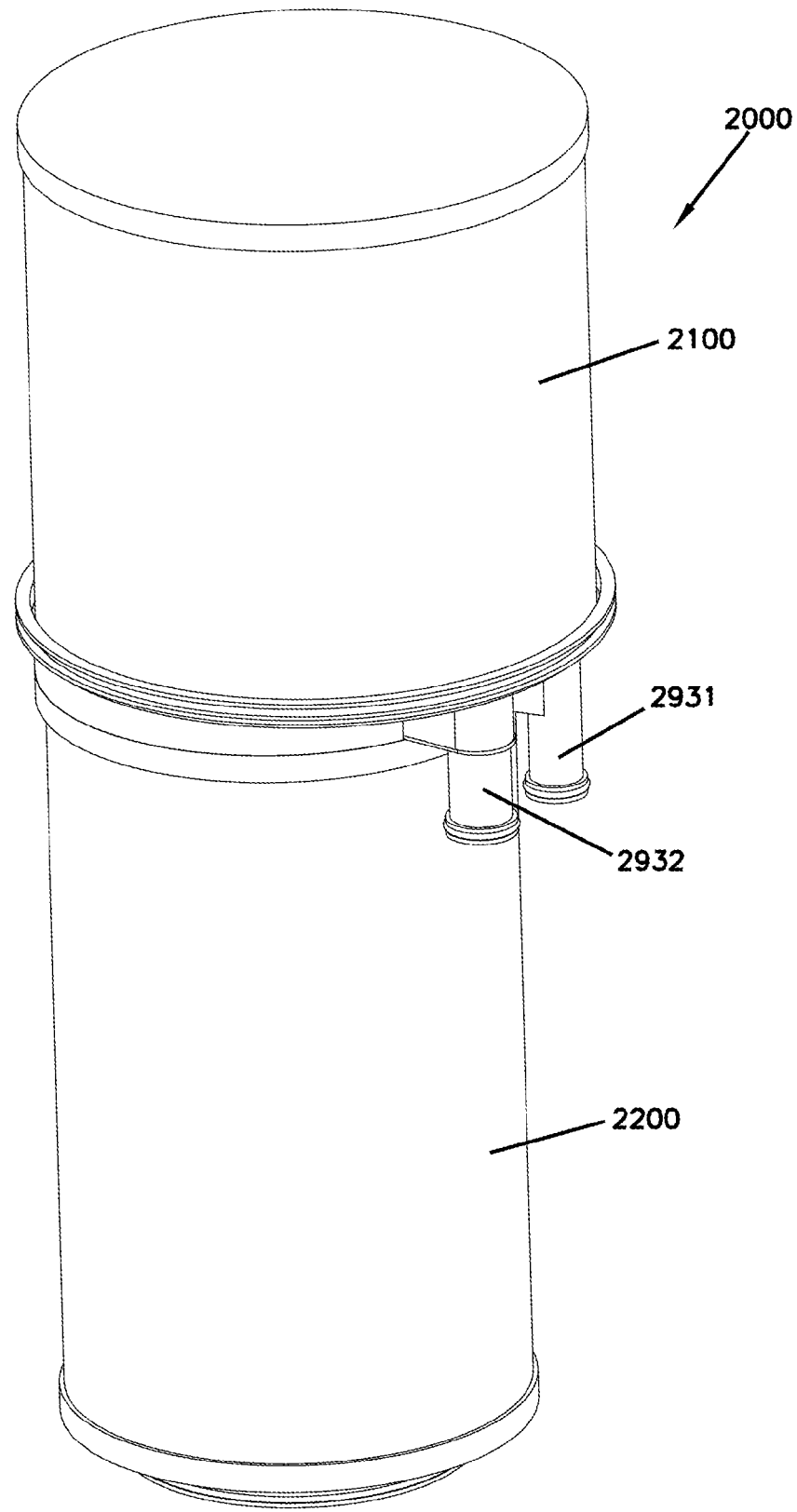
Figure 6:
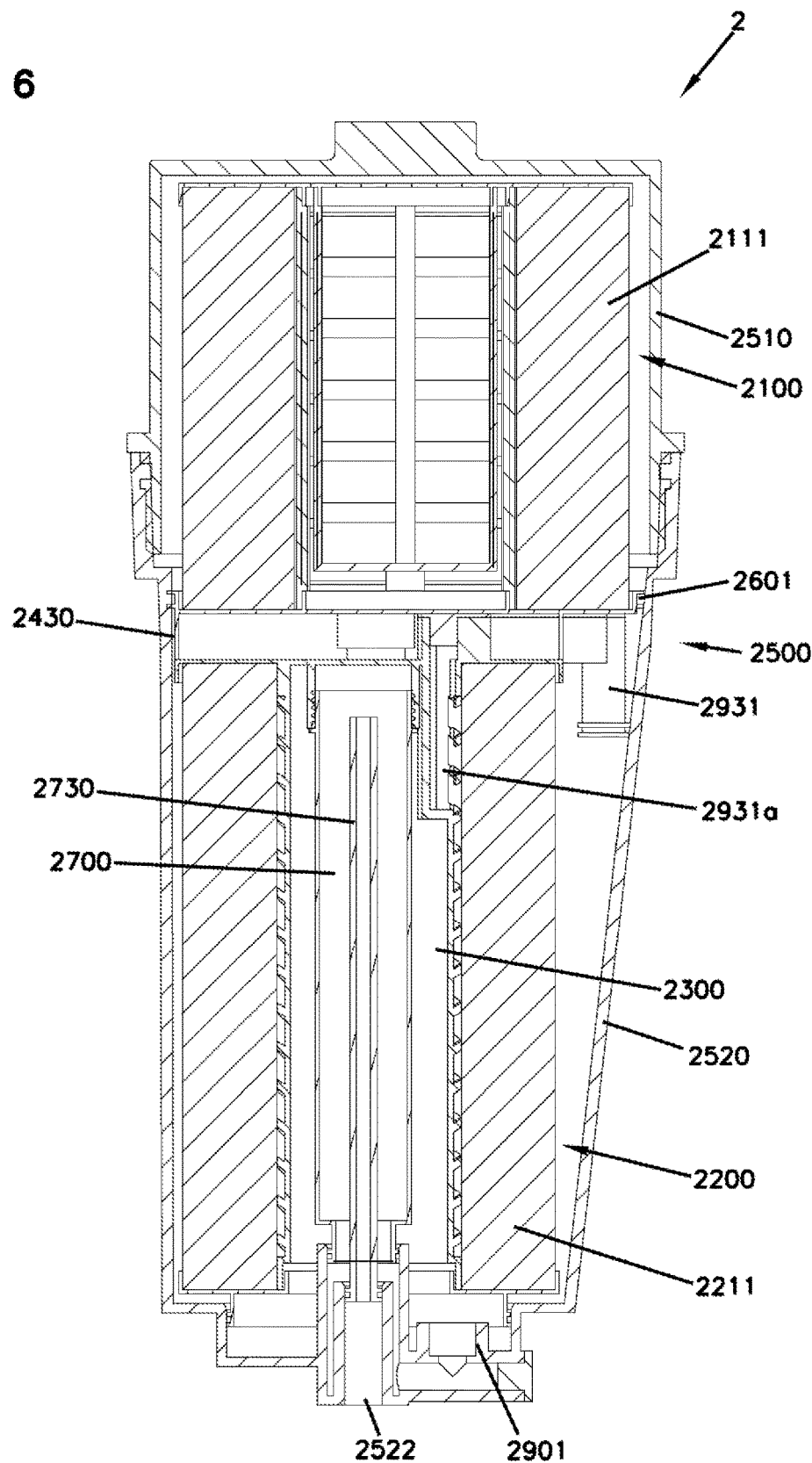
Figure 7:
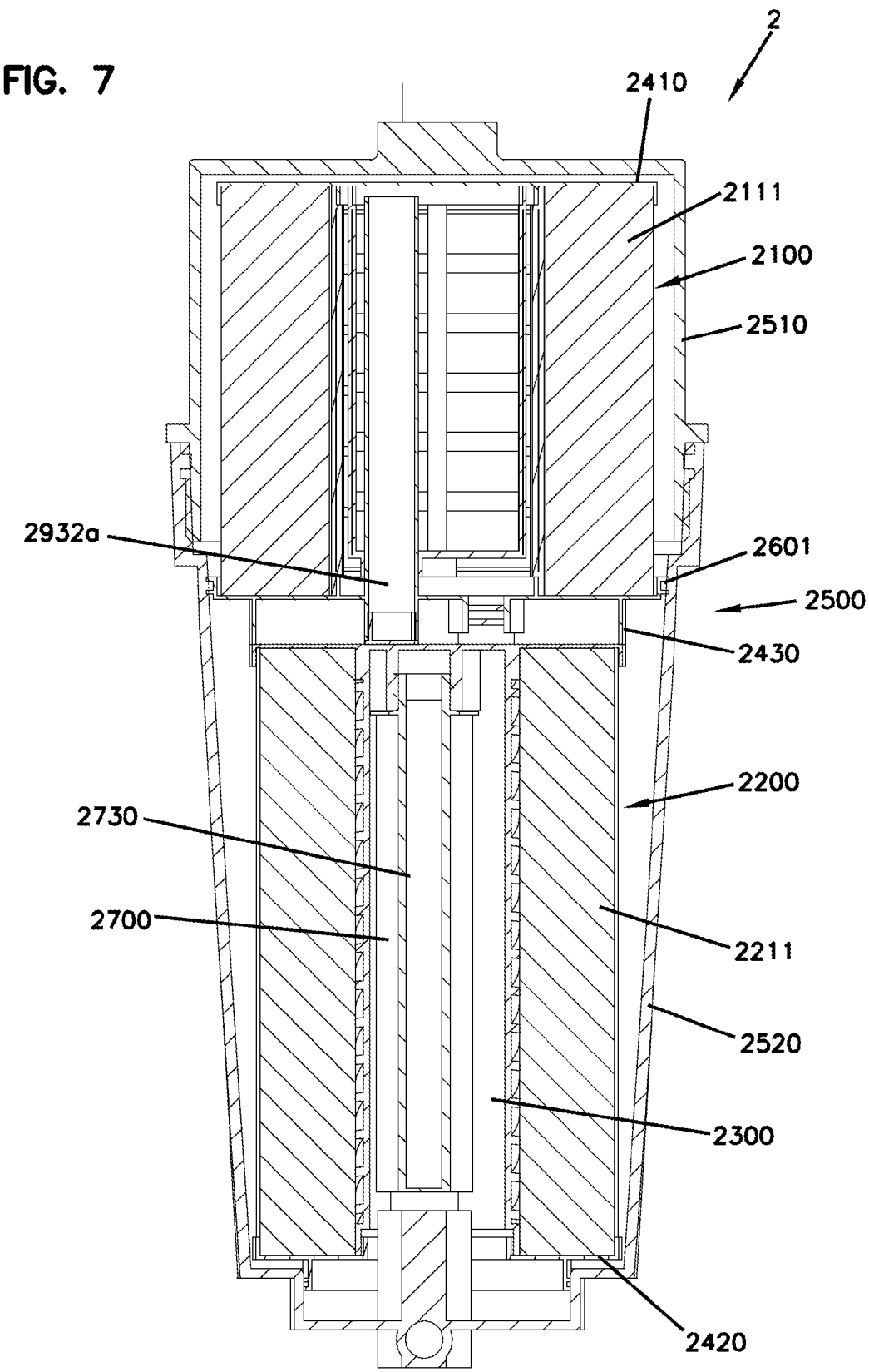
Figure 8:
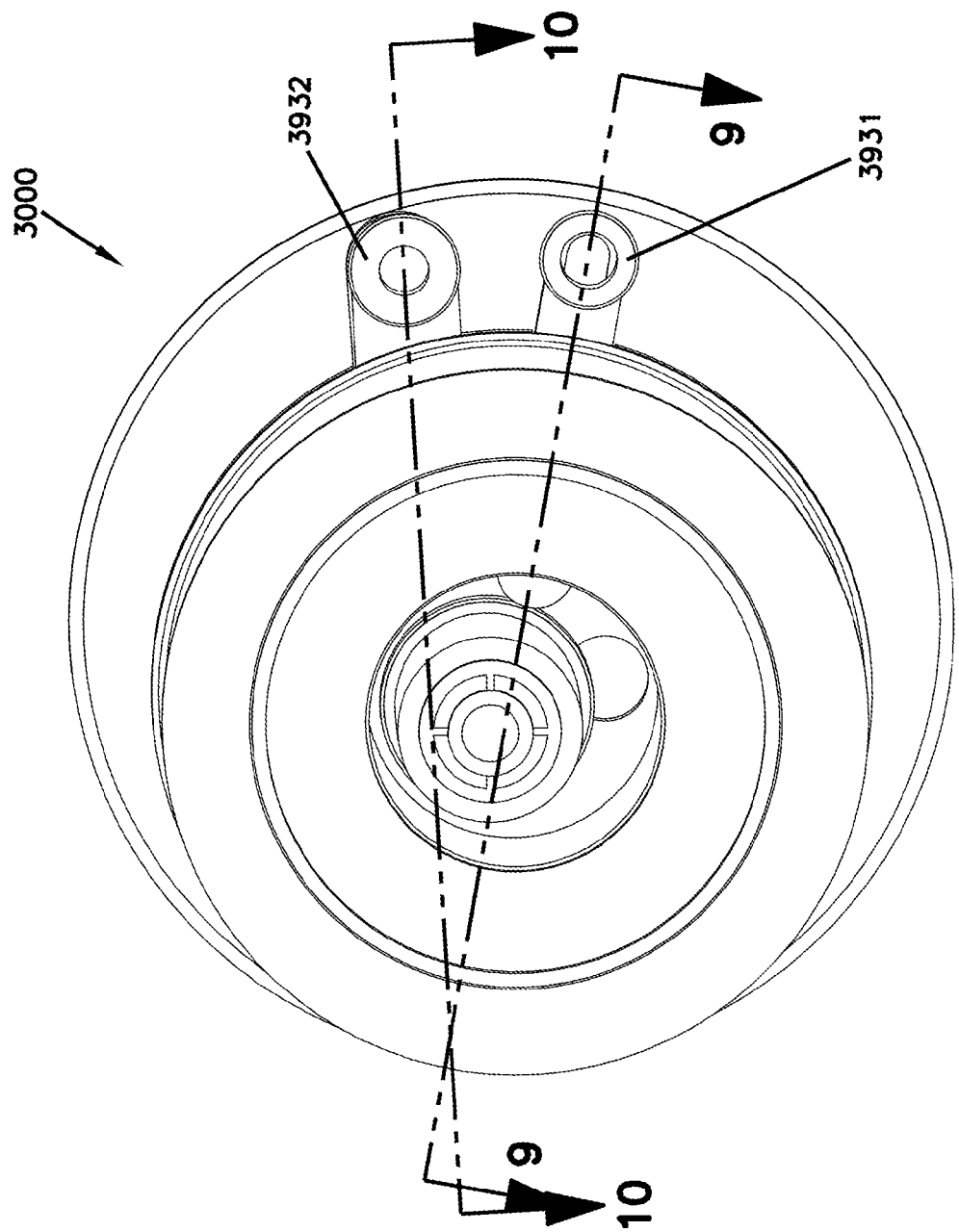
Figure 9:
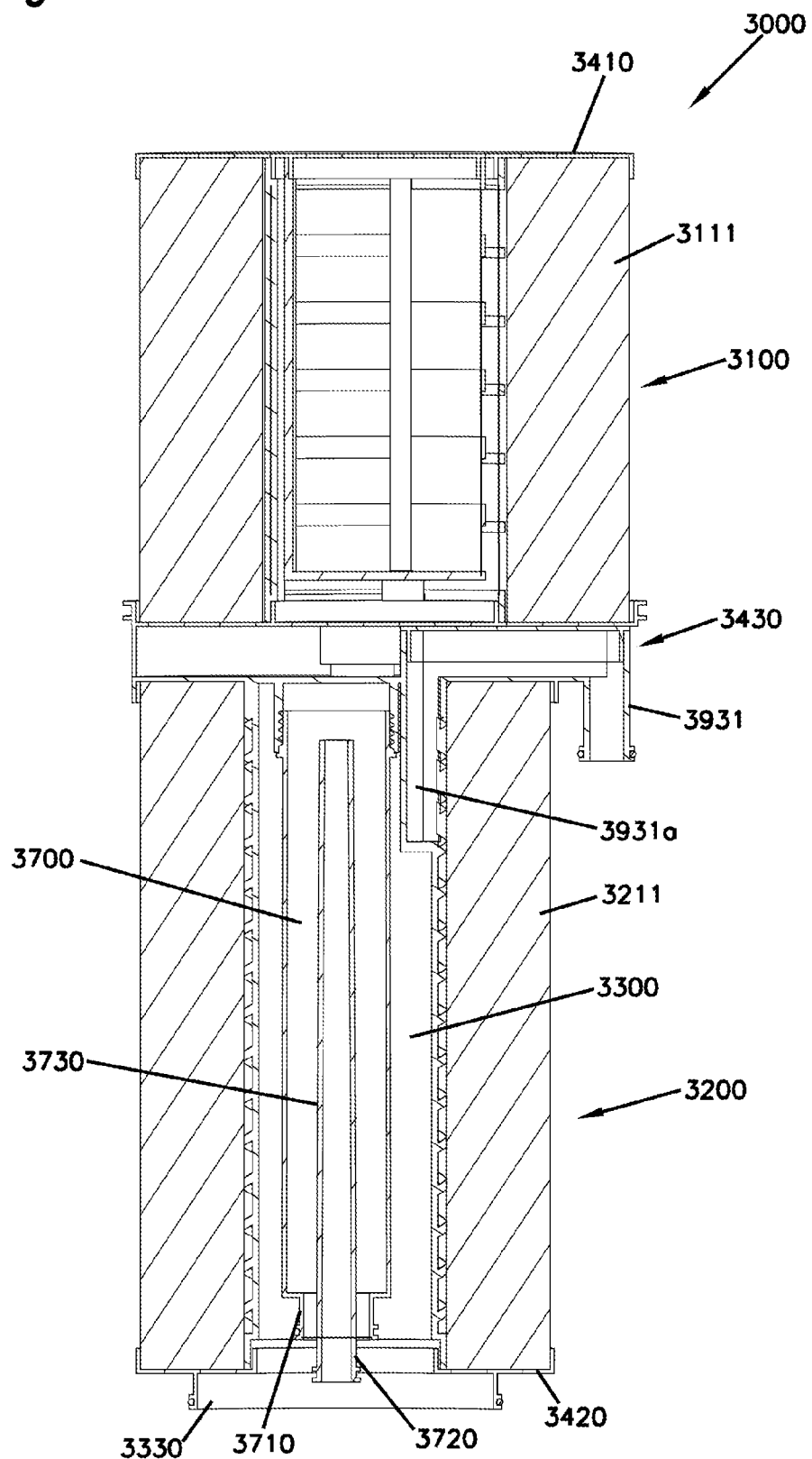
Figure 10:
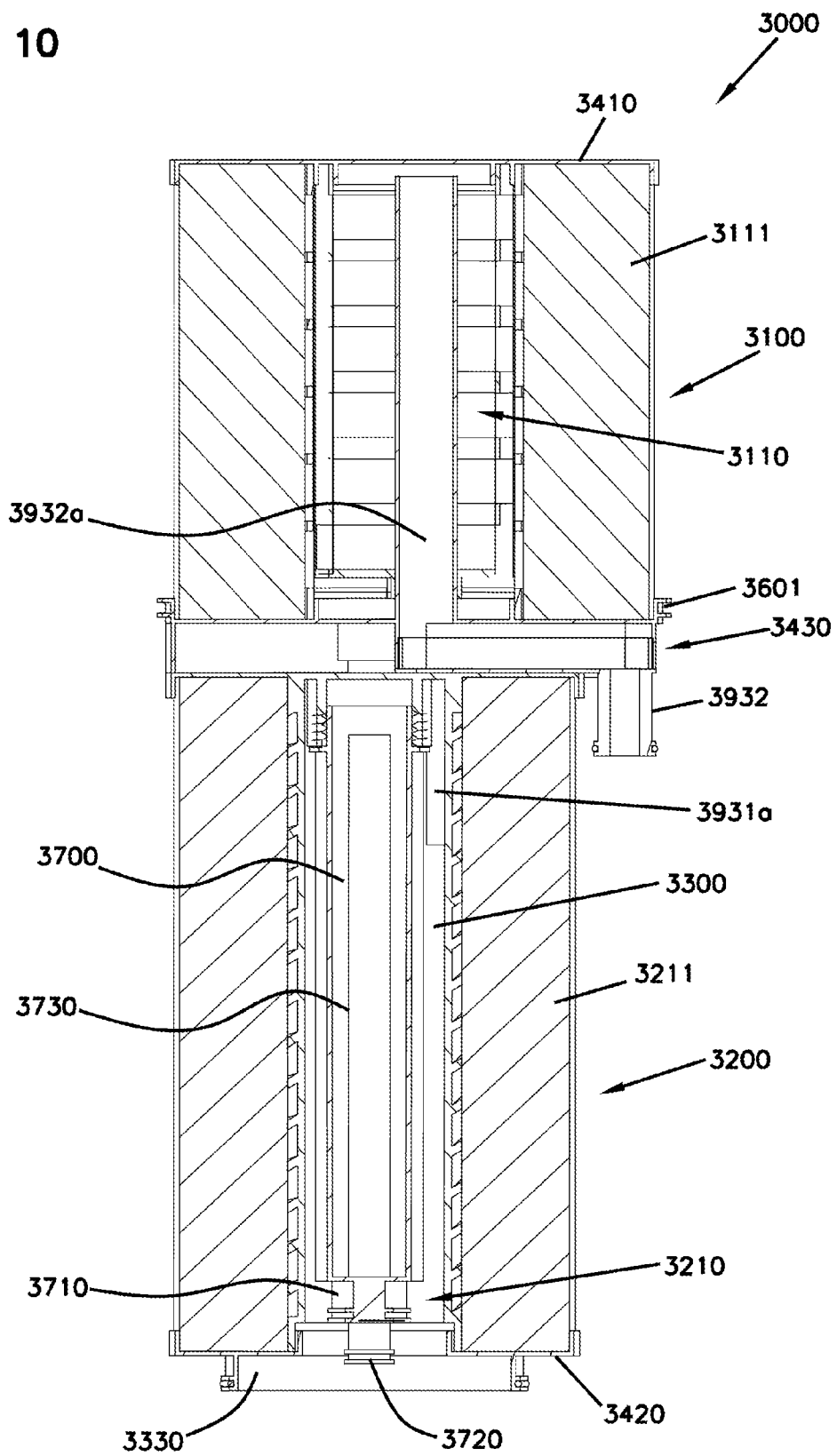
Figure 11:
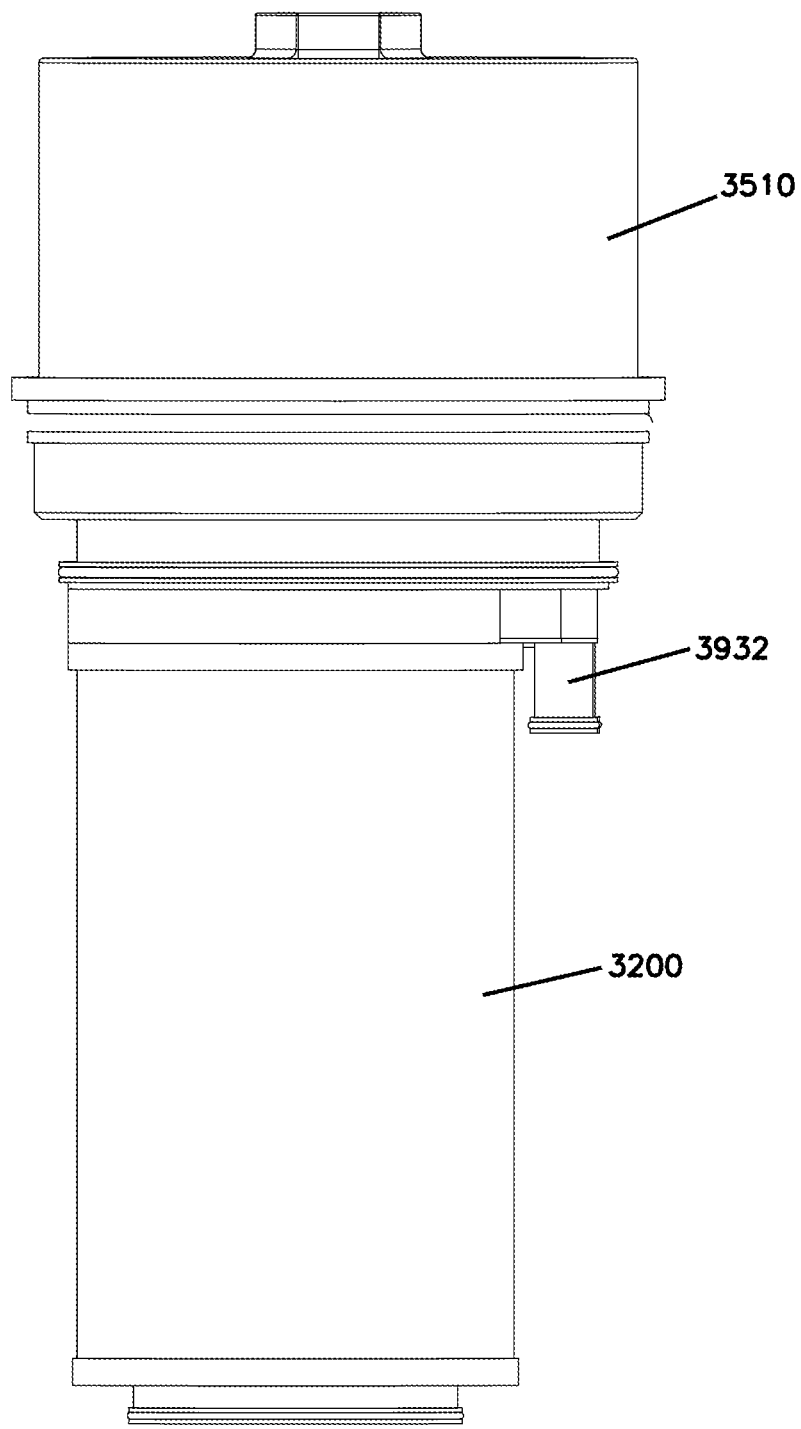
Figure 12:
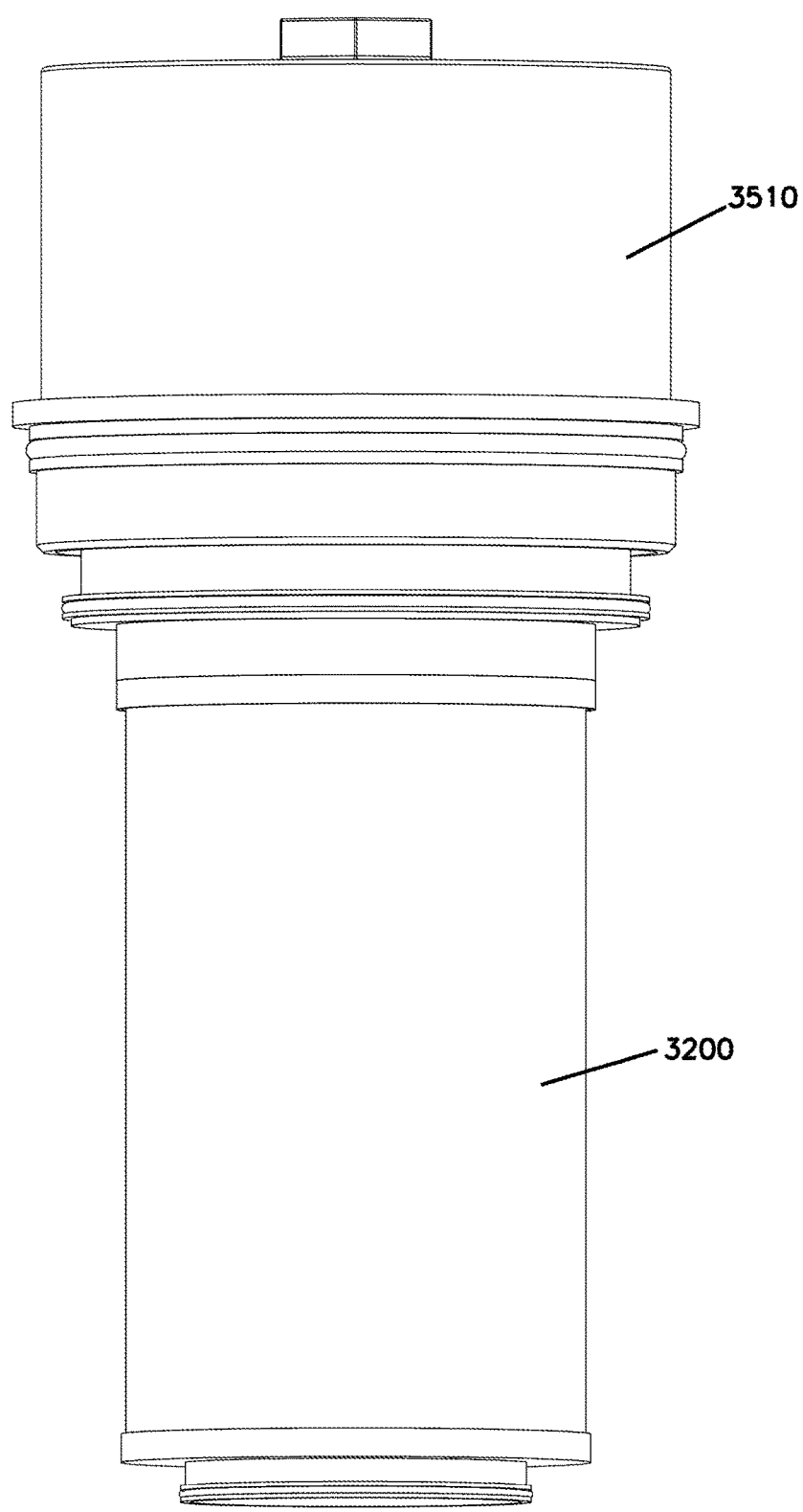
Figure 13:
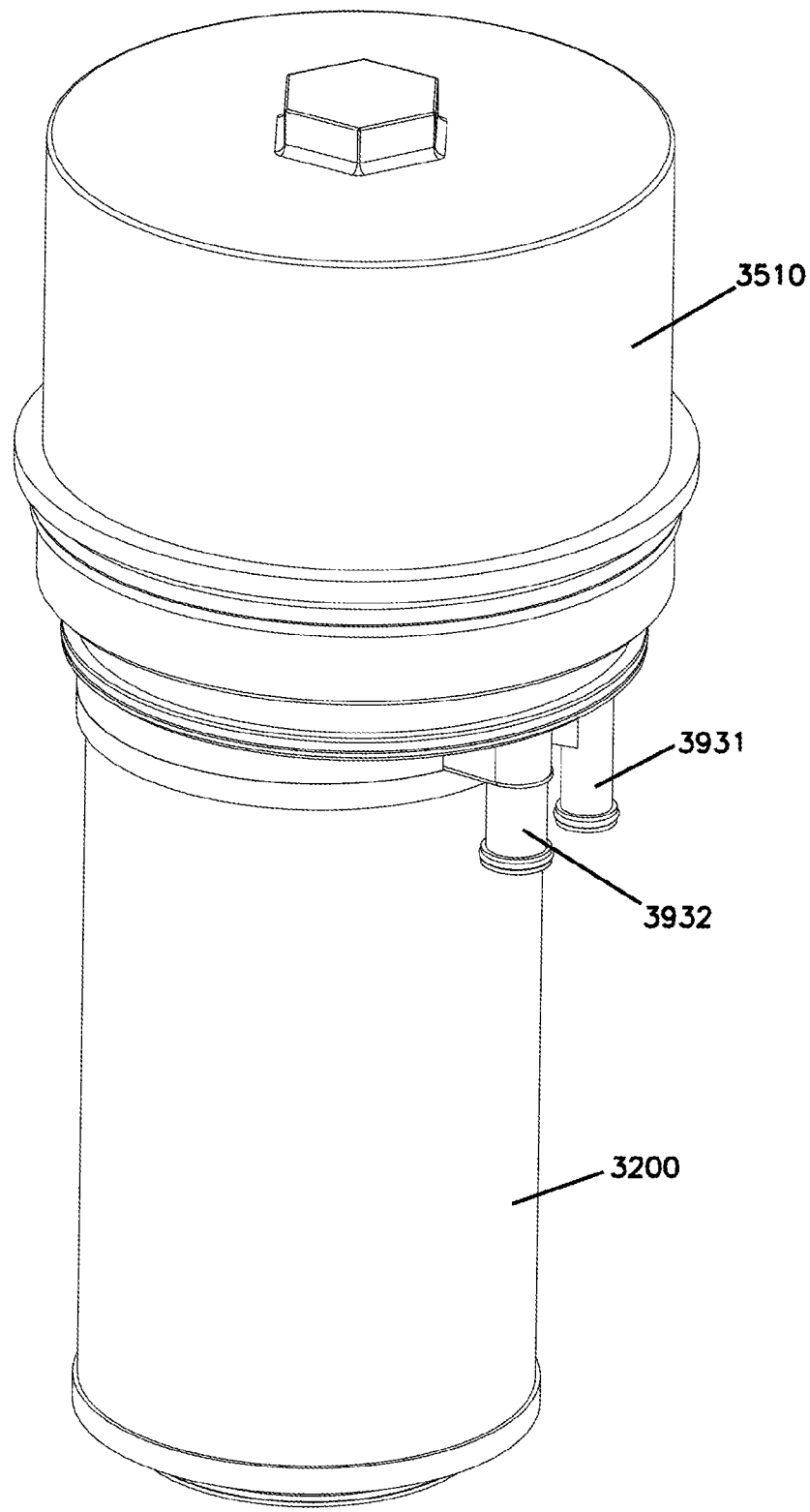
Figure 14:
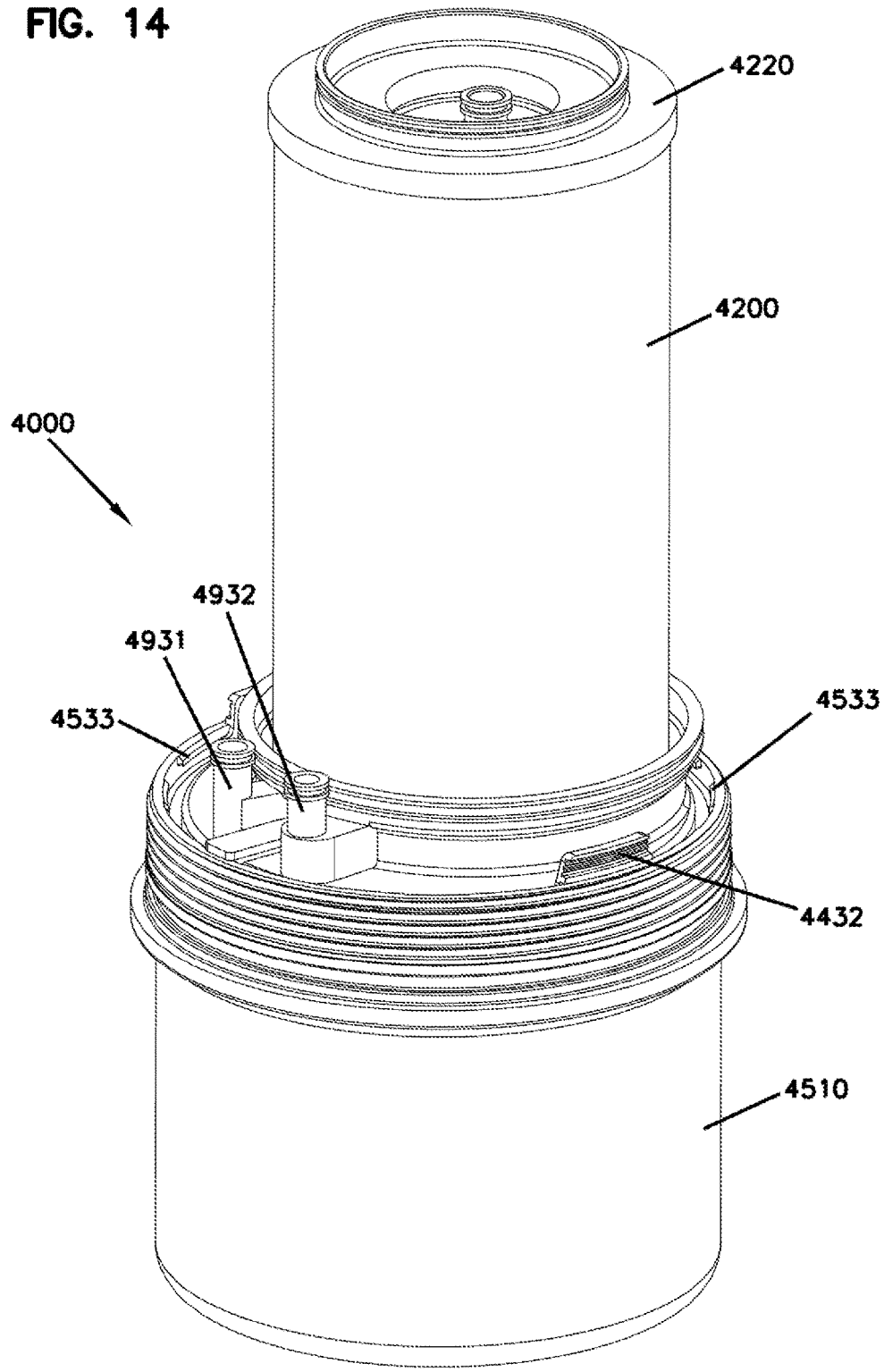
Figure 15:
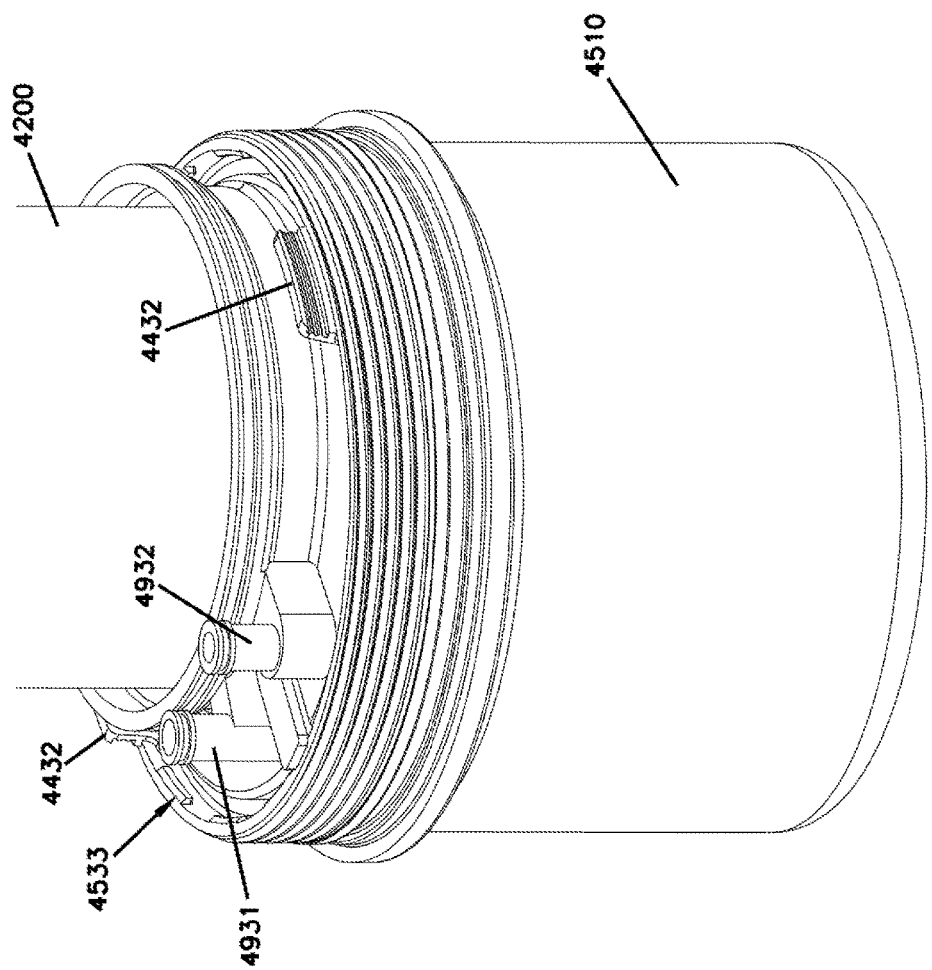
Figure 16:
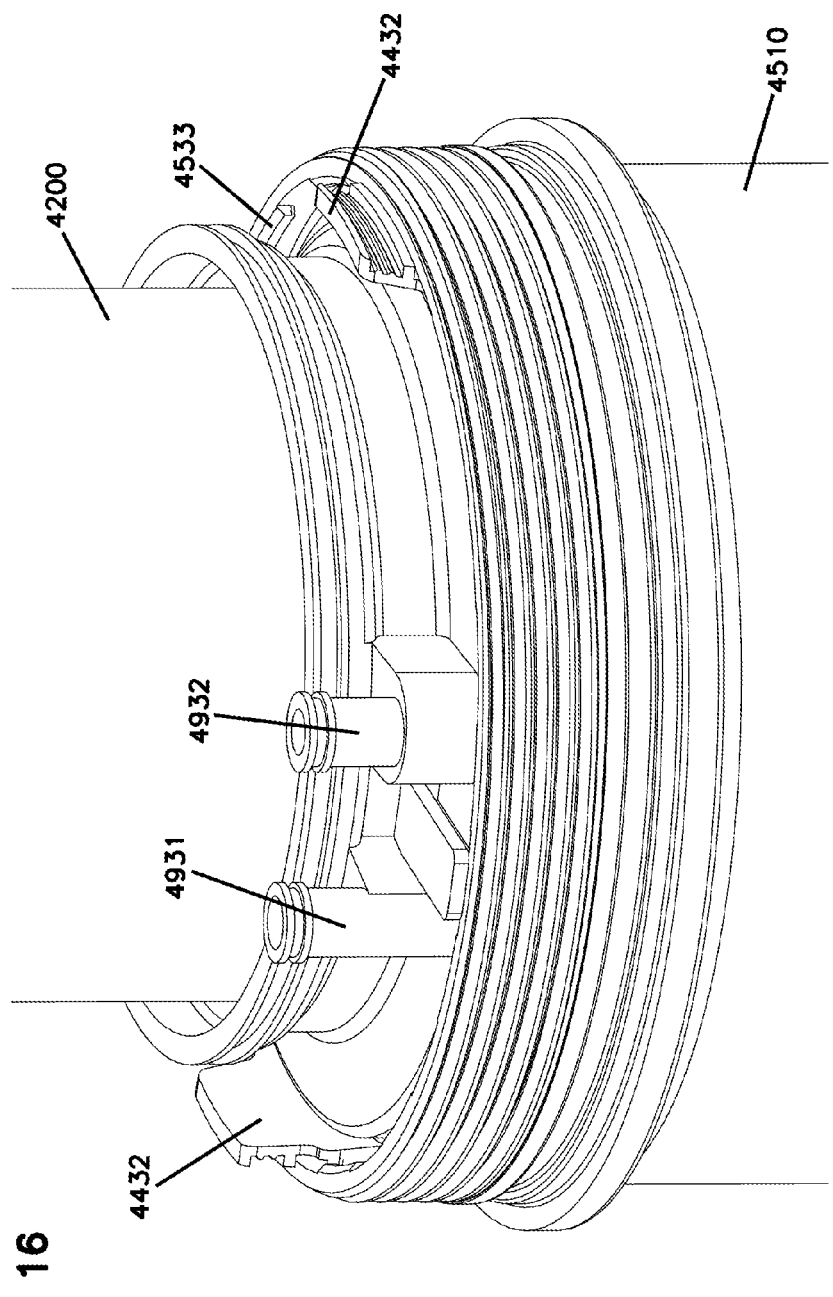
Figure 17:
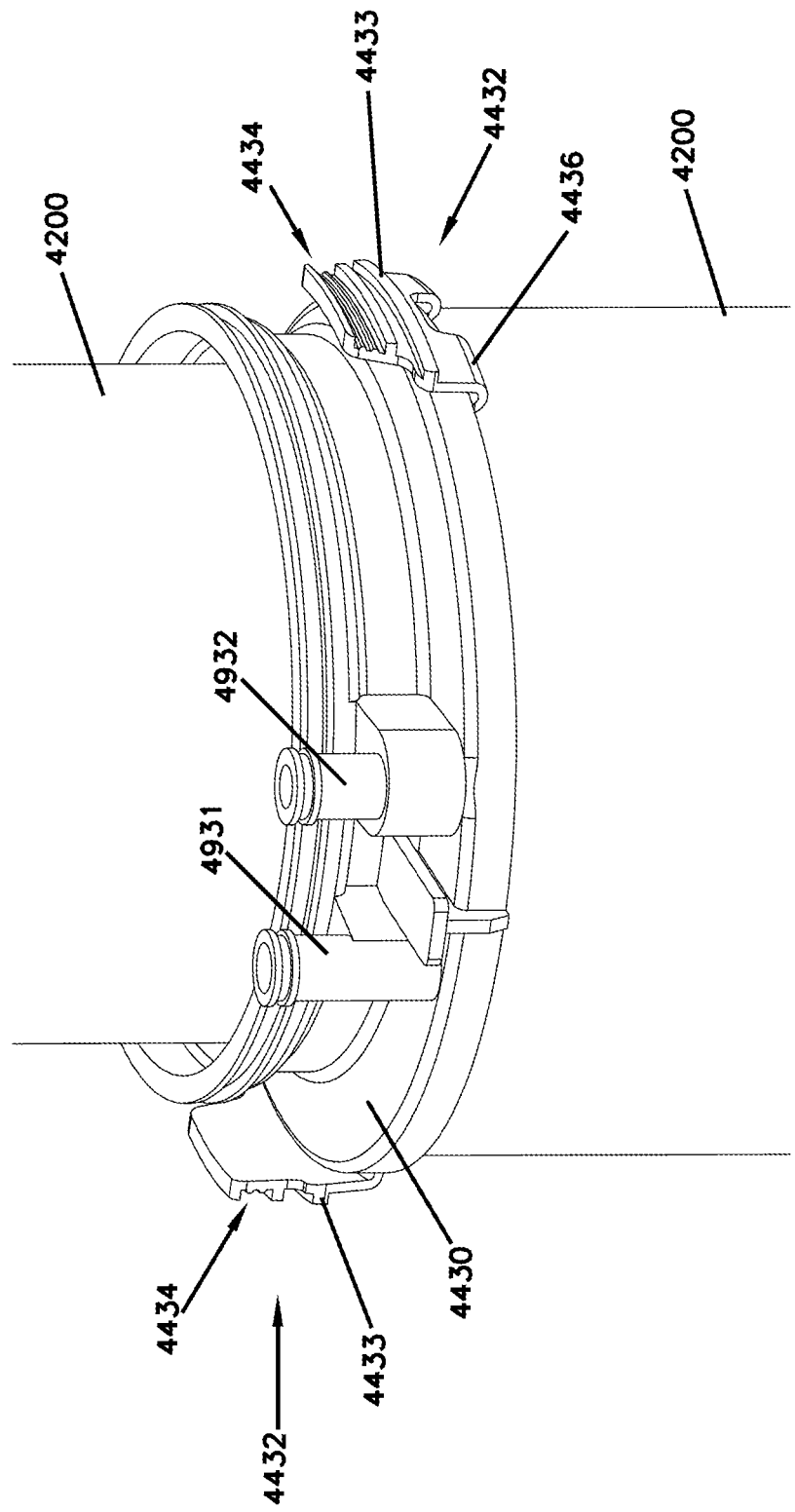
Figure 18:
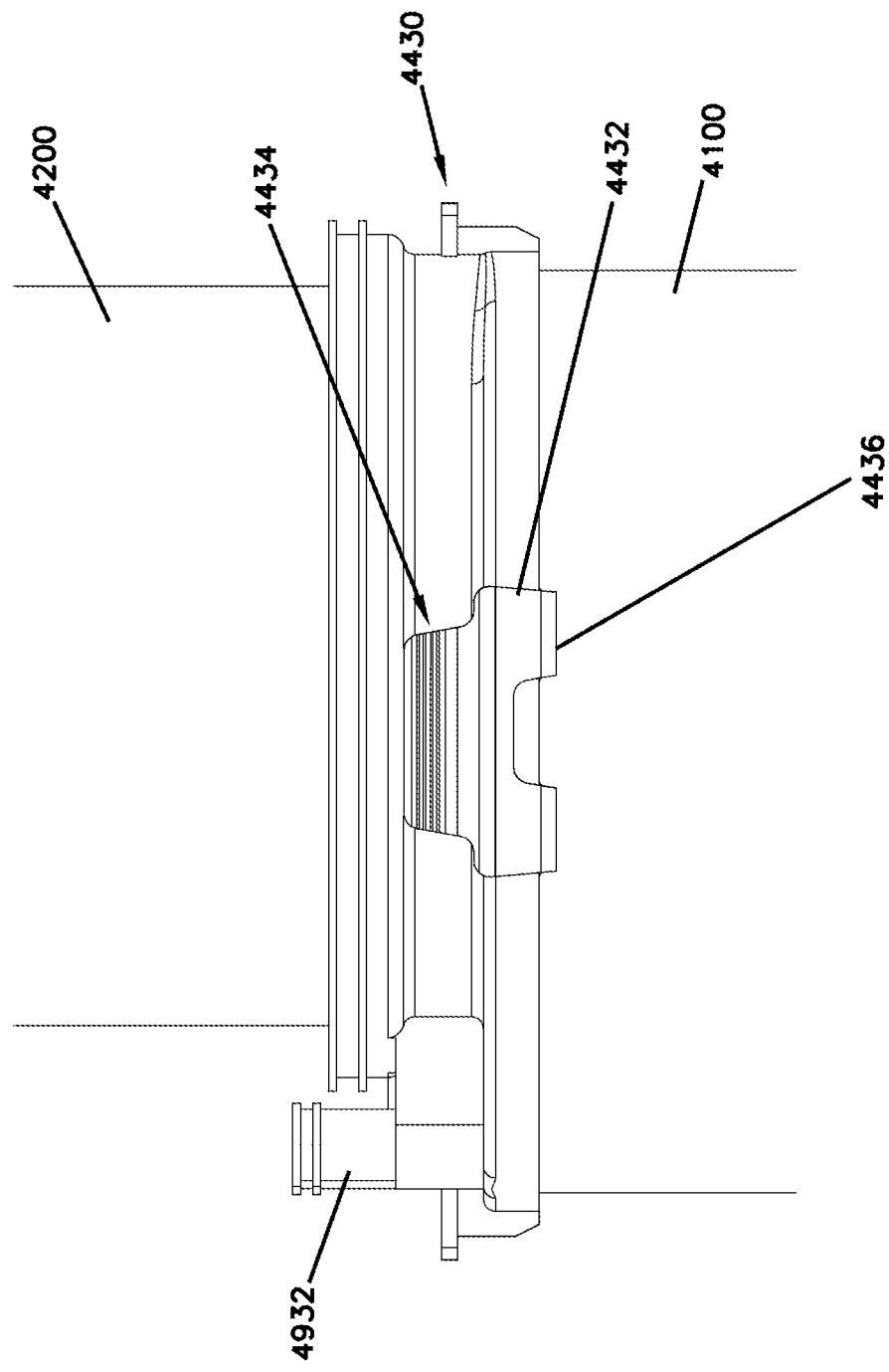
Figure 19:
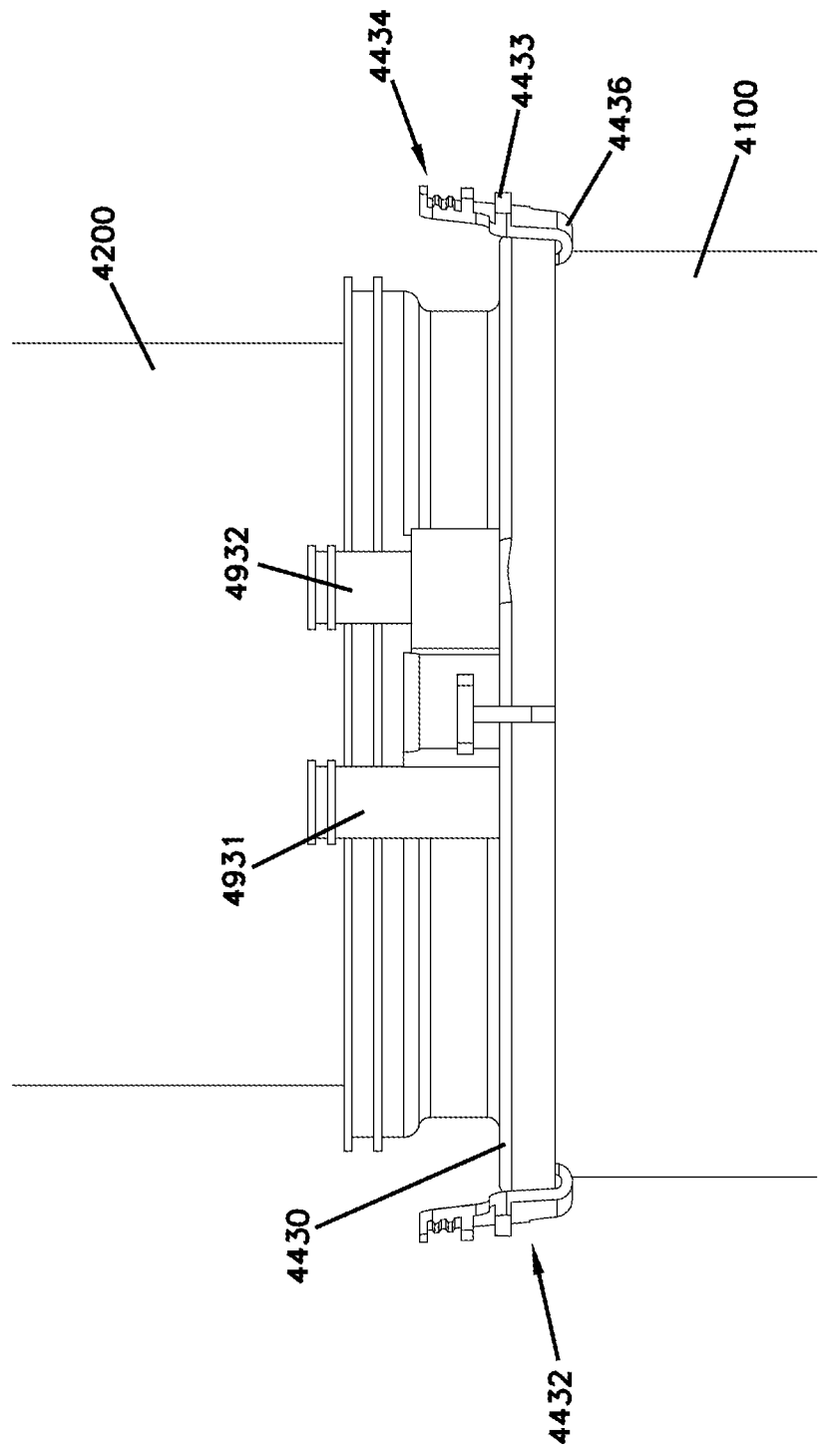
Figure 20:
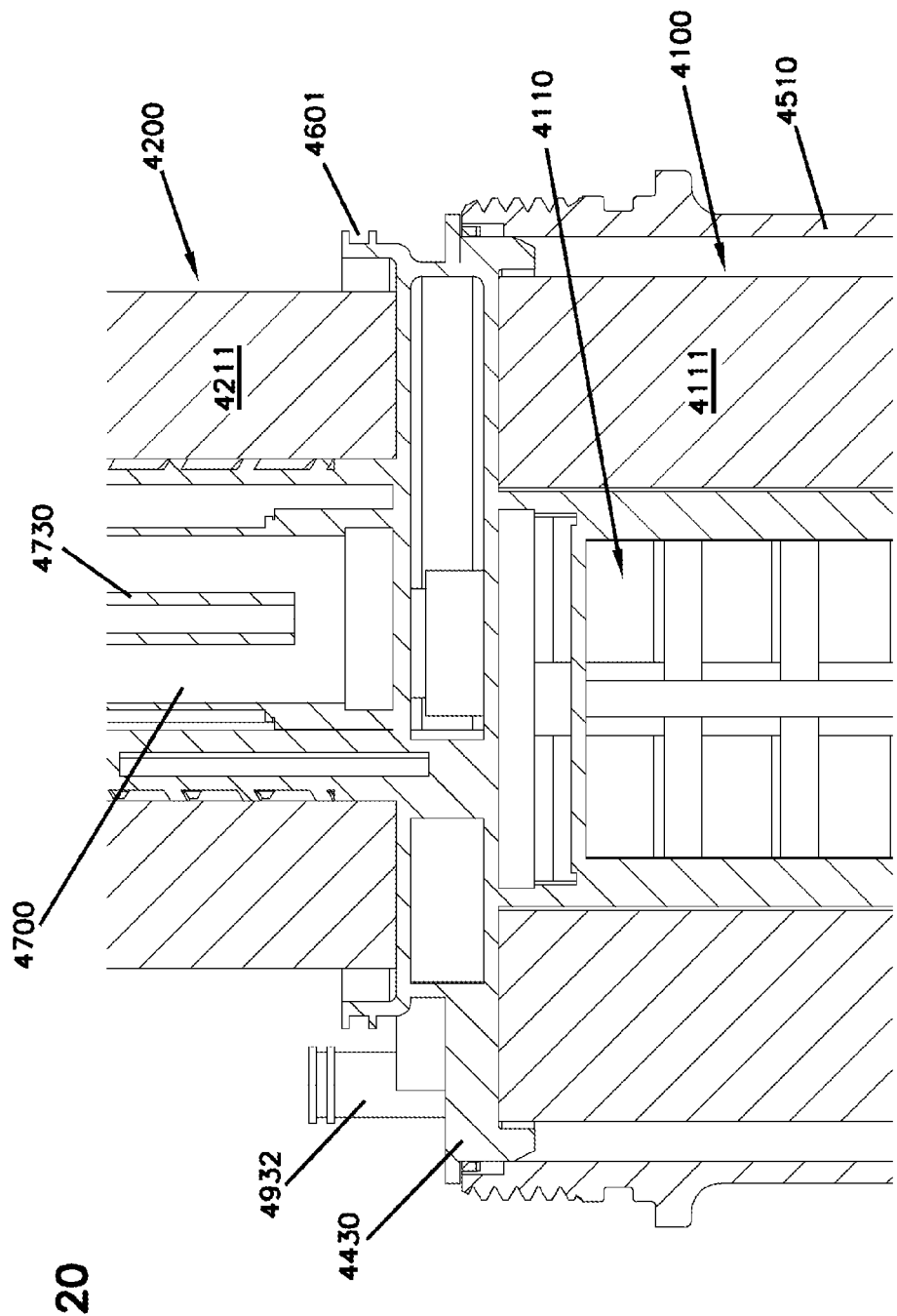
Figure 21:
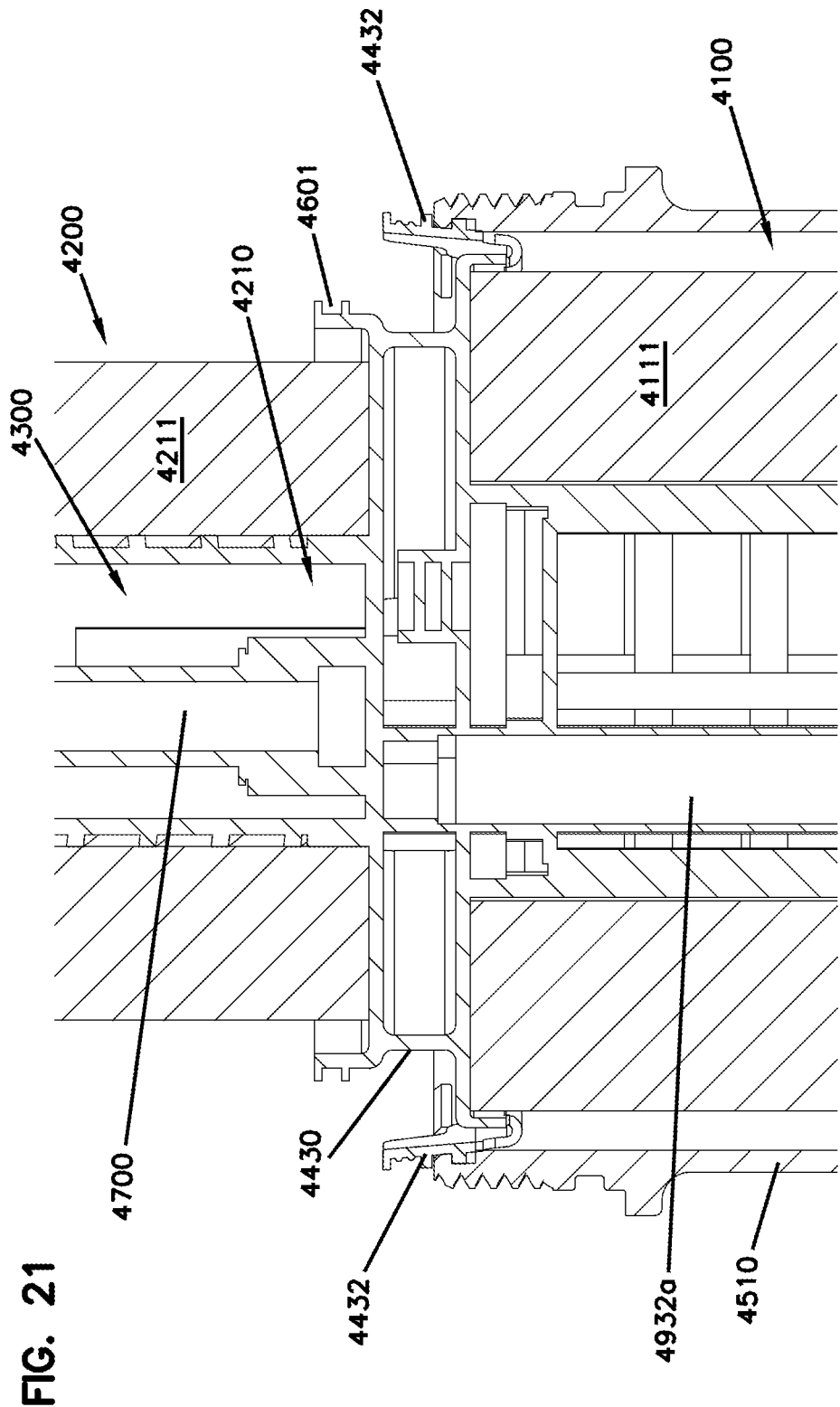
Figure 22:
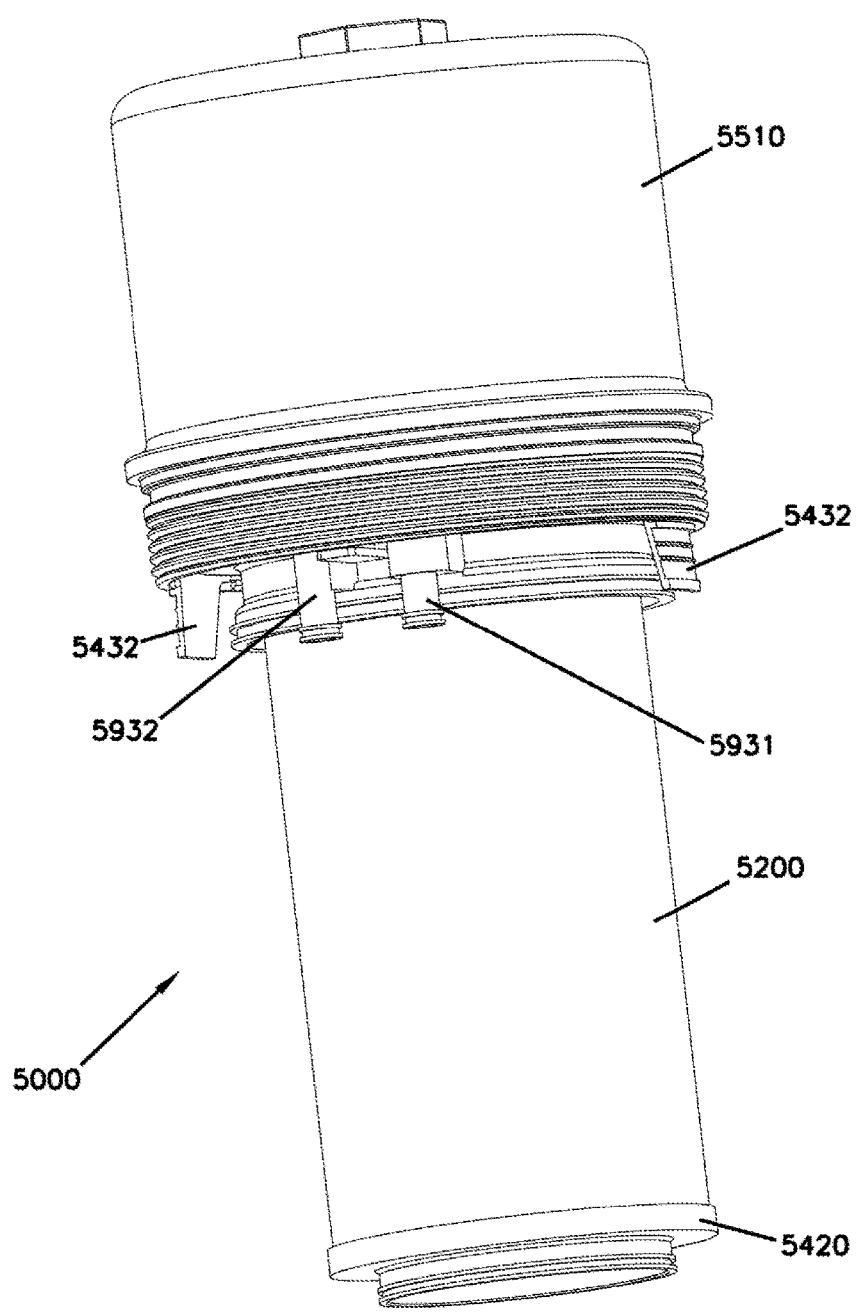
Figure 23:
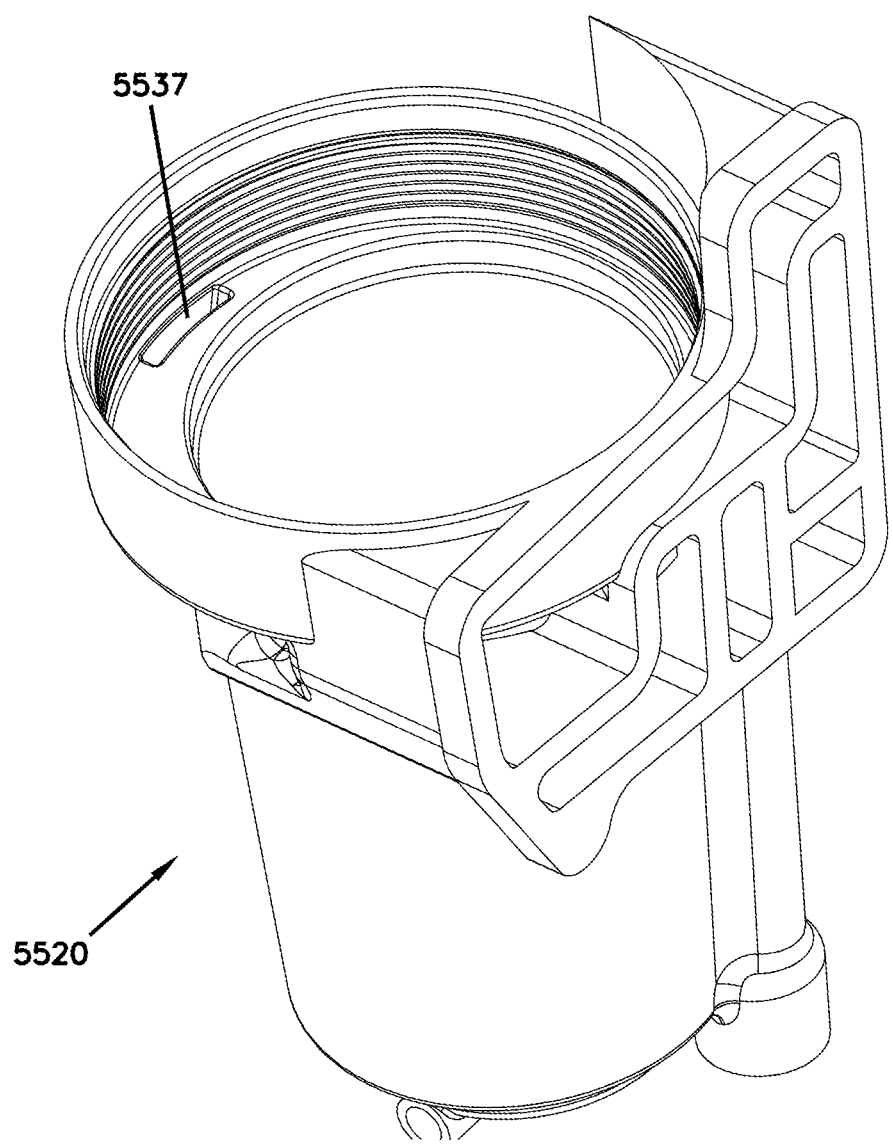
Figure 24:
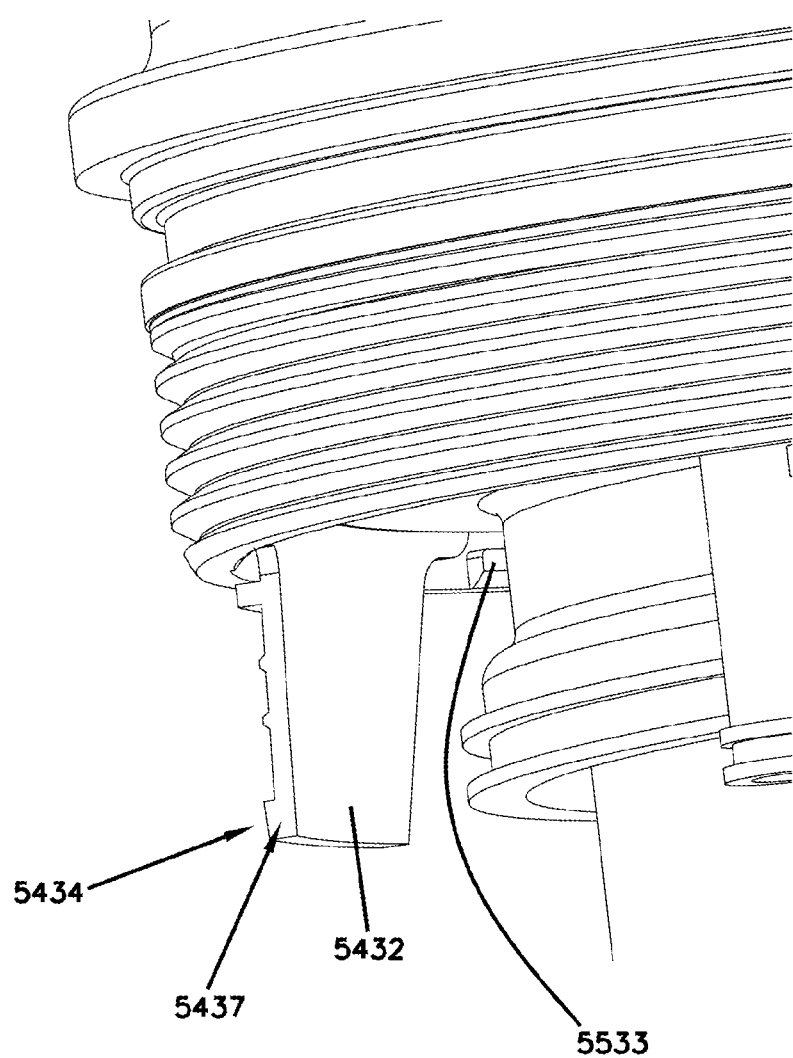
Figure 25:
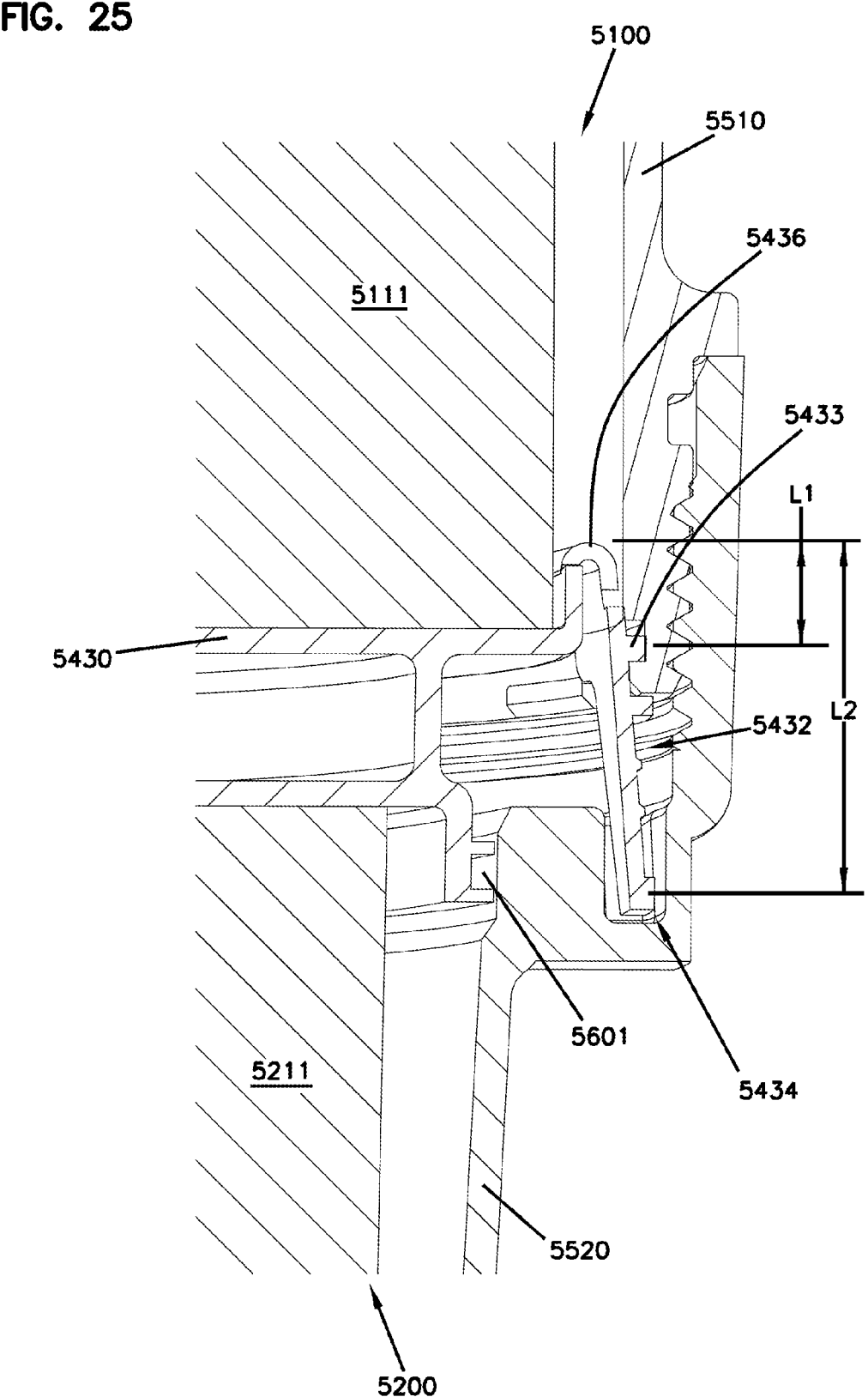
Figure 26:
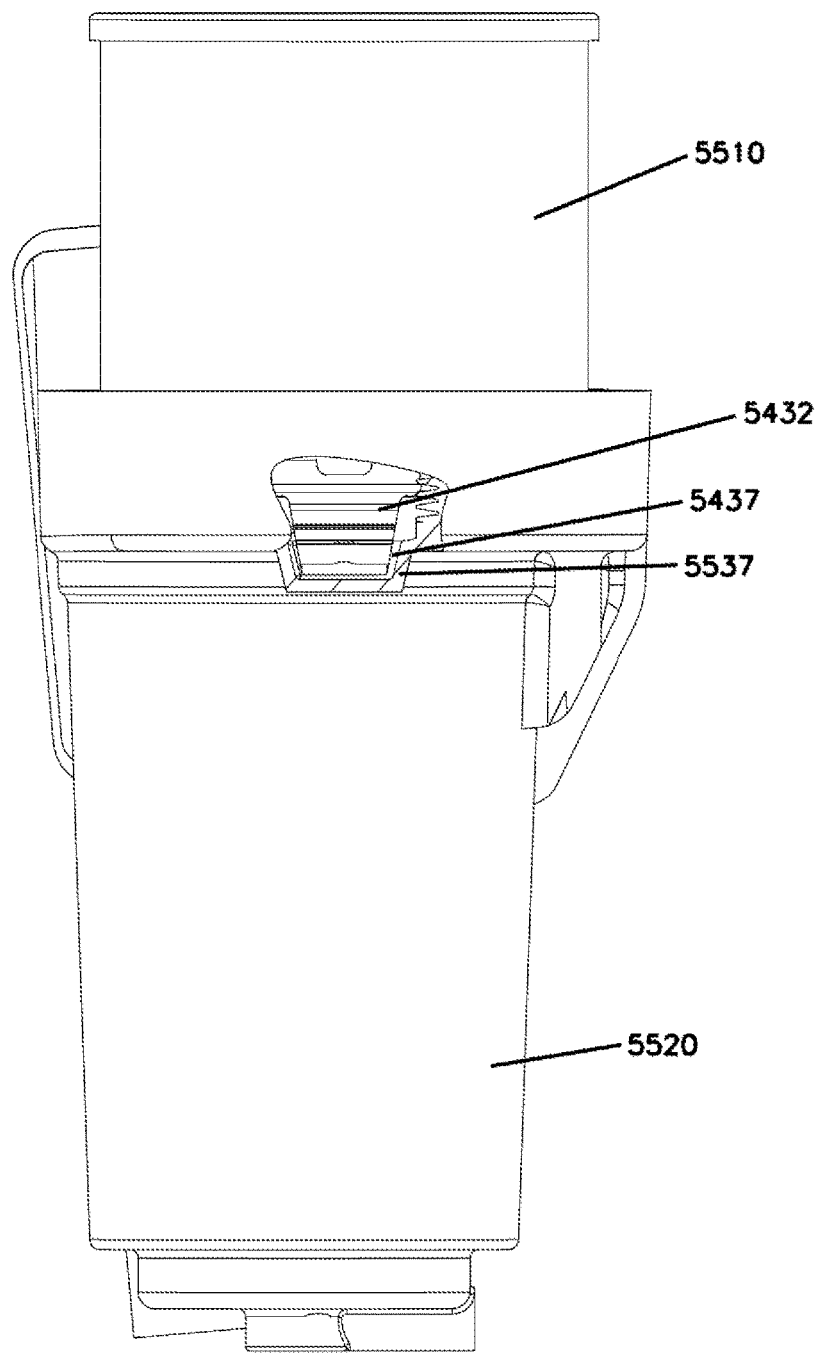
Figure 27:
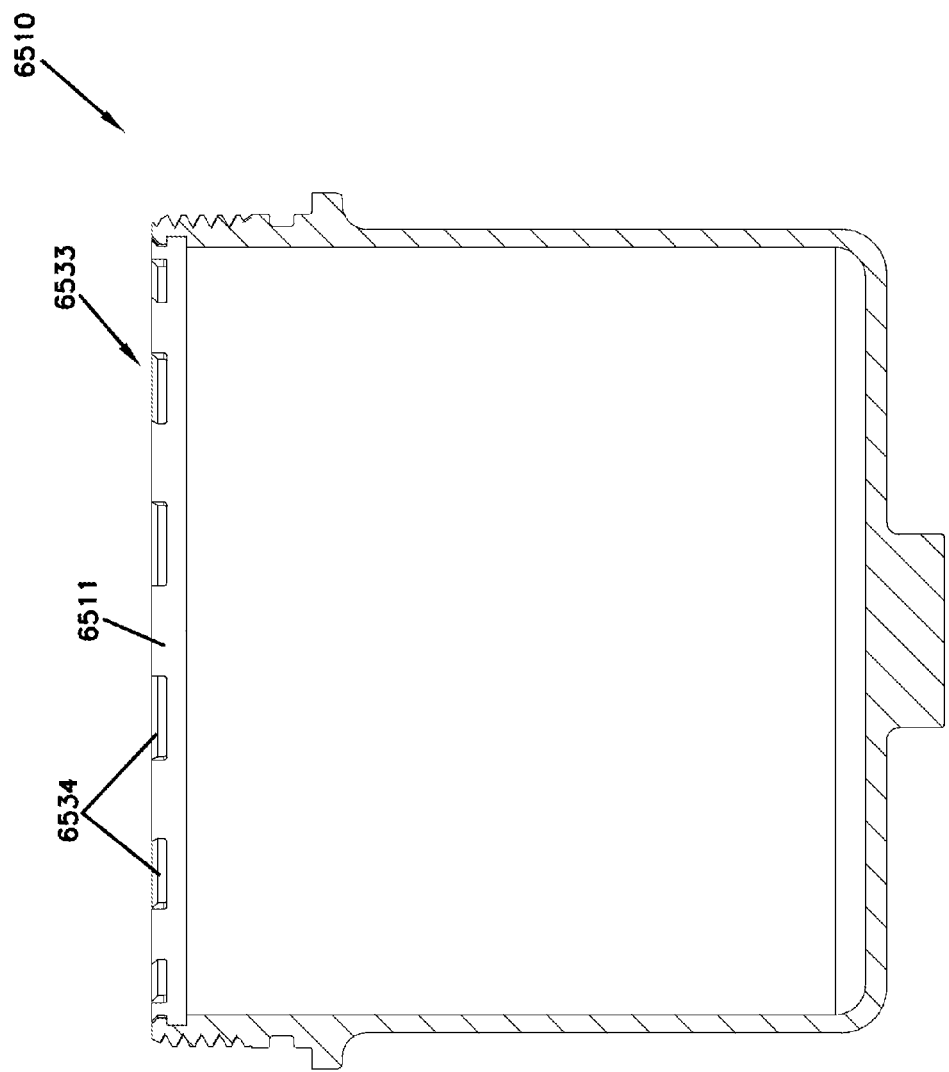

Preferred embodiments of the disclosure shall now be described with reference to the attached drawings, in which FIG. 1: shows a three-dimensional depiction of a fluid filter arrangement according to a first embodiment;

FIG. 2: shows a first longitudinal section through the fluid filter arrangement of FIG. 1;

FIG. 3: shows a second longitudinal section of the fluid filter arrangement of to FIG. 1;

FIG. 4: shows a cross-section of the fluid filter arrangement of FIG. 1;

FIG. 5: shows a three-dimensional depiction of a fluid filter cartridge according to a second embodiment;

FIG. 6: shows a first longitudinal section of the fluid filter cartridge of FIG. 5;

FIG. 7: shows a second longitudinal section of the fluid filter cartridge of FIG. 5;

FIG. 8: shows an angled bottom view of a fluid filter cartridge according to a third embodiment;

FIG. 9: shows a first longitudinal cross-section of the fluid filter cartridge of FIG. 8;

FIG. 10: shows a second longitudinal section of the fluid filter cartridge of FIG. 8;

FIG. 11: shows a side view of the fluid filter cartridge of FIG. 8 with an access cover;

FIG. 12: shows a back view of the fluid filter cartridge of FIG. 8 with an access cover;

FIG. 13: shows a three-dimensional depiction of the fluid filter cartridge of FIG. 8 with an access cover;

FIG. 14: shows a three-dimensional depiction of a fluid filter cartridge according to a fourth embodiment with an access cover in an orientation opposite to the operational orientation of the fluid filter cartridge;

FIG. 15: shows an enlarged view of a part of the fluid filter cartridge of FIG. 14;

FIG. 16: shows a further enlarged view of a part of the fluid filter cartridge of FIG. 15;

FIG. 17: shows a depiction according to FIG. 16 without the access cover;

FIG. 18: shows a first side view of a part of the filter cartridge of FIG. 14 without the access cover;

FIG. 19: shows a further side view of a part of the filter cartridge of FIG. 14 without the access cover;

FIG. 20: shows a part of a first longitudinal section of the fluid filter cartridge of FIG. 14;

FIG. 21: shows a part of a second longitudinal section of the filter cartridge of FIG. 14;

FIG. 22: shows a three-dimensional depiction of a fluid filter cartridge according to a fifth embodiment with an access cover;

FIG. 23: shows a three-dimensional depiction of a filter cartridge receiving space of a housing for the fluid filter cartridge of FIG. 22;

FIG. 24: shows an enlarged detail of FIG. 22;

FIG. 25: shows a part of a longitudinal section of the filter cartridge of FIG. 22;

FIG. 26: shows a side view of the filter cartridge of FIG. 22 installed in the housing of FIG. 23 with a partial cut-out;

FIG. 27: shows a longitudinal section of an access cover;

FIG. 28: shows a three-dimensional depiction of the access cover of FIG. 27; and FIG. 29: shows an enlarged detail of FIG. 28.

Figure 30:
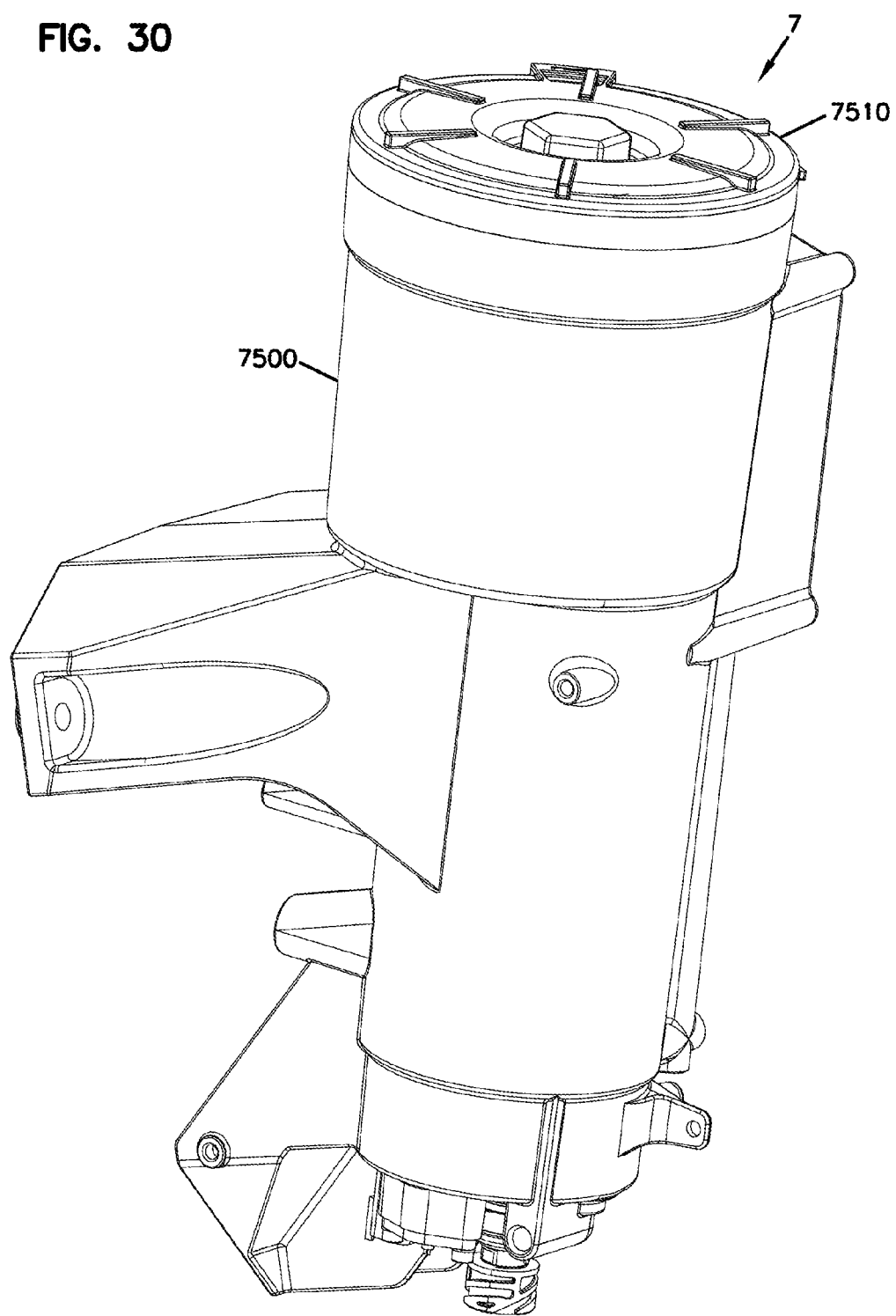
Figure 31:
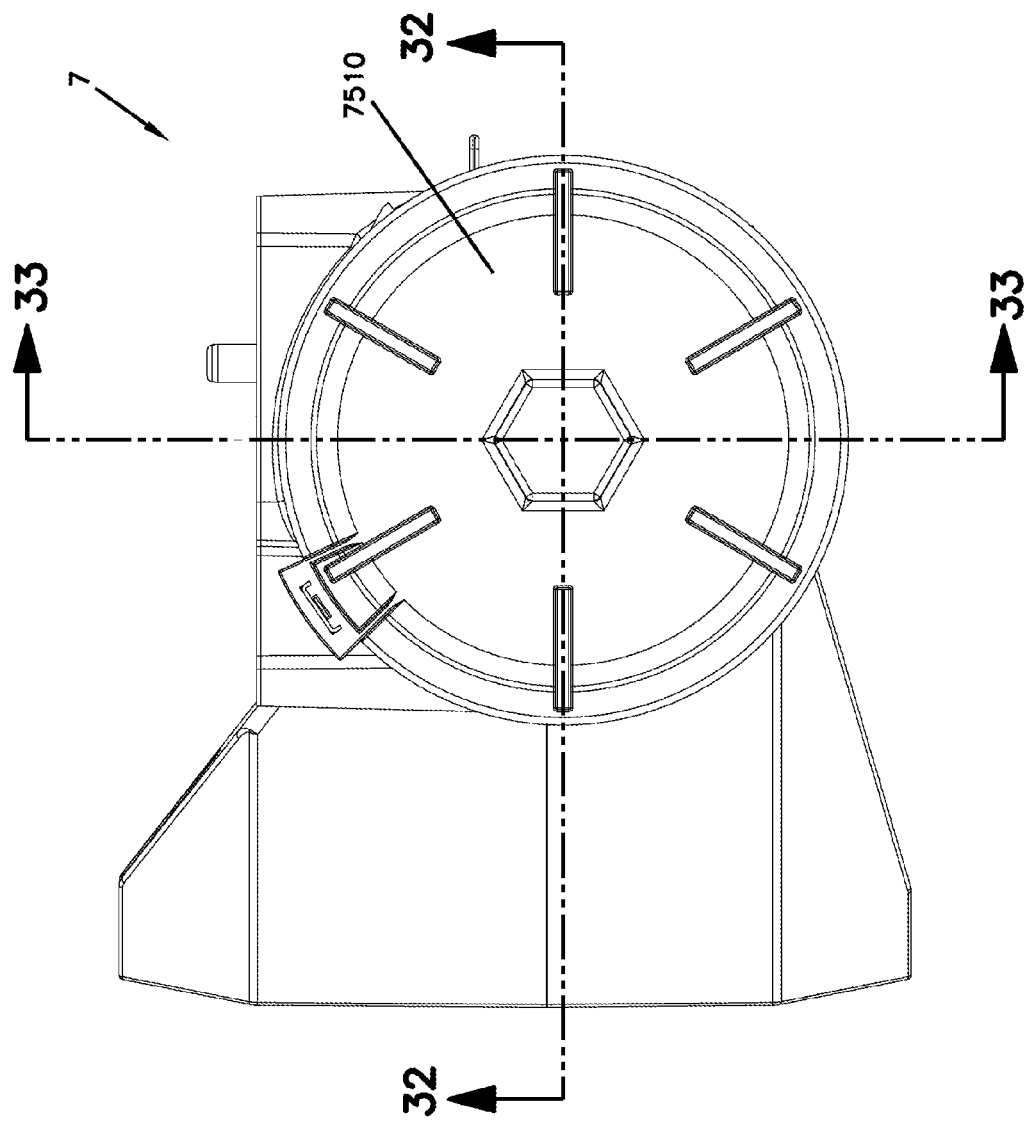
Figure 32:
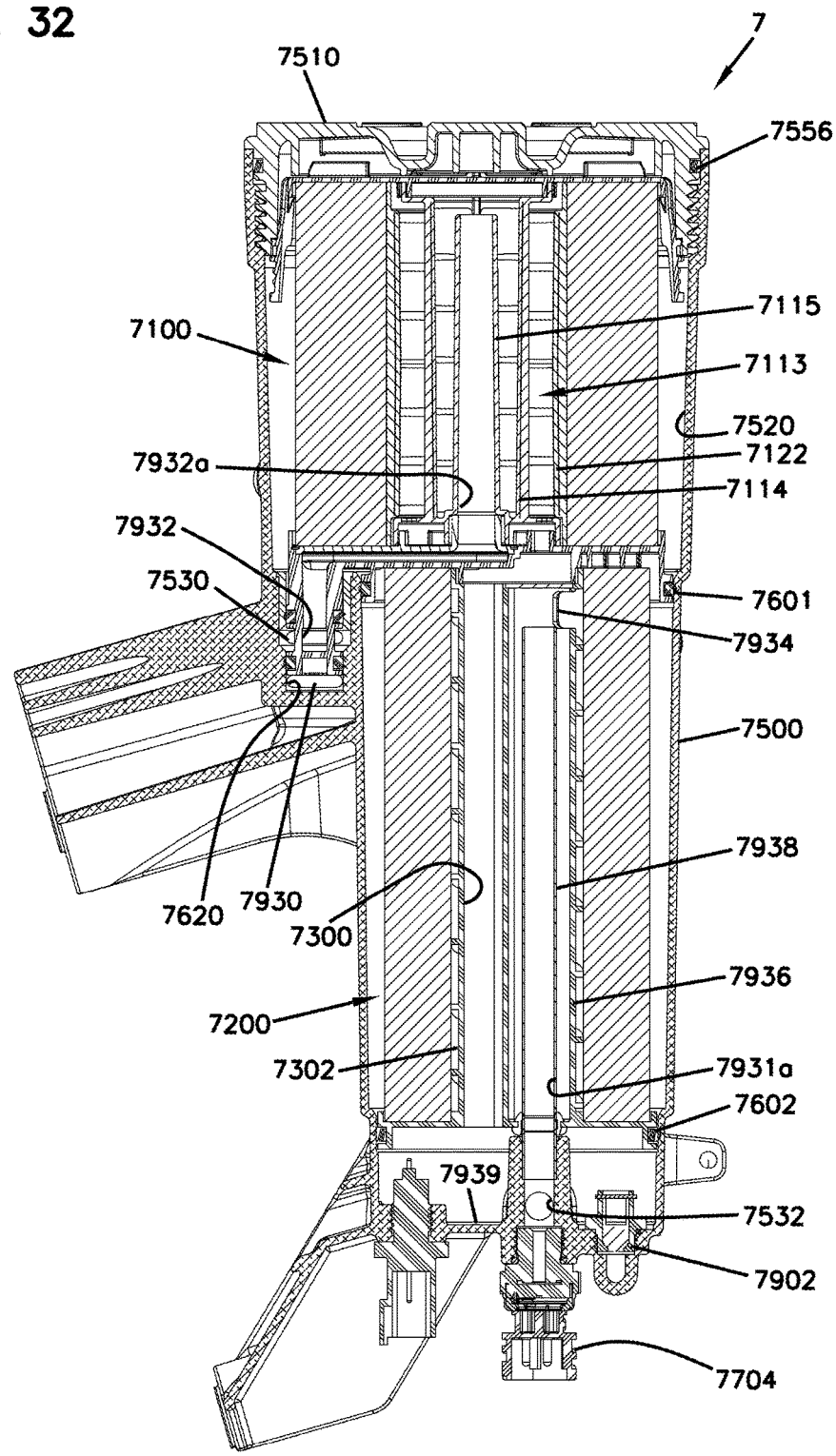
Figure 33:
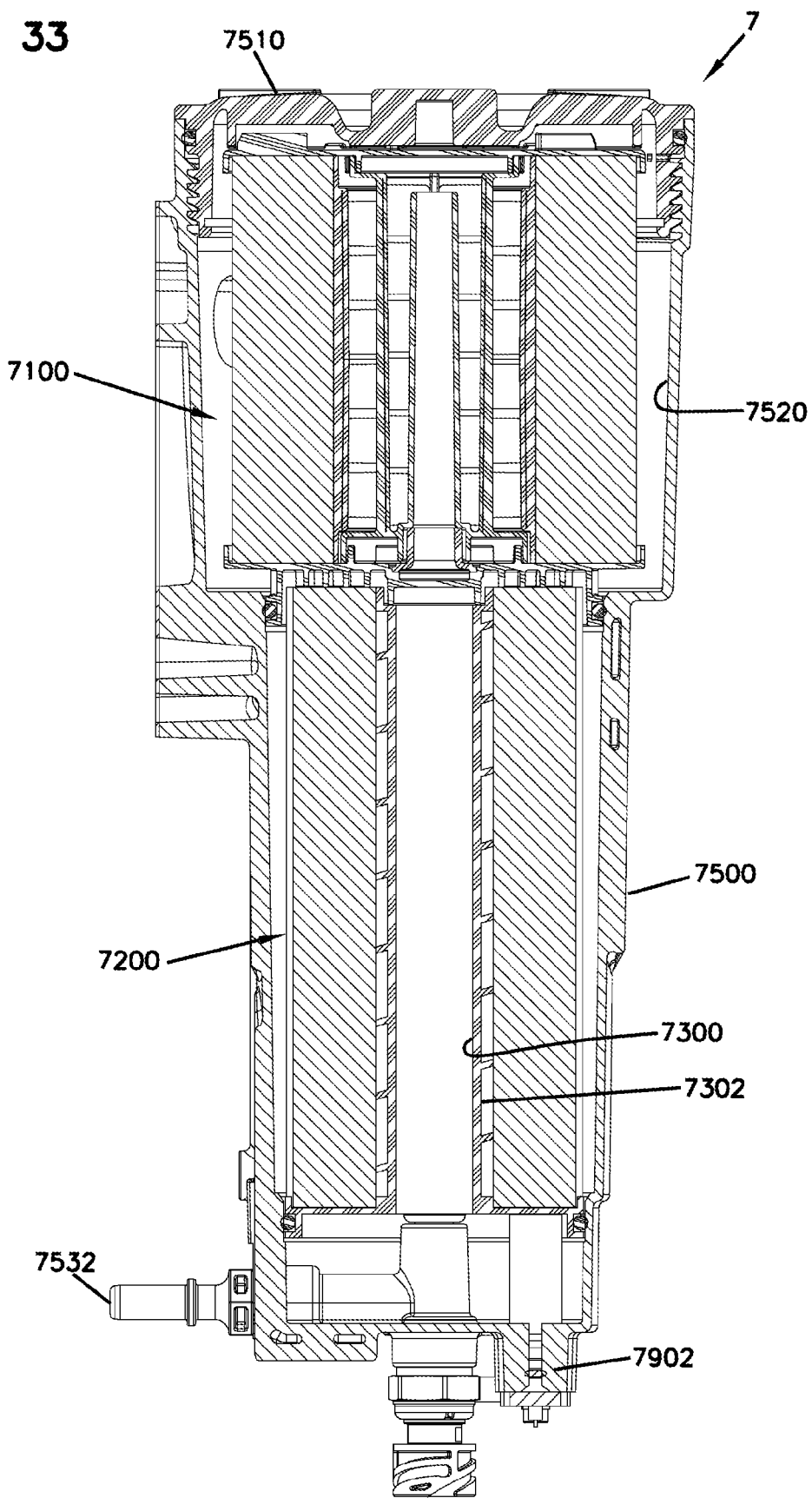
Figure 34:
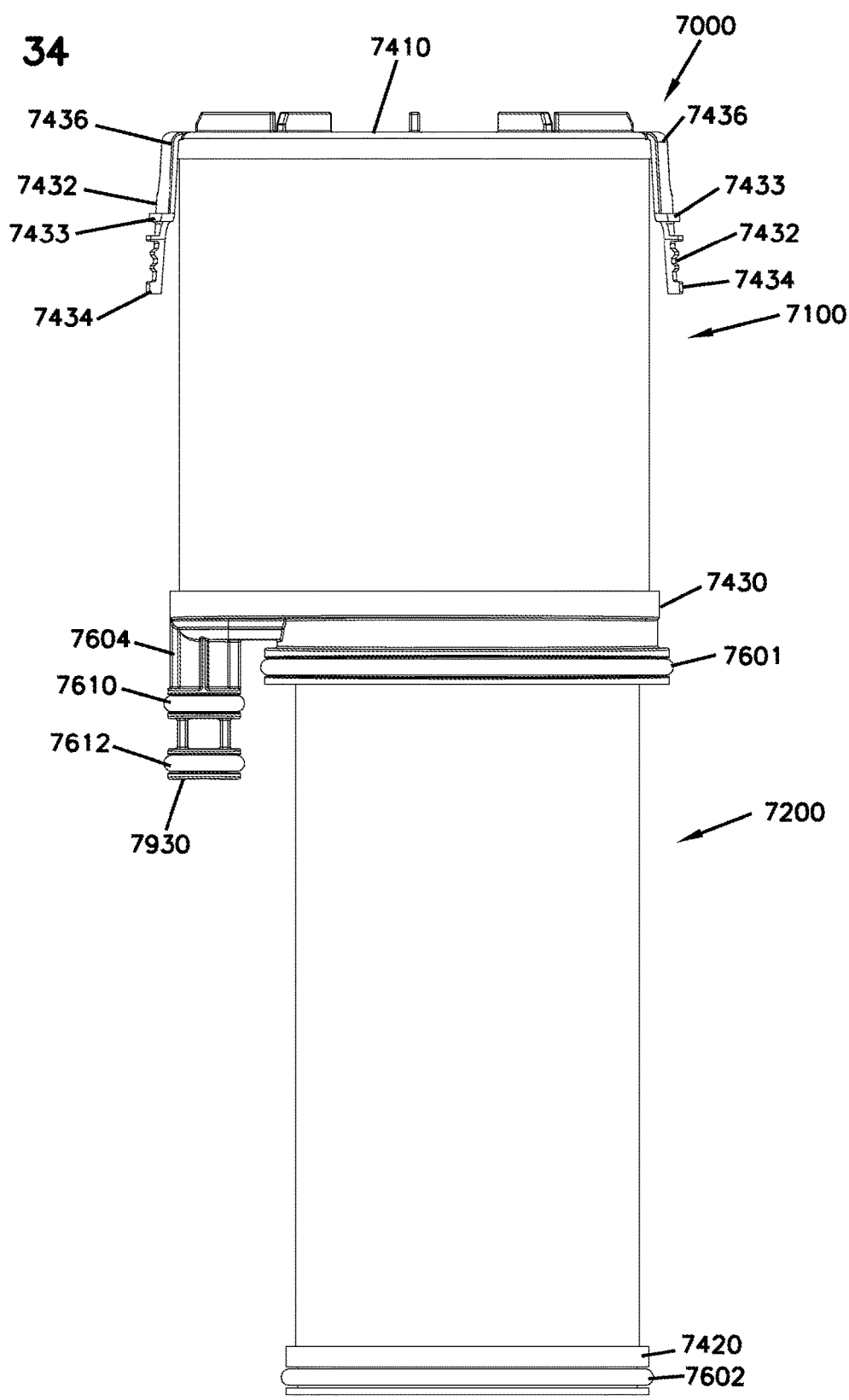
Figure 35:
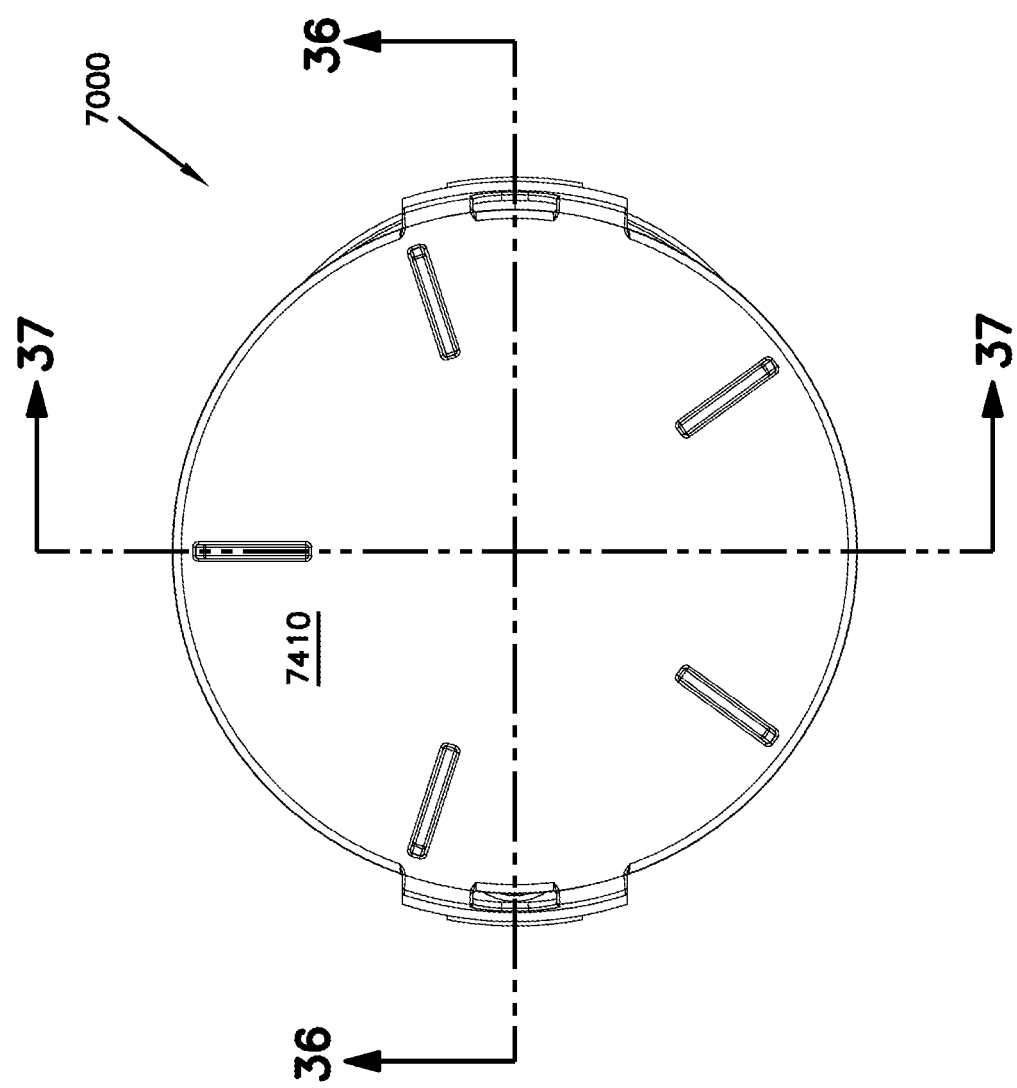
Figure 36:
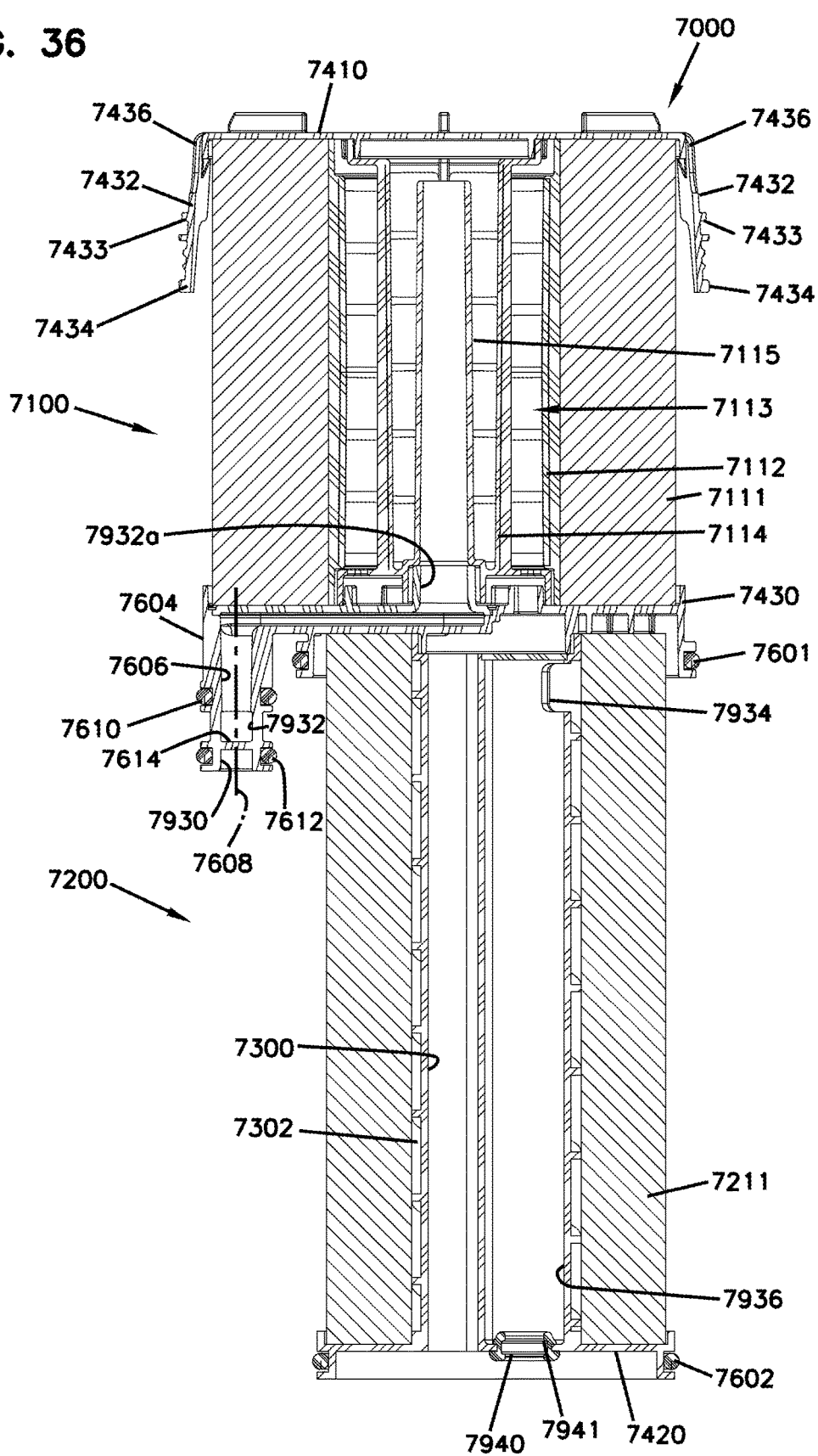
Figure 37:
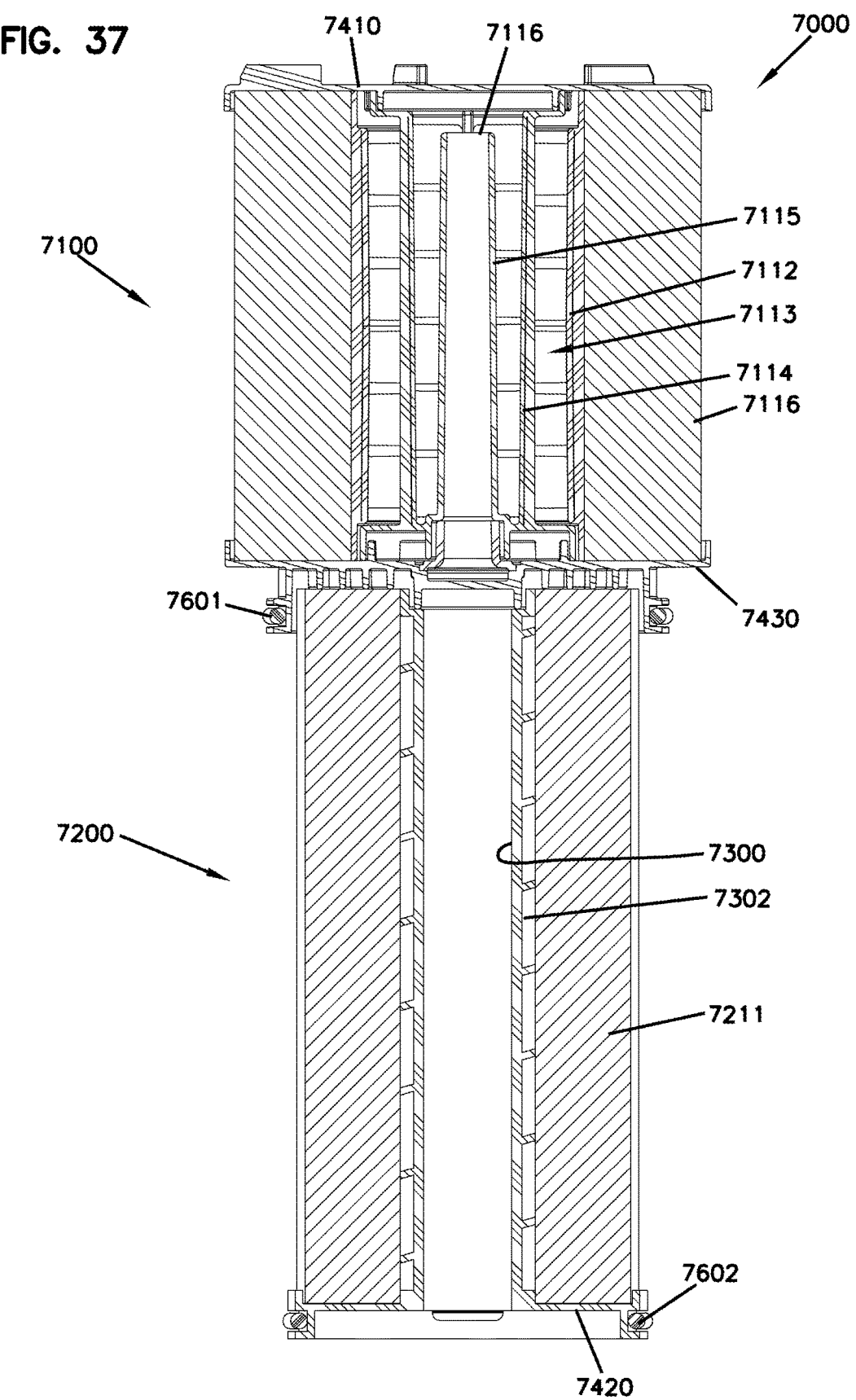
Figure 38:
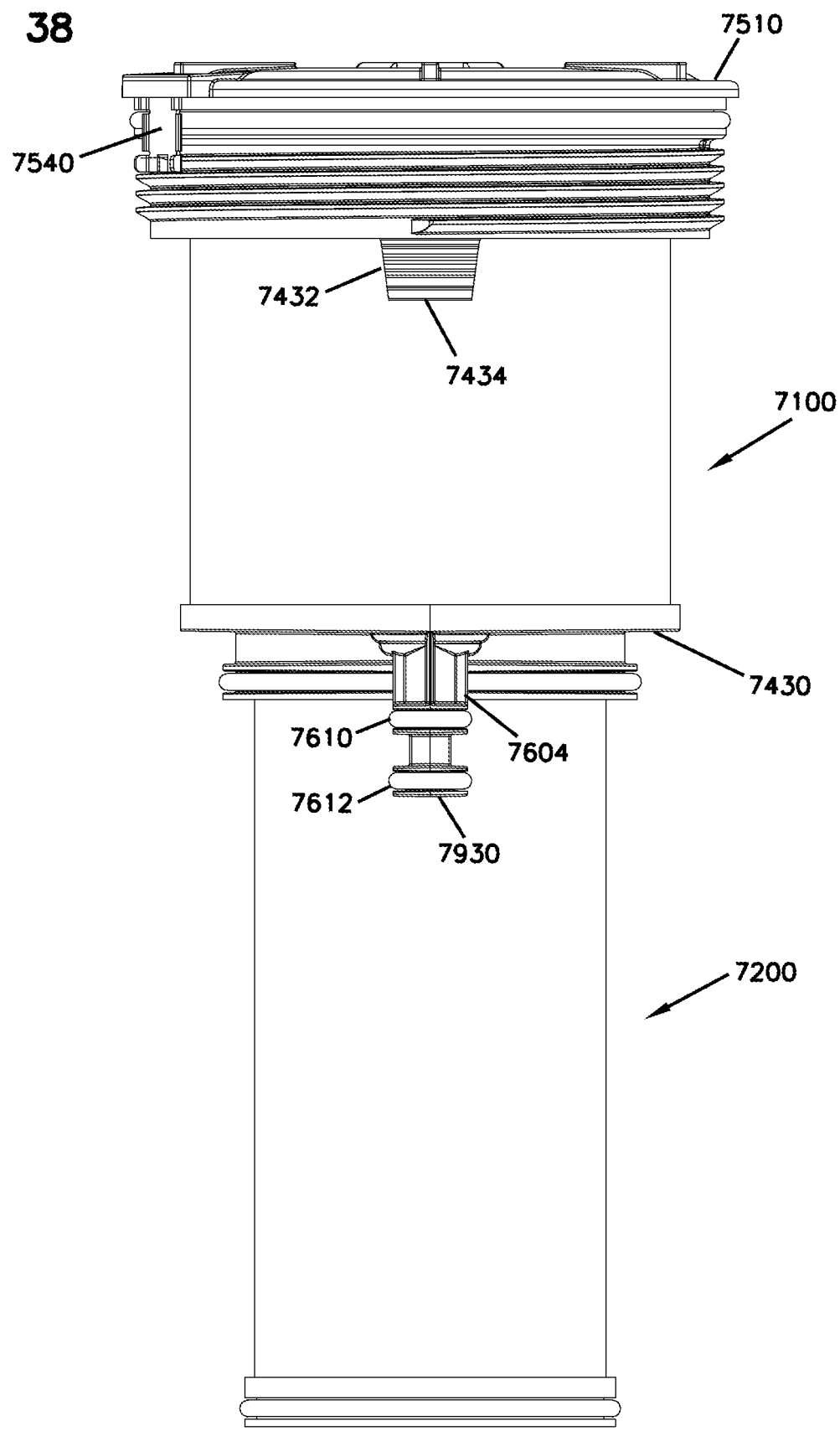
Figure 39:
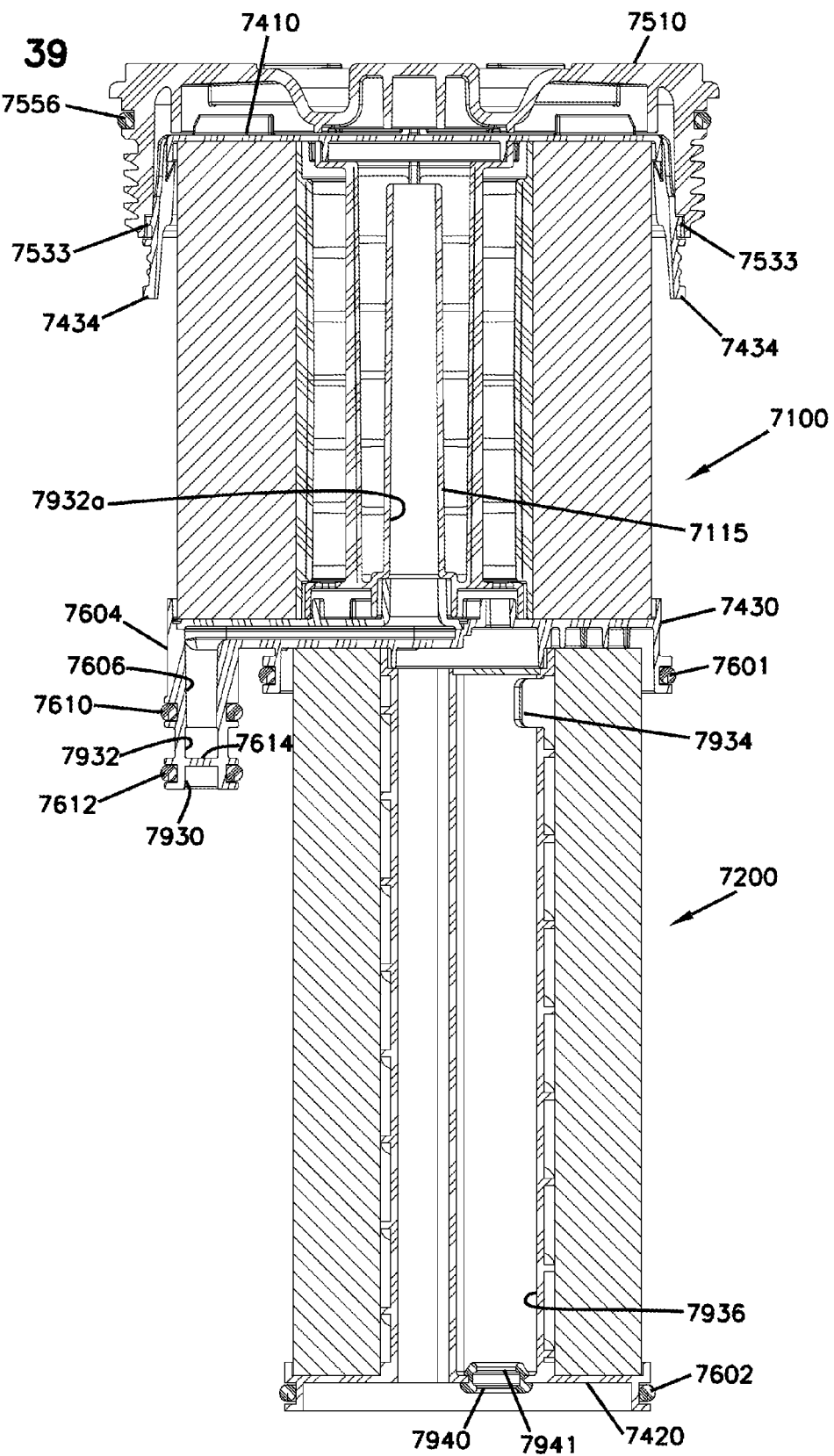
Figure 40:
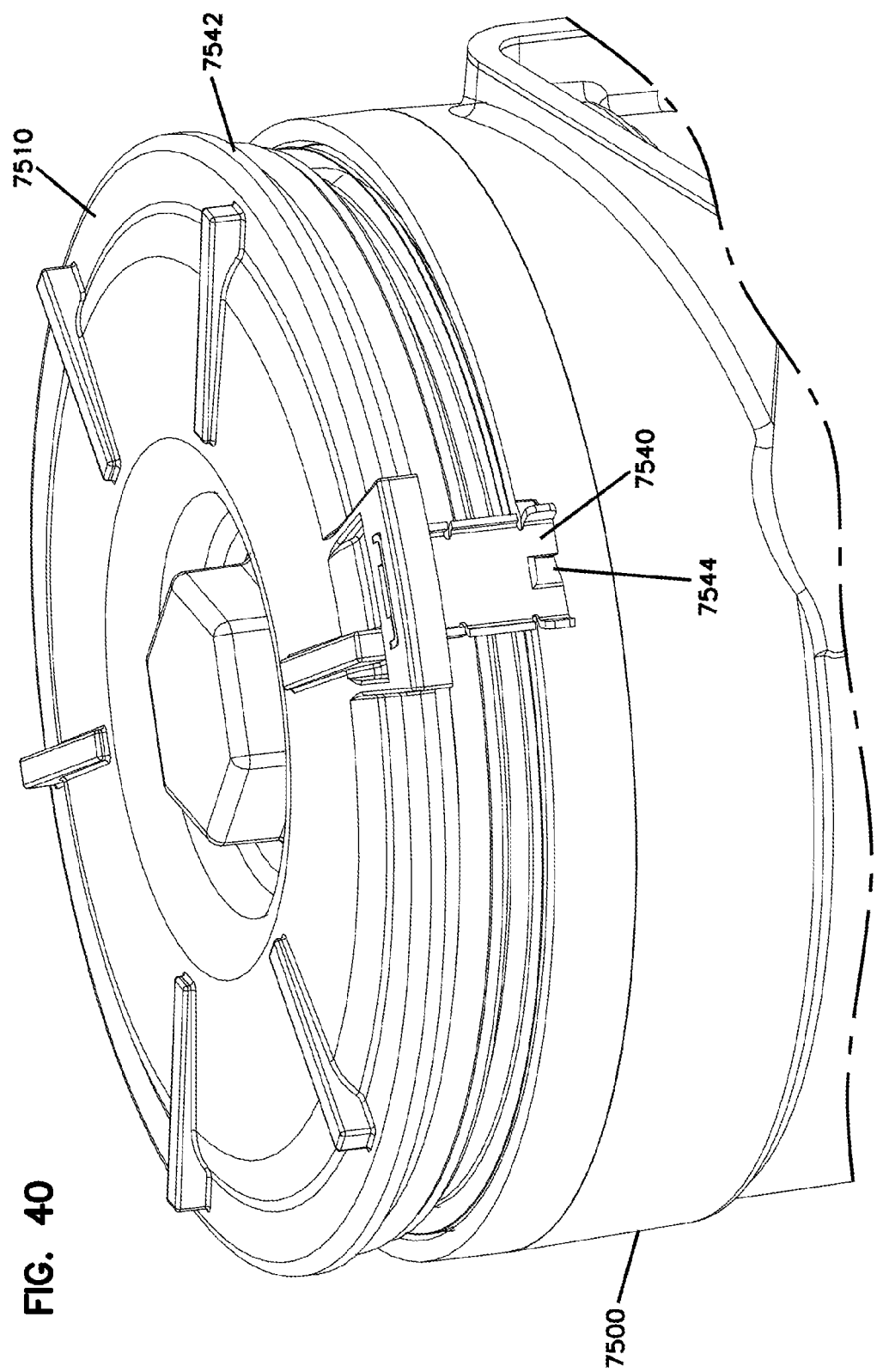
Figure 41:
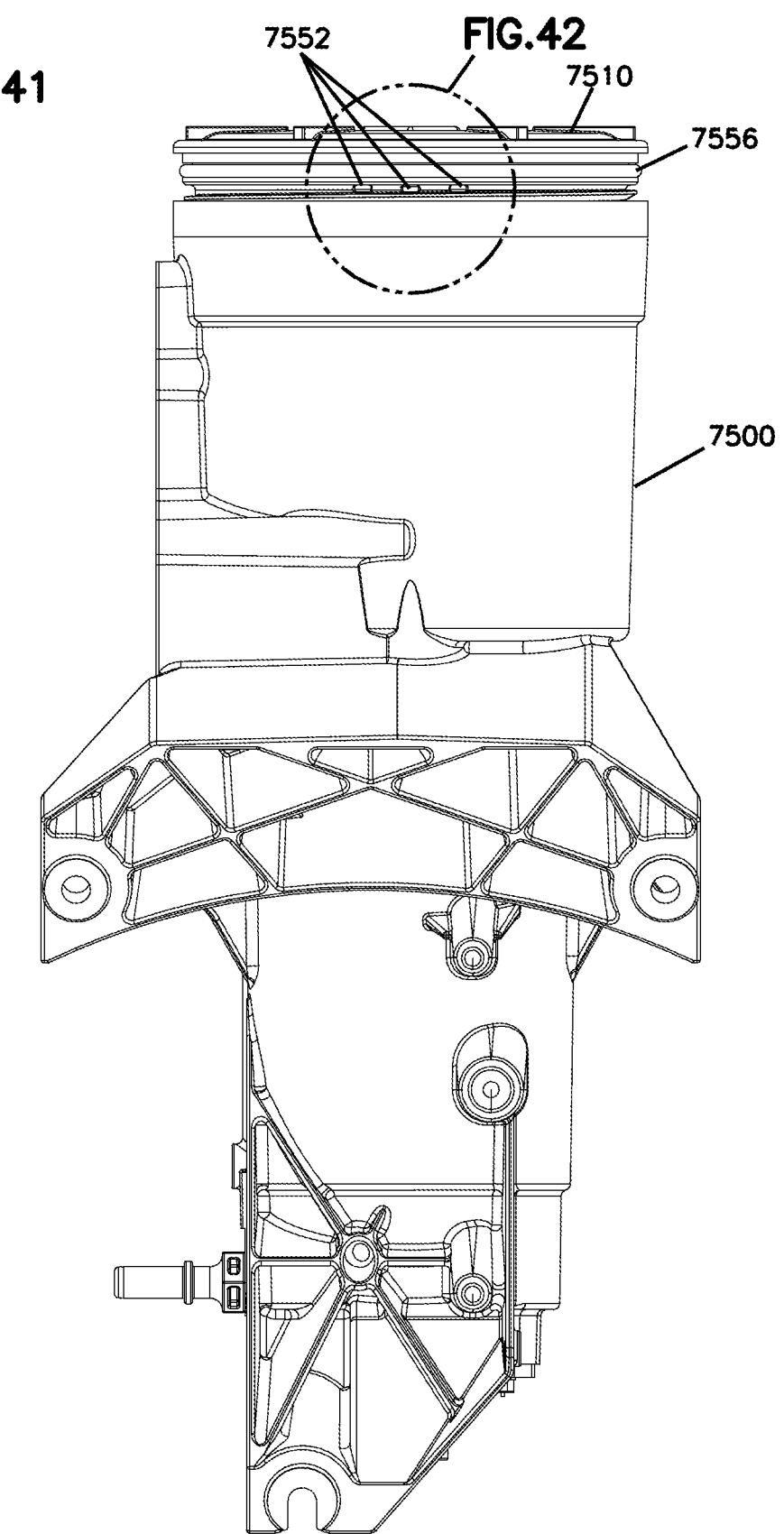
Figure 42:
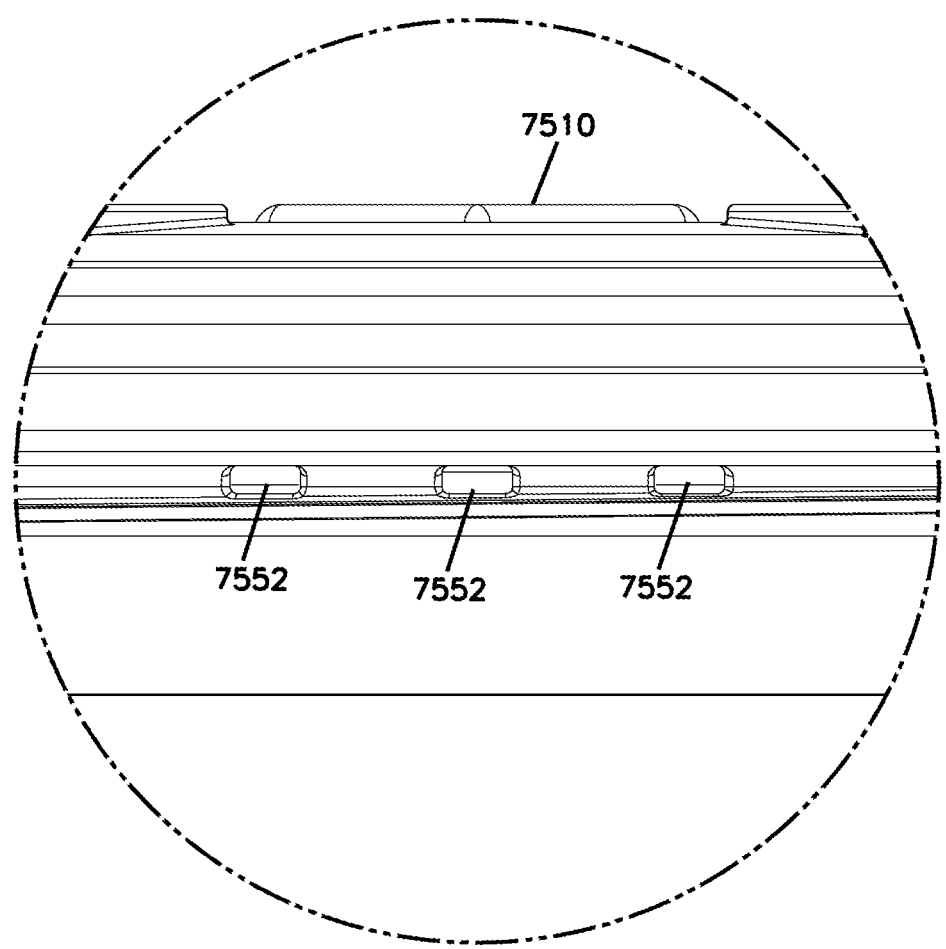
Figures 43, 44:
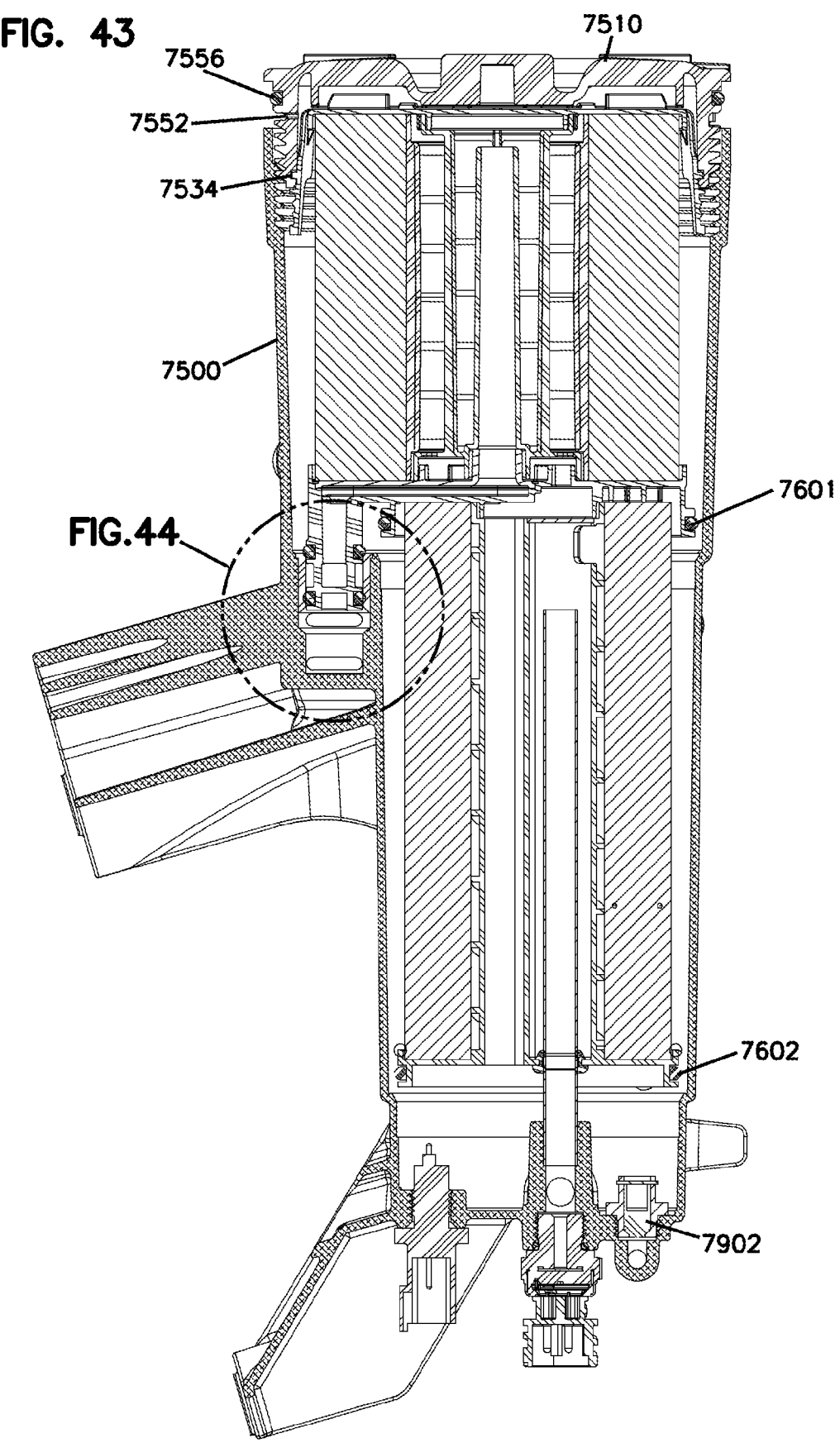
Figure 44:
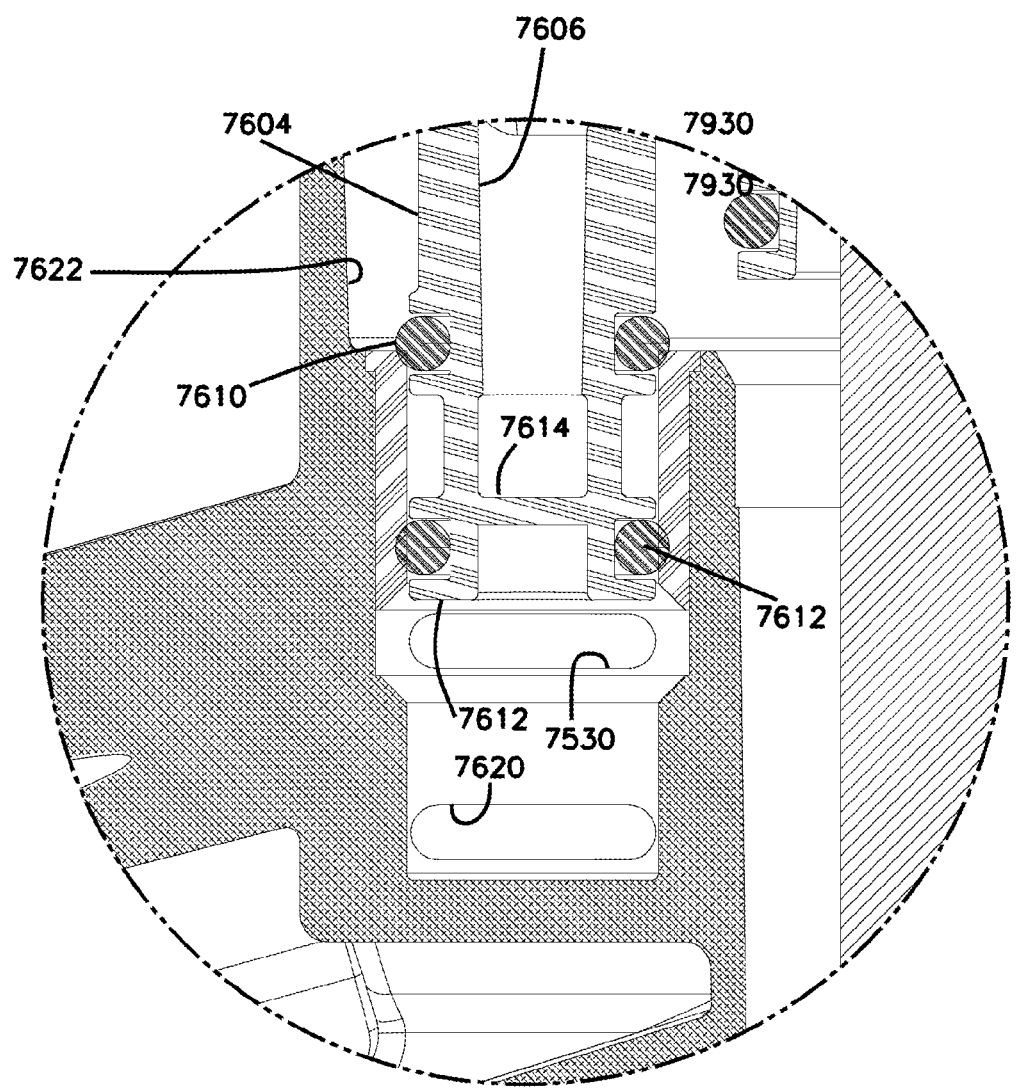
Figure 45:
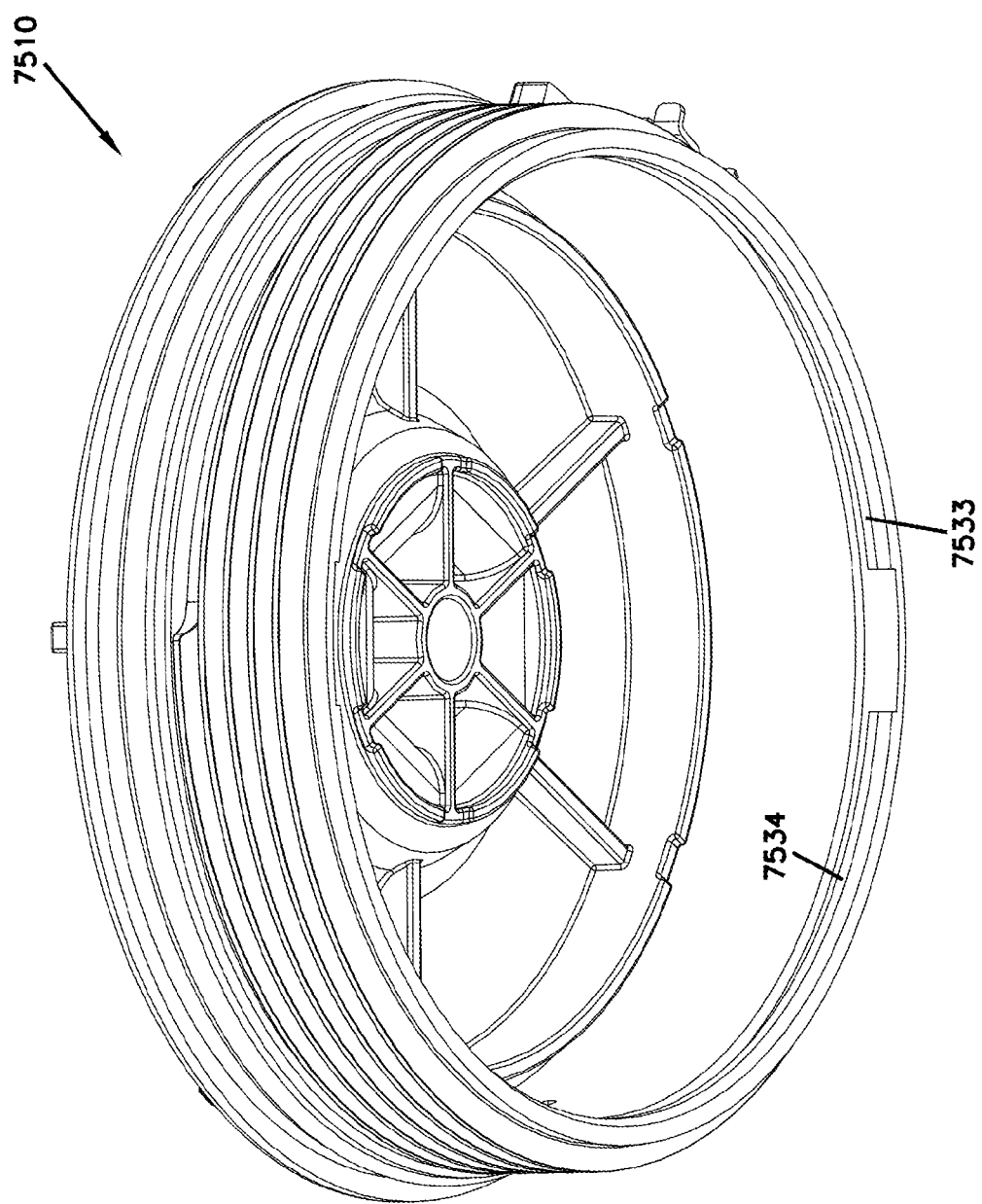

FIG. 30: shows a three-dimensional depiction of a fluid filter arrangement according to a sixth embodiment;

FIG. 31: shows a top view of the arrangement of FIG. 30;

FIG. 32: shows a cross-sectional view of the fluid filter arrangement of FIGS. 30 and 31, the cross-section being taken along the line 32-32 of FIG. 31;

FIG. 33: shows a cross-sectional view of the fluid filter arrangement of FIGS. 30-32, the cross-section being taken along the line 33-33 of FIG. 31;

FIG. 34: shows a side view of the filter cartridge used in the fluid filter arrangement of FIGS. 30-33;

FIG. 35: shows a top view of the filter cartridge of FIG. 34;

FIG. 36: shows a cross-sectional view of the filter cartridge of FIG. 35, the cross-section being taken along the line 36-36 of FIG. 35;

FIG. 37: shows a cross-sectional view of the filter cartridge of FIGS. 35 and 36, the cross-section being taken along the line 37-37 of FIG. 35;

FIG. 38: shows a side view of the filter cartridge of FIGS. 34-37 and operably connected to the access cover of the arrangement of FIGS. 30-33;

FIG. 39: shows a cross-sectional view of the filter cartridge and access cover of FIG. 38;

FIG. 40: shows an enlarged view of the access cover and a portion of the housing during one step of a method of servicing the fluid filter arrangement of FIG. 30;

FIG. 41: shows a side view of the fluid filter arrangement during one step of a method of servicing;

FIG. 42: shows an enlarged detail of FIG. 41;

FIG. 43: shows a cross-sectional view of the fluid filter arrangement of FIG. 30 during one step of a method of servicing;

FIG. 44: shows an enlarged detail of FIG. 43;

FIG. 45: shows a three-dimensional view of an access cover used in the fluid filter arrangement of FIG. 30.

Figure 46:
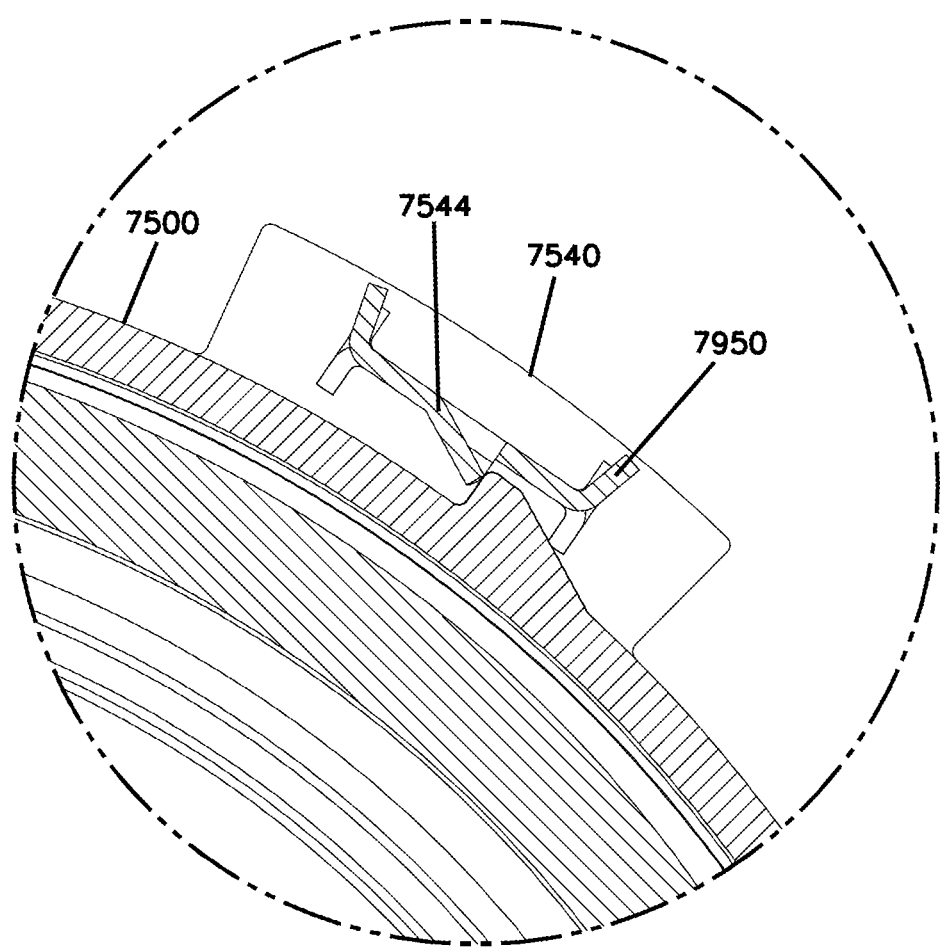
Figure 47:
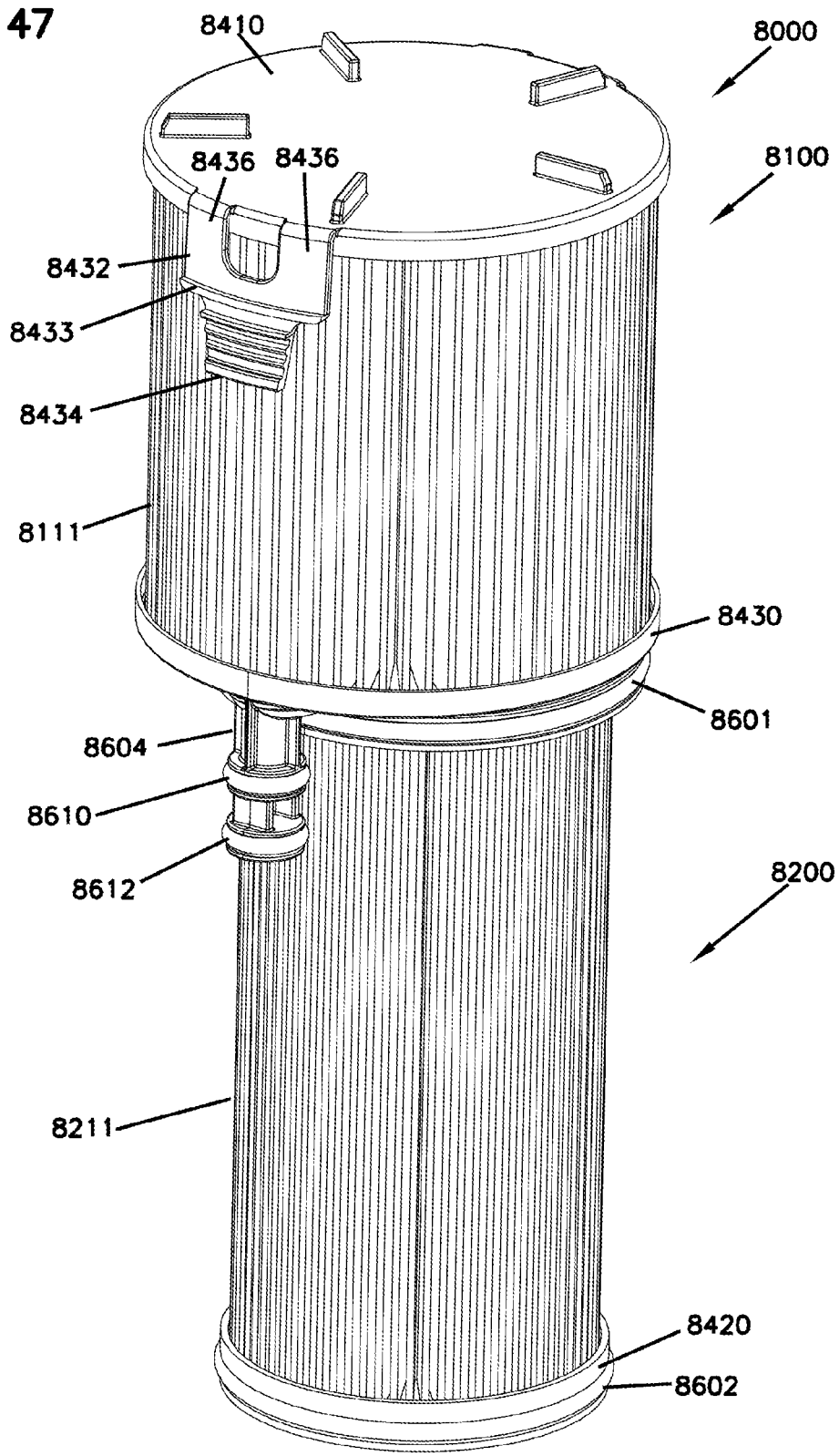
Figure 48:
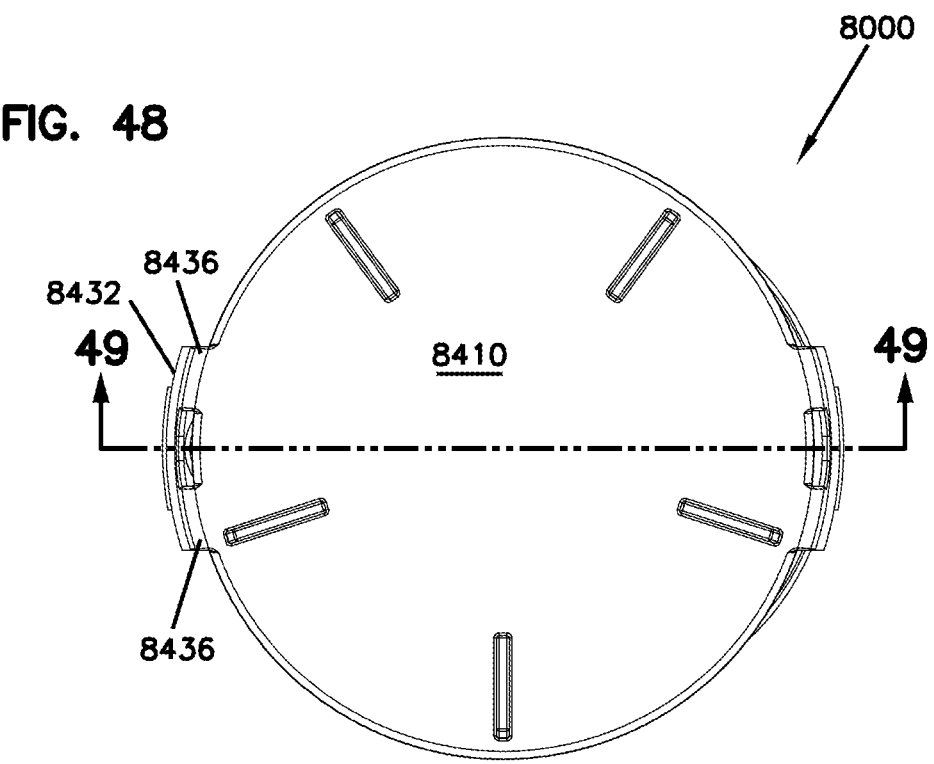
Figure 49:
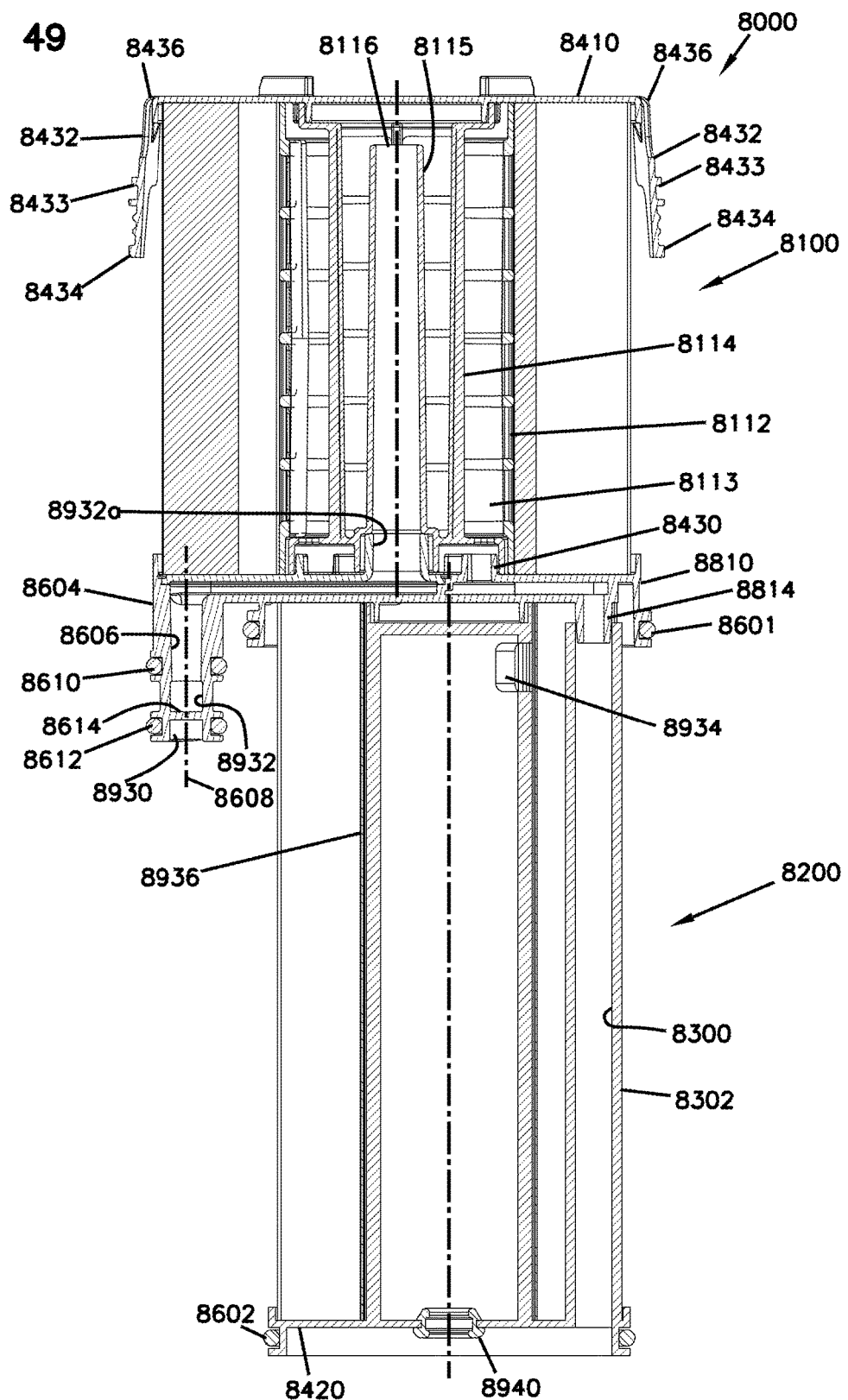
Figure 50:
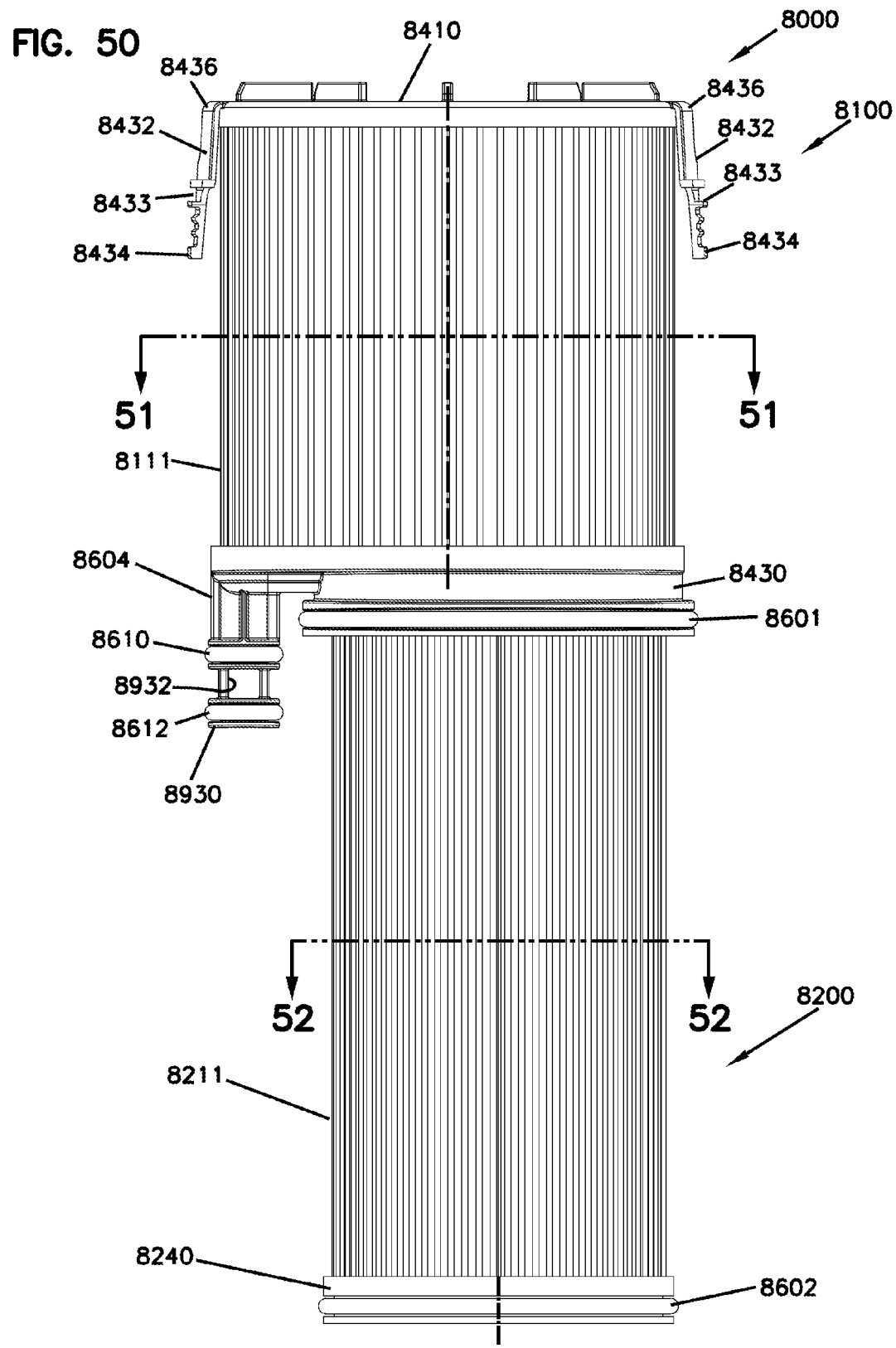
Figure 51:
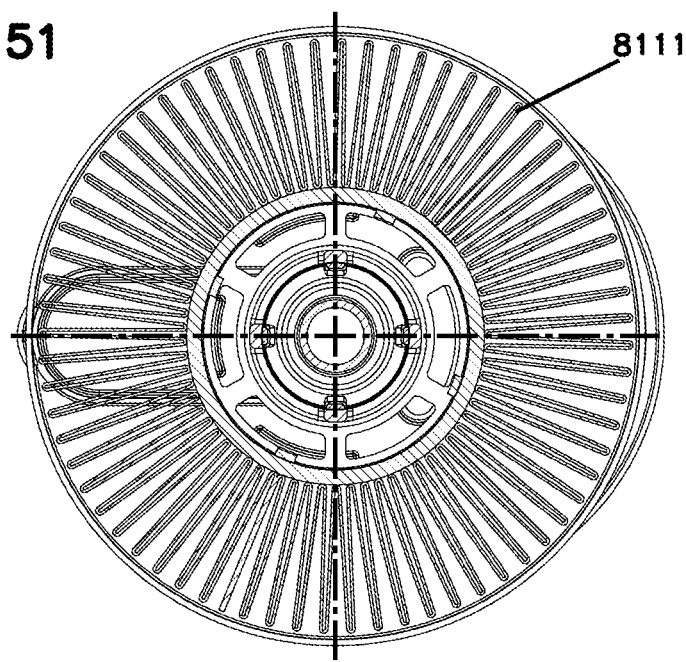
Figure 52:
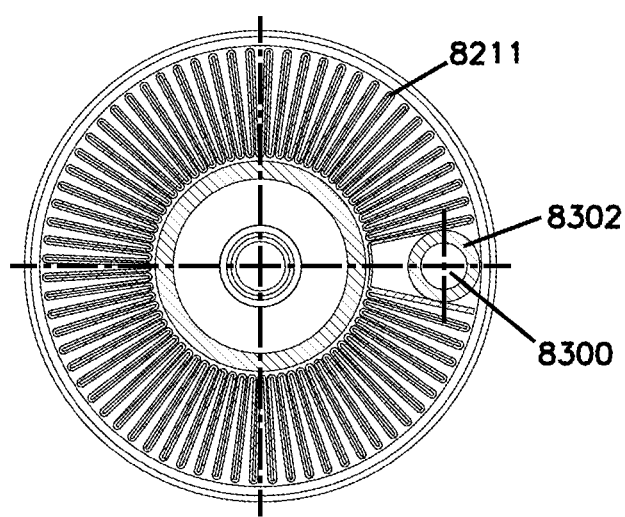
Figure 53:
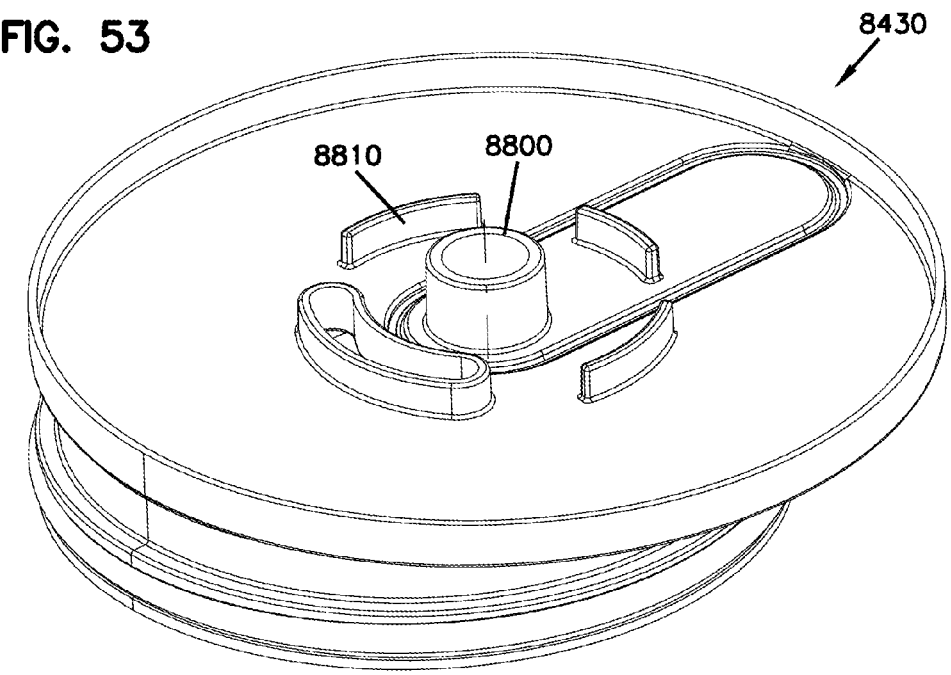
Figure 54:
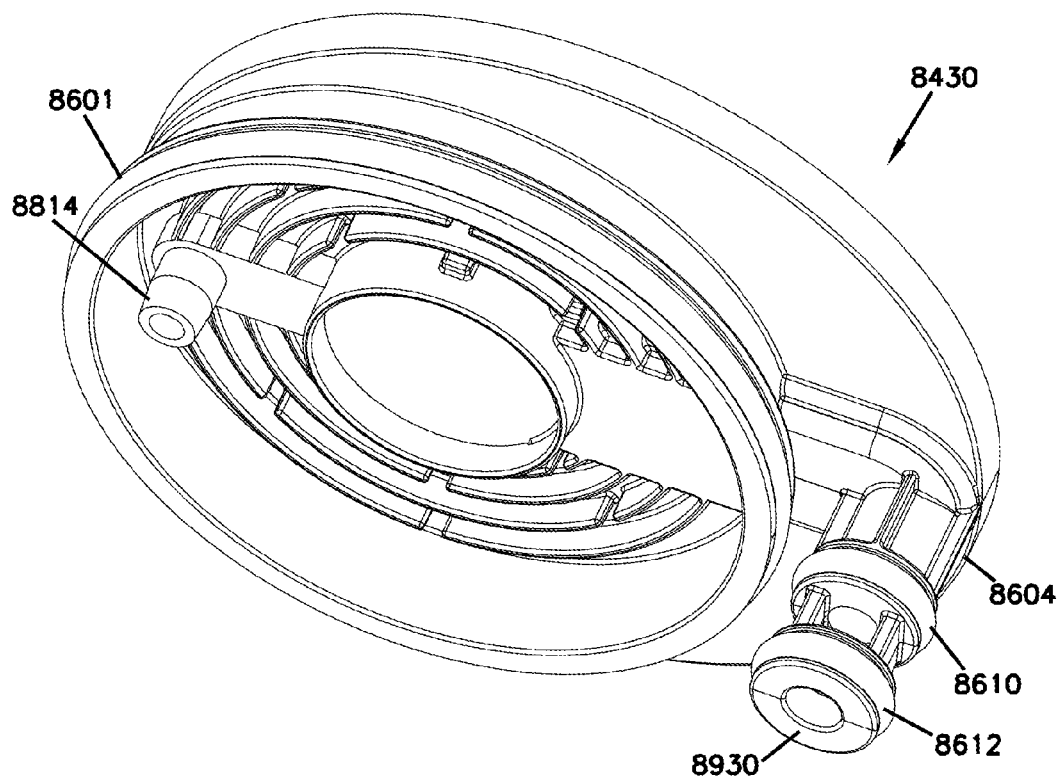
Figure 55:
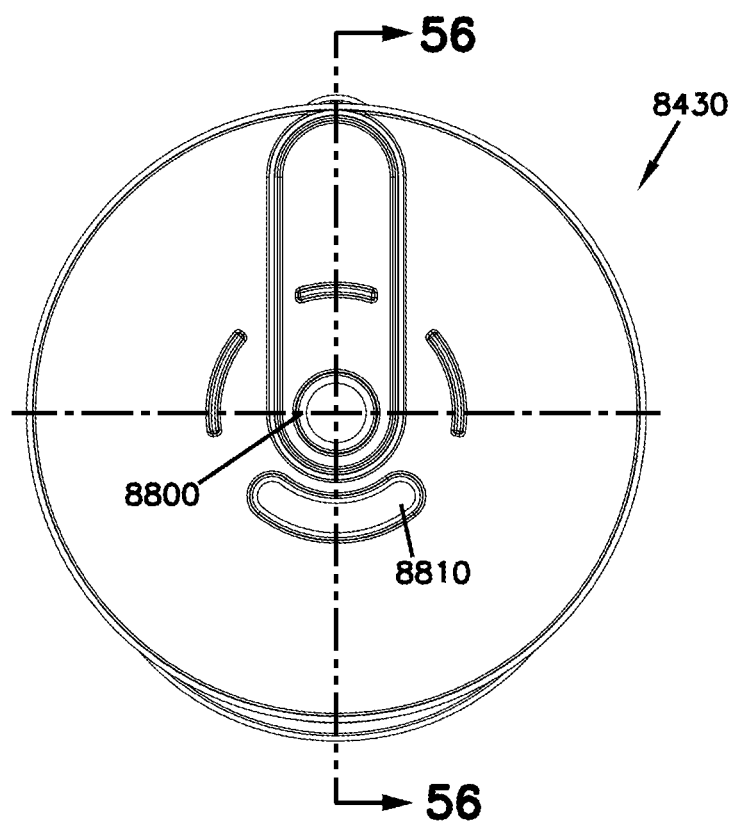
Figure 56:
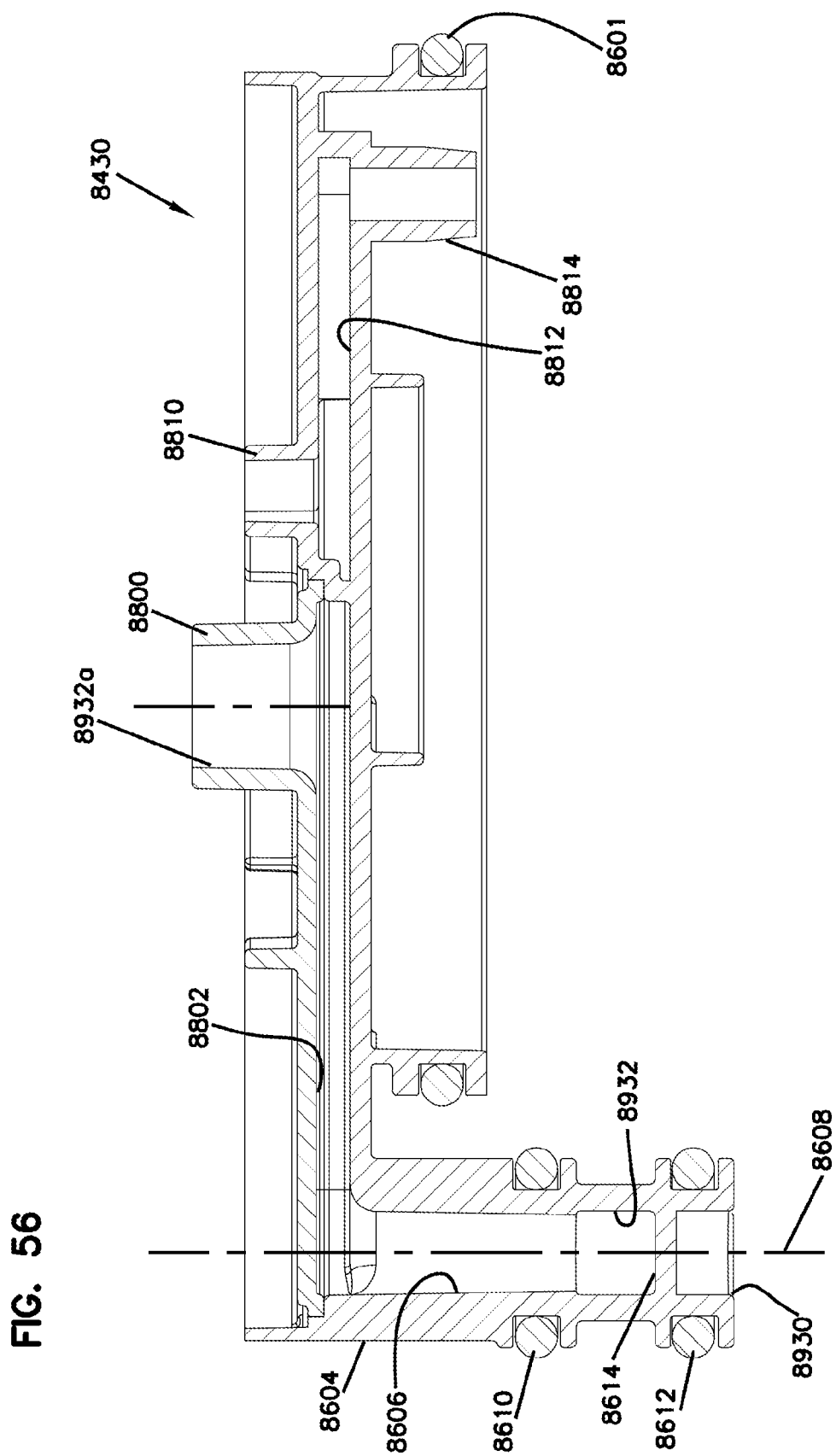
Figure 57:
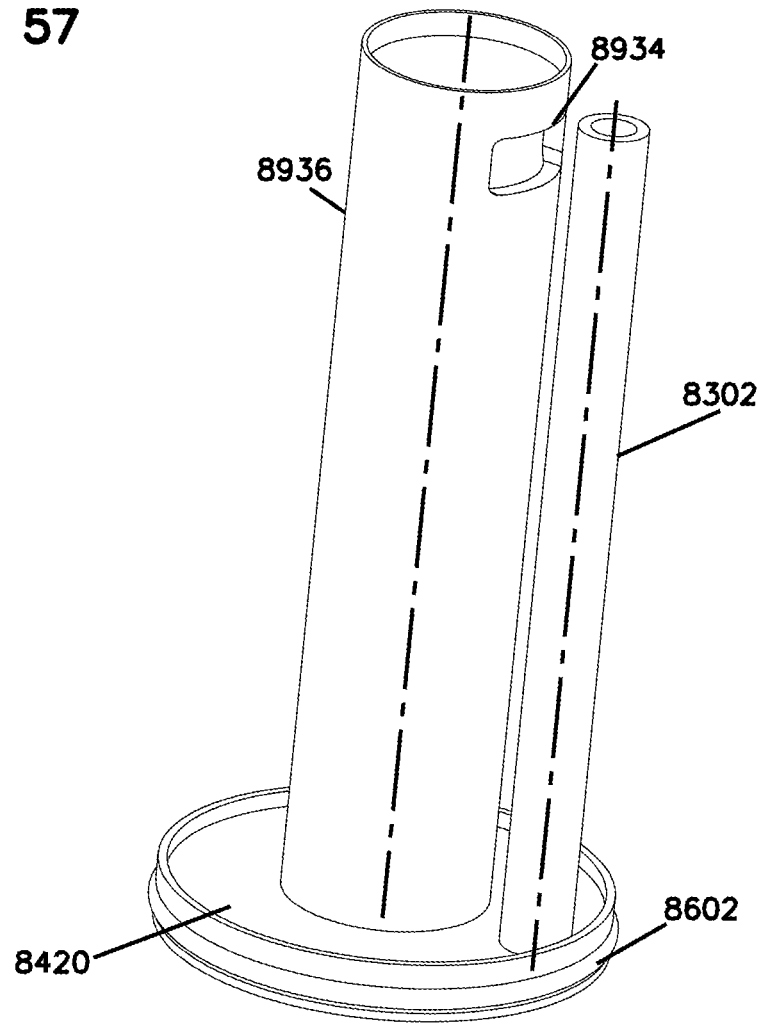
Figure 58:
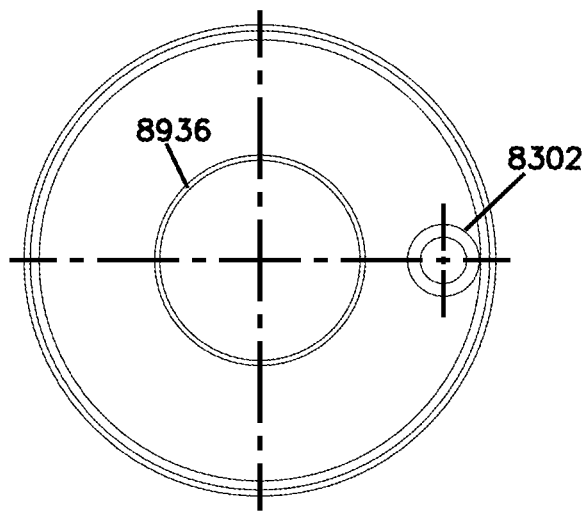
Figure 59:
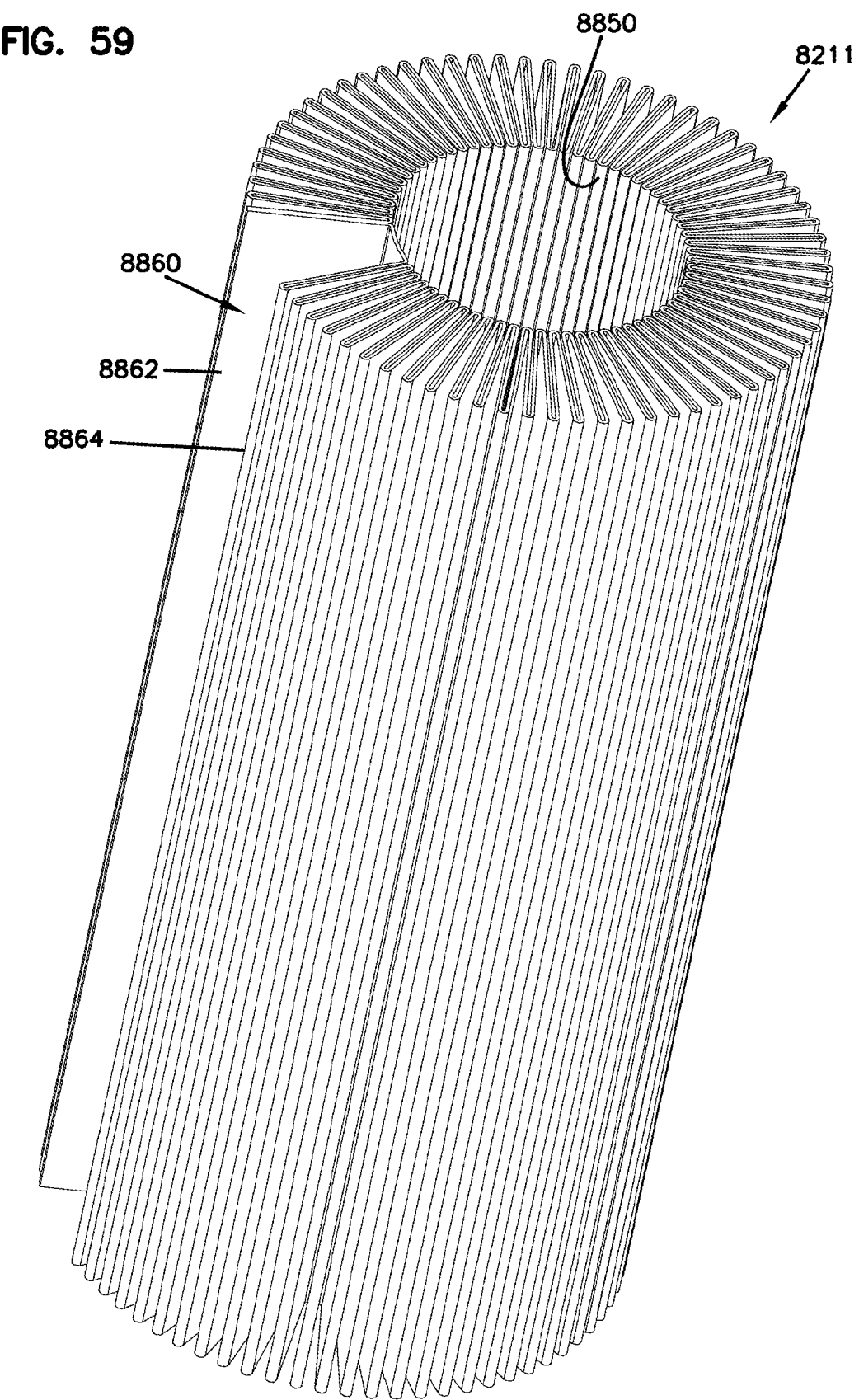
Figure 60:
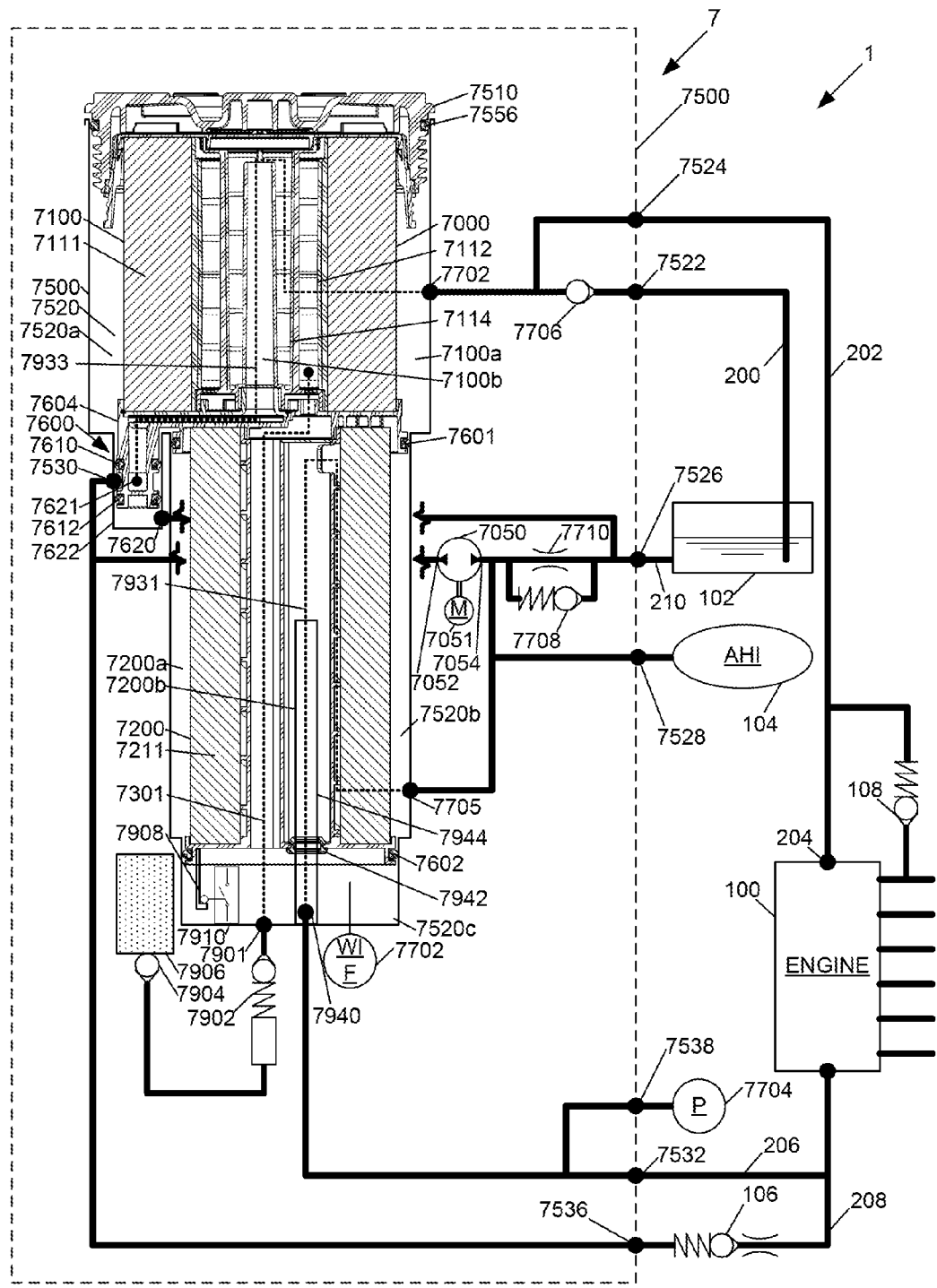
Figure 62:
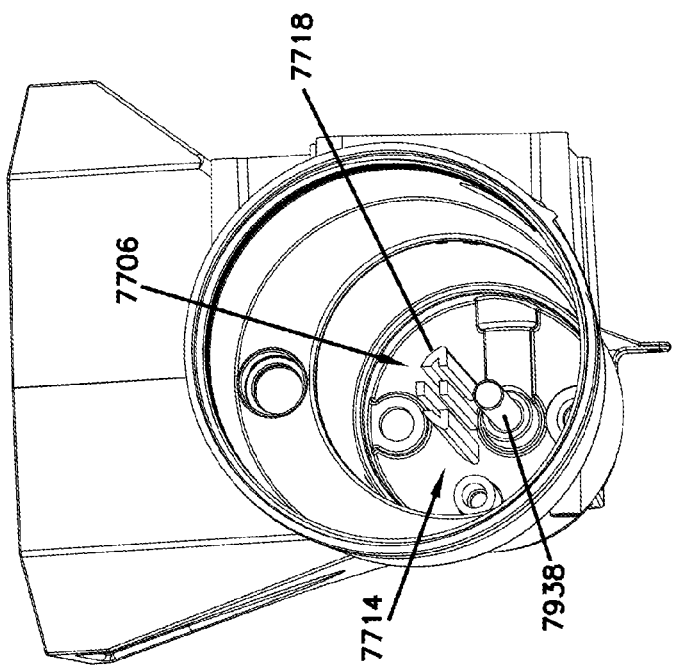
Figure 61:
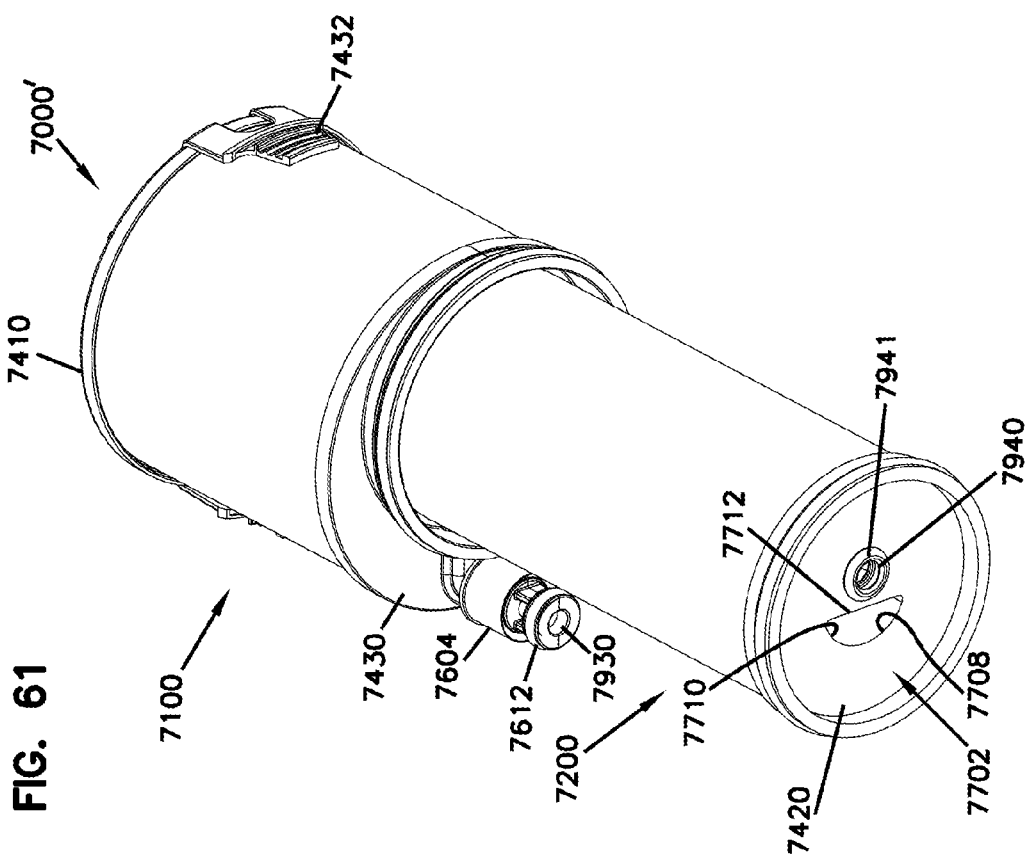
Figure 63:
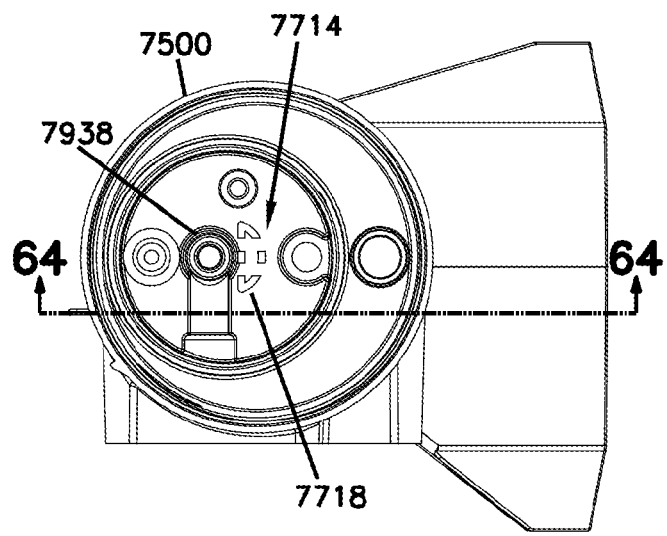
Figure 64:
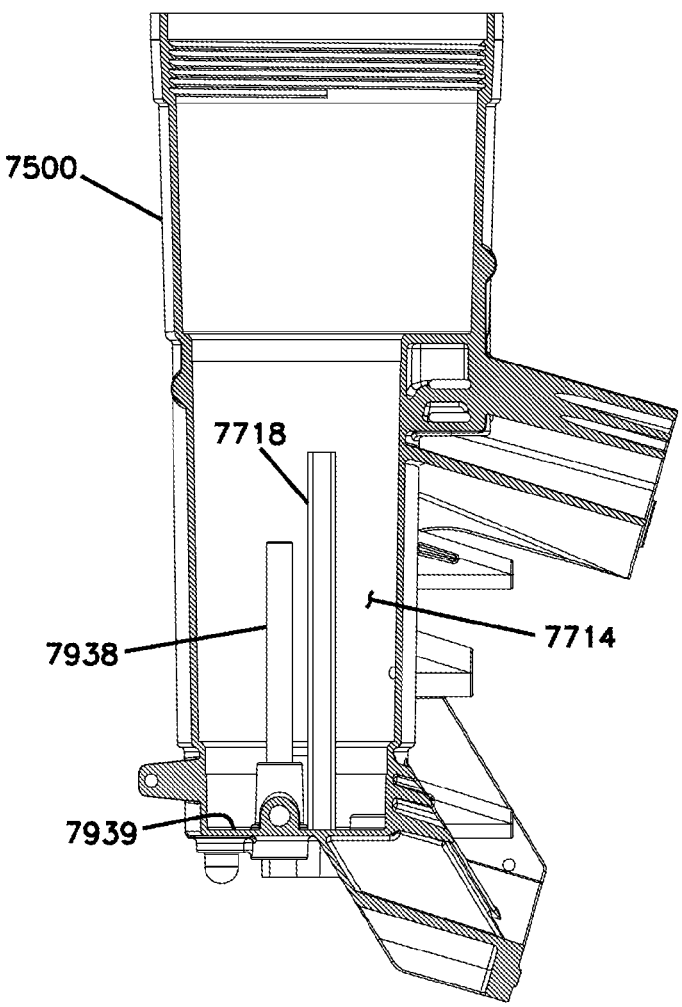
Figure 65:
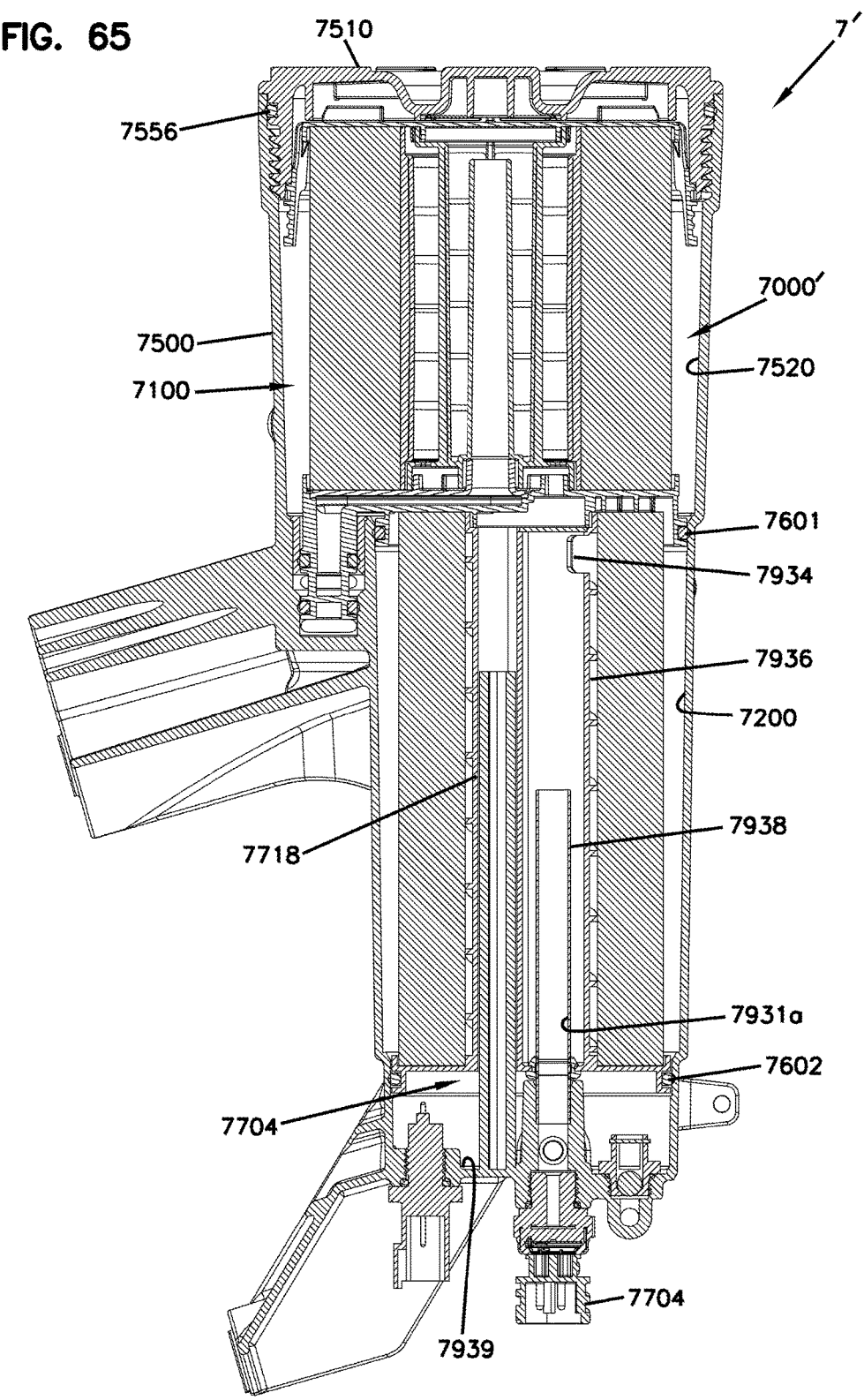

FIG. 46: shows an enlarged cross-sectional view of engagement between an engagement finger on the access cover and a stop extending from the housing;

FIG. 47: shows a three dimensional view of a filter cartridge according to a seventh embodiment;

FIG. 48: shows a top view of the filter cartridge of FIG. 47;

FIG. 49: shows a cross-sectional view of the filter cartridge of FIGS. 47 and 48, the cross-section being taken along the line 49-49 of FIG. 48;

FIG. 50: shows a side view of the filter cartridge of FIGS. 47-49;

FIG. 51: shows a cross-sectional view of the filter cartridge of FIG. 50, the cross-section being taken along the line 51-51 of FIG. 50;

FIG. 52: shows a cross-section of the filter cartridge of FIG. 50, the cross-section being taken along the line 52-52 of FIG. 50;

FIG. 53: shows a three dimensional view of a connection end cap for the filter cartridge of FIGS. 49-52;

FIG. 54: shows a three dimensional view of the connection end cap from a bottom perspective used for the filter cartridges of FIGS. 47-52;

FIG. 55: shows a top view of the connection end cap of FIGS. 53 and 54;

FIG. 56: shows a cross-sectional view of the connection end cap of FIG. 55, the cross-section being taken along the line 56-56 of FIG. 55;

FIG. 57: shows a three dimensional view of internal portions of the second filter element used in the filter cartridge of FIGS. 47-52;

FIG. 58: shows a top view of the internal portions of FIG. 57;

FIG. 59: shows a three dimensional view of the filter media used for the second filter element of the filter cartridge of FIGS. 47-52;

FIG. 60: shows a schematic representing a fuel delivery system using the fluid filter arrangement of FIGS. 30-59;

FIG. 61: shows a three dimensional view of a variation of the filter cartridge of FIG. 34;

FIG. 62: shows a three dimensional top view of a filter housing and interior components used with the filter cartridge of FIG. 61;

FIG. 63: shows a top view of the filter housing of FIG. 62;

FIG. 64: shows a cross-sectional view of the filter housing of FIG. 63, the cross-section being taken along the line 64-64 of FIG. 63;

FIG. 65: shows a cross-sectional view of the filter cartridge of FIG. 61 operably mounted within the housing of FIGS. 62-64 and the access cover mounted in place;

FIG. 66: shows a three dimensional view of another variation of the filter cartridge of FIG. 34;

FIG. 67: shows a top view of the filter cartridge of FIG. 66;

FIG. 68: shows the bottom view of the filter cartridge of FIG. 66;

FIG. 69: shows a side view of the filter cartridge of FIG. 66; and

FIG. 70: shows a rear view of the filter cartridge of FIG. 66.

All embodiments of fluid filter cartridges and fluid filter arrangements described with respect to the figures are suitable in particular for fuel filtration and for deployment in a "top loading" or "top servicing" situation in an engine compartment of a vehicle.

A first embodiment of a fluid filter arrangement 1 is shown in FIGS. 1 to 4. The fluid filter cartridge of the fluid filter arrangement 1 according to the first embodiment has a first filter element 1100 and a second filter element 1200 arranged consecutively with respect to a longitudinal extension of the fluid filter cartridge. The fluid filter cartridge is installed in a housing 1500 with a filter cartridge receiving space 1520 and an access cover 1510 removably connected to the filter cartridge receiving space 1520. The filter cartridge receiving space 1520 has a fluid inlet 1120 for the first filter cartridge 1100 and a fluid inlet 1130 for the second filter cartridge 1200. The filter cartridge receiving space 1520 has two further outlet ports 1521, 1522 of the two filter cartridges 1100, 1200 at the lower end (in operational orientation of the filter cartridge arrangement 1 as shown in FIG. 1), which are connected via outflow paths 1521a, 1522a for filtered fluid of the first and second elements 1100, 1200.

The first filter element 1100 and the second filter element 1200 are both tubular filter elements with open filter interiors 1110, 1210. The first filter element 1100 is an element for separating water from fluid. The second filter element 1200 is a filter element for filtering particles from fluid. Both filter elements 1100, 1200 comprise media packs with filter media 1111, 1211 surrounding an open filter interior 1110, 1210. Both filter elements 1100, 1200 are configured for outside-in fluid flow. The upstream side of the filter elements 1100, 1200 is on the outer peripheries of the filter media packs of filter media 1111, 1211.

The filter media 1111 of the first filter element 1100 extends between two end faces, which are covered by a first end cap 1410, which is a closed end cap, and a connection end cap 1430. The connection end cap 1430 also covers one of the end faces of the second filter element 1200. The second end face of the second filter element 1200 is covered by a second, open end cap 1420. The longitudinal extension or length H1 of the first filter element 1100 is slightly larger than the longitudinal extension or length H2 of the second filter element 1200. The overall length or longitudinal extension H of the fluid filter cartridge corresponds to the combined longitudinal extensions H1, H2 of the first and second filter elements 1100, 1200. The first and second filter elements 1100, 1200 have a substantially cylindrical outer periphery with a diameter D1 and an open filter interior with a diameter D2. Both filter elements 1100, 1200 are aligned and arranged coaxial, i.e. their longitudinal axes are identical. Further, also the central axes of the first and second end caps 1410, 1420 and of the connection end cap 1430 are identical with the longitudinal axes of the first and second filter elements 1100, 1200.

A seat 1601 for a sealing member surrounding the outer periphery of the first filter element 1100 at or adjacent the connection end cap 1430 is provided for creating a seal between the fluid filter cartridge and the filter cartridge receiving space 1520 of the housing 1500 in order to separate the outer flow paths of the first and second filter elements 1100, 1200.

Positioned within the open filter interior 1210 of the second filter element 1200 is a water collecting space 1300 for collecting the water separated from the fluid by the first filter element 1100. The water collecting space 1300 is separated from the fluid flow of the second filter element 1200 and preferably surrounded by a closed tube. Further, a water-in-fuel sensor 1800 is provided within the water collecting space 1300.

Further, a water purification filter 1700 is provided within the open filter interior 1210 of the second filter element 1200. An outlet of the inlet of water collecting space 1300 is connected to the inlet of the water purification filter 1700 via a pressure-actuated one-way drain valve 1900 seated on a valve seat 1901. Valve 1900 is preferably spring-loaded.

The filter cartridge according to the first embodiment of FIGS. 1 to 4 has a very compact design and further includes two filter elements in one cartridge such that servicing is facilitated. Further, the water collecting space 1300 has a longitudinal extension that is significantly larger than its extension in a direction orthogonal to its longitudinal extension, which improves and facilitates the separation of water from fuel by gravity and has advantages when the vehicle with the filter cartridge is tilted, for example.

FIGS. 5 to 7 show a second embodiment of a fluid filter cartridge 2000 and a fluid filter arrangement 2. The fluid filter cartridge 2000 according to FIG. 5 is installed in a housing 2500 with a filter cartridge receiving space 2520 and an access cover 2510 releasably connected to the filter cartridge receiving space 2520 according to FIGS. 6 and 7.

The fluid filter cartridge 2000 comprises a first filter element 2100 for separating water from fluid and a second filter element 2200, which is a particle filter. Both filter elements 2100, 2200 are tubular filter elements with open filter interiors. Both filter elements 2100, 2200 comprise media packs with filter media 2111, 2211 surrounding the open filter interiors. The first end face of the filter media 2111 is covered by a first end cap 2410, which is a closed end cap. The other end face of the filter media 2111 of the first filter element 2100 is covered by a connection end cap 2430. The connection end cap 2430 also covers an end face of the filter media 2211 of the second filter element 2200. A second end face of the filter media 2211 of the second filter element 2200 is covered by a second end cap 2420, which is an open end cap. A seat 2601 for a sealing member surrounding the outer periphery of the first filter element 2100 at or adjacent the connection end cap 2430 is provided for creating a seal between the fluid filter cartridge 2000 and the filter cartridge receiving space 2520 of the housing 2500 in order to separate the outer flow paths of the first and second filter elements 2100, 2200. Both filter elements 2100, 2200 are configured for outside-in fluid flow. The upstream side of the filter elements 2100, 2200 is on the outer peripheries of the filter media packs of filter media 2111, 2211.

Fluid filtered by the first filter element 2100 will exit the first filter element 2100 through an outflow path 2932a for filtered fluid of the first filter element 2100, which is in fluid communication with an outlet port 2932 of the first filter element 2100 provided at the connection end cap 2430. Fluid filtered by the second filter element 2200 is collected in an outflow path 2931a for filtered fluid of the second filter element 2200 in fluid communication with to the outlet port 2931 of the second filter element 2200 provided at the connection end cap 2430. The two ports 2931, 2932 of the connecting end cap 2430 are positioned within an angle of less than 60° from each other within the cross-section or main extension plane of the connection end cap 2430. The two ports 2931, 2932 provided at the connection end cap 2430 can be provided on a portion of the connection end cap 2430 that covers an end face of the first filter element 2100 but not an end face of the second filter element 2200. Both ports 2931, 2932 are facing in an axial direction, or in a longitudinal direction or in a direction orthogonal to the main extension plane of the connection end cap and are facing towards the second end cap. The openings of the ports 2931, 2932 are substantially parallel to the main extension plane of the connecting end cap 2430.

Within the open filter interior of the second filter element 2200, a water collecting space 2300 is provided, for collecting the water separated from the fluid by the first filter element 2100. The water collecting space 2300 is separated from the fluid flow of the second filter element 2200 and preferably surrounded by a closed tube.

Further, a water purification filter with a hydrocarbon remover is positioned within the open filter interior of the second filter element 2200. Also the water purification filter 2700 is separated from the fluid flow of the second filter cartridge 2200. An outlet of the water purification filter positioned at a lower end of the water purification filter is connected to an outlet tube 2730 connecting the water outlet of the water purification filter 2700 to a volume in an upper region inside the water purification filter. The outlet of the water purification filter 2700 is connected to a water outlet 2522 of the filter cartridge receiving space 2520 of the housing 2500. At a lower end of the filter cartridge receiving space 2520 of the housing 2500 a valve seat 2901 for a pressure-actuated one-way drain valve (not shown) is provided. It is preferred that the coalesced water in the water collecting space 2300 is pushed through the pressure-actuated one-way drain valve opened by overpressure towards the water purification filter 2700 via an outer channel and returning back downwards via the outlet tube 2730 and port 2522.

A third embodiment of a fluid filter cartridge 3000 is depicted in FIGS. 8 to 13. The two filter elements 3100, 3200 of the fluid filter cartridge 3000 according to the third embodiment are arranged consecutively with respect to a longitudinal extension of the fluid filter cartridge 3000. The first filter element 3100 of the filter cartridge 3000 is covered by an access cover 3510.

The first filter element 3100 is an element for separating water from fluid and has a media pack with filter media 3111 surrounding an open filter interior 3110. A first end face of the filter media 3111 is covered by a first end cap 3410 and an opposite end face of the filter media 3111 is covered by a connection end cap 3430. The second filter element 3200 is a particle filter element with a media pack with a filter media 3211 surrounding an open filter interior 3210. A first end face of the filter media 3211 is covered by the connecting end cap 3430 and a second end face of the filter media 3211 is covered by the second, open end cap 3420.

The central axes of the first and cap 3410 and the connecting end cap 3430 and the longitudinal axis of the first filter element 3100 are aligned or identical. Further, the central axis of the second end cap 3420 and the central axis of the second filter element 3200 are aligned or identical.

However, the longitudinal axes of the first and second filter elements 3100, 3200 are offset of shifted in relation to each other. Also, the central axes of the first end cap 3410 and the connection end cap 3430 are shifted or offset in relation to the central axis of the second end cap 3420. In this way, the two ports 3931, 3932 provided at the connection end cap 3430 can be provided on a portion of the connection end cap 3430 that covers an end face of the first filter element 3100 but not an end face of the second filter element 3200. The ports 3931, 3932 extend in an axial, or longitudinal direction or in a direction orthogonal to the main extension plane of the connection end cap 3430 and face towards the second end cap. The openings of the ports 3931, 3932 are substantially parallel to the main extension plane of the connecting end cap 3430. The two ports 3932, 3931 are positioned within an angle of less than 45° from each other within a cross section of the connection end cap 3430.

The first and second filter elements 3100, 3200 are configured for outside-in fluid flow. The upstream side of the filter elements 3100, 3200 is on the outer peripheries of the filter media packs of filter media 3111, 3211. The fluid filtered by the first filter element 3100 is collected in the outflow path 3932a for filtered fluid of the first filter element 3100 in fluid communication with the outlet port 3932 of the first filter element 3100. The fluid filtered by the second filter element 3200 is collected in the outflow path 3931a for filtered fluid of the second filter element 3200 in fluid communication with the outlet port 3931 of the second filter element 3200. The seat 3601 for a seal member for creating a seal with a housing is preferably provided on first filter element 3100 adjacent the connection end cap 3430 or on the connection end cap 3430. Inside the open filter interior 3210 of the second filter element 3200 a water collecting space 3300 is positioned for collecting the water separated from the fluid by the first filter element 3100. The water collecting space 3300 is separated from the fluid flow of the second filter element 3200 and preferably surrounded by a closed tube.

Within the open filter interior 3210 of the second filter element 3200 further a water purification filter 3700 is positioned. An outlet 3710 of the water purification filter 3700 is connected via an outlet tube 3730 to a volume in an upper region inside the water purification filter. At a lower end of the filter cartridge 3000, a water outlet 3330 of the water collecting space, an inlet 3710 of water purification filter 3700 and an outlet 3720 of the water purification filter 3700 are provided.

FIGS. 14 to 21 and FIGS. 22 to 26 show two further embodiments of fluid filter cartridges 4000, 5000 with first and second filter elements 4100, 4200, 5100, 5200 and an access cover 4510, 5510 covering the first filter element 4100, 5100. In the fourth and fifth embodiment, the fluid filter cartridge 4000, 5000 is depicted in an orientation opposite to the operational orientation of the fluid filter cartridge 4000, 5000.

The first and second filter elements 4100, 4200, 5100, 5200 have filter media packs with filter media 4111, 4211,

5111, 5211 surrounding an open filter interior 4110, 4210. Both filter elements 4100, 4200, 5100, 5200 are configured for outside-in fluid flow. The upstream side of the filter elements 4100, 4200, 5100, 5200 is on the outer peripheries of the filter media packs of filter media 4111, 4211, 5111, 5211.

The connecting end cap 4430, 5430 covering and connecting the end faces of the first and second filter elements 4100, 4200, 5100, 5200 facing each other have two ports 4931, 4932, 5931, 5932 facing towards a second end cap 4420, 5420. The two ports 4931, 4932, 5931, 5932 provided at the connection end cap 4430, 5430 can be provided on a portion of the connection end cap 4430, 5430 that covers an end face of the first filter element 4100, 5100 but not an end face of the second filter element 4200, 5200.

In the open filter interior 4110 an outflow path 4932$a$ is provided for fluid filtered by the first filter element 4100 in fluid communication with the outlet port 4932 of the first filter element 4100 provided on the connection end cap 4430.

In the open filter interior 4210 of the second filter cartridge 4200 a water collecting space 4300 and a water purification filter 4700 are provided. The water collecting space 4300 is separated from the fluid flow of the second filter element 4200 and preferably surrounded by a closed tube.

In FIGS. 27 to 29, an access cover 6510 for use in particular with the fluid filter cartridges 4000, 5000 is depicted.

In the following, the connection between the filter cartridge 4000, 5000 with an access cover 4510, 5510, 6510 will be described in more detail.

On the connecting end cap 4430, 5430, two radially outwardly projecting tabs 4432, 5432 are provided. The radially outwardly projecting tabs 4432, 5432 each have a first engagement element 4433, 5433 for engaging a second engagement element 4533, 5533, 6533 on an access cover 4510, 5510, 6510 for creating a snap-fit connection. Each of the outwardly projecting tabs 4432, 5432 further has a release portion 4434, 5434 which is manipulable by a user to retract the first engagement element 4433, 5433 inwardly to release the snap-fit connection between the fluid filter cartridge 4000, 5000 and the access cover 4510, 5510, 6510.

Each of the projecting tabs 4432, 5432 has a living hinge 4436, 5436 forming a pivoting point about which the part of the tab 4432, 5432 with the first engagement element 4433, 5433 and the release portion 5434, 4434 can pivot when the release portion 5434, 4434 is manipulated by a user.

As can be seen particularly in FIG. 25, the distance L2 between a free end of the release portion 5434 and the living hinge 5436 is preferably at least twice as large as the distance L1 between the first engagement element 5433 and the living hinge 5436. This creates a larger lever effect, which is important to make the servicing of the filter cartridge 5000 easier for an end user as the access to the tab 5432 provided at the connection end cap 5430 is limited by the presence of the first and second filter element 5100, 5200 on the two opposite sides of the connection end cap 5430.

The access cover 4510, 5510, 6510 has an inner periphery 5511, 4511, 6511 with a plurality of second engagement portions 4534, 5534, 6534 positioned intermittently along the inner periphery of the access cover 4510, 5510, 6510. In order to realize the snap-fit connection and in particular the engagement of the tabs 4432, 5432 with the access cover 4510, 5510, 6510, a width or extension of the tabs 4432, 5432, in particular of the first engagement elements 4433, 5433, is larger than a space between two neighboring second engagement portions 4534, 5534, 6534 of the access cover 4510, 5510, 6510.

A particularly preferred embodiment of an access cover would have less second engagement portions than shown for the access covers 4510, 5510, 6510. Particularly, a number of evenly spaced second engagement portions of 3, 4, or 5 is preferred, which preferably have an extension in a direction along the inner periphery of the access cover which is at least twice as large, preferably at least three time, four times or five times as large, as the respective extension of a space between two neighboring second engagement portions.

The shape of the tabs 4432, 5432 further provides for a third engagement guide 5437 for engagement with a guide structure 5537 on a filter cartridge receiving space 5520 as can be seen in particular in FIGS. 23, 24 and 26.

As can be further seen in particular in FIGS. 20, 21, and 25, a seat 4601, 5601 for a sealing member is provided on the connection end cap 4430, 5430 for creating a seal between the connection end cap 4430, 5430 and the housing, in particular the filter cartridge receiving space 4520, 5520, for separating the outer flow paths of the first and second filter elements 4100, 4200, 5100, 5200.

A sixth embodiment of a fluid filter arrangement 7 is shown in FIGS. 30-44. The fluid filter arrangement 7 includes a first filter element 7100 and a second filter element 7200 arranged consecutively with respect to a longitudinal extension of the fluid filter cartridge. The fluid filter cartridge is installed in a housing 7500 with a filter cartridge receiving space 7520 and an access cover 7510 removably connected to the filter cartridge receiving space 7520.

The fluid filter cartridge 7000 comprises first filter element 7100 for separating water from fluid and a second filter element 7200, which is a particle filter. Both filter elements 7100, 7200 are tubular filter elements with open filter interiors. Both filter elements 7100, 7200 comprise media packs with filter media 7111, 7211 surrounding the open filter interiors. A first end face of the filter media 7111 is covered by a first end cap 7410, which is a closed end cap. The other end face of the filter media 7111 of the first filter element 7100 is covered by a connection end cap 7430. The connection end cap 7430 also covers an end face of the filter media 7211 of the second filter element 7200. A second end face of the filter media 7211 of the second filter element 7200 is covered by a second end cap 7420, which is an open end cap. Seal member 7601 surrounds the outer periphery of the second filter element 7200 at/or adjacent the connection end cap 7430 and creates a seal between the fluid filter cartridge 7000 and the filter cartridge receiving space 7520 of the housing 7500 in order to separate the outer flow paths of the first and second filter elements 7100, 7200. Both filter elements 7100, 7200 are configured for outside-in fluid flow. The upstream side of the filter elements 7100, 7200 is on the outer peripheries of the filter media packs of the filter media 7111, 7211.

Fluid filtered by the first filter element 7100 will exit the first filter element 7100 through an outflow path 7932$a$ for a filtered fluid of the first filter element 7100, which is in fluid communication with an outlet port 7932 of the first filter element 7100 provided at the connection end cap 7430. When cartridge 7000 is operably installed in the housing 7500, the outlet port 7932 is in fluid communication with a transfer pump 7050 (FIG. 60) through port 7530. The port 7932 is provided at the connection end cap 7430 and can be provided on a portion of the connection end cap 7430 that covers an end face of the first filter element 7100 but not an end face of the second filter element 7200. The outlet port 7932 may be part of an axially extending tube 7604, described below.

Fluid filtered by the second filter element 7200 is collected in an outflow path 7931a for filtered fluid of the second filter element 7200 in fluid communication and downstream of the transfer pump 7050 (FIG. 60). The filtered fluid then exits the second filter element 7200 by flowing from the outflow path 7931a, through an opening 7941 in the second end cap 7420 and through the housing outflow port 7532, where it exits to the rail. The fluid, after flowing from the transfer pump 7050 (FIG. 60), is filtered by the media 7211 of the second filter element 7200. The filtered fluid enters the outflow path 7931a through a port 7934 in a closed internal tube 7936, which can be an integral part of the second filter element 7200. A standpipe 7938 is within the tube 7936, and a grommet 7940 forms a seal between the opening 7941 and the standpipe 7938. The standpipe 7938 may generally extend from a bottom wall 7939 of the internal of the housing 7500.

Within the open filter interior of the second filter element 7200, a water collecting space 7300 is provided, for collecting the water separated from the fluid by the first filter element 7100. The water collecting space 7300 is separated from the fluid flow of the second filter element 7200 and preferably surrounded by a closed tube 7302.

At a lower end of the filter cartridge receiving space 7520 of the housing 7500, a pressure-actuated one way drain valve 7902 is provided.

The first filter element 7100 has its primary media 7111 for filtration. Inside of the media 7111 is a hydrophilic screen 7112 for forming water droplets. There is an open volume 7113 downstream of the hydrophilic screen 7112, where the water collects and drains by gravity to the water collecting space 7300. Downstream of the open volume 7113 is a hydrophobic screen 7114 for water separation. A standpipe 7115 is within and surrounded by the hydrophobic screen 7114. The filtered fuel enters the standpipe 7115 through the open end 7116. The outflow path 7932a is within the standpipe 7115.

In reference to FIG. 60, preferably, the outlet of the water collecting space 7520c is provided with or connected to a pressure-actuated drain valve 7902 via a port 7901. The outlet of this pressure-actuated drain valve 7902 is connected with an inlet of the water purification filter 7906. The water purification filter 7906 preferably contains active carbon. A check valve 7904 may be provided to prevent the backflow of water from the water purification filter 7906.

In a further preferred embodiment in the water collecting space 7520c, preferably in a part of the water collecting space 7520c that is positioned within the open filter interior of the second filter element 7200, sufficient space is provided to receive a water-in-fuel sensor 7702.

The central axes of the first end cap 7410 and the connecting end cap 7430 and the longitudinal axis of the first filter element 7100 are aligned or identical. Further, the central axis of the second end cap 7420 and the central axis of the second filter element 7200 are aligned or identical.

However, the longitudinal axes of the first and second filter elements 7100, 7200 are offset or shifted in relation to each other. Also, the central axes of the first end cap 7410 and the connection end cap 7430 are shifted or offset in relation to the central axis of the second end cap 7420. In this way the port 7932 provided at the connection end cap 7430 can be provided on a portion of the connection end cap 7430 that covers an end face of the first filter element 7100 but not an end face of the second filter element 7200.

Other features of the cartridge 7000 can be appreciated by review of FIG. 36. The second filter element 7200 includes a seal member 7602 surrounding the outer periphery at or adjacent to the second end cap 7420. The seal member 7602 creates a seal between the fluid filter cartridge 7000 and the housing 7500. The connection end cap 7430 includes a flow tube 7604 with an open channel 7606. An axis 7608 extends longitudinally through the channel 7606 and is parallel to the longitudinal axes of the first and second filter elements 7100, 7200. The flow tube 7604 extends axially relative to a remaining portion of the connection end cap 7430 and terminates at a free end 7930. The flow tube 7604 extends in a direction away from the first filter element 7100 in a direction toward and at least partially overlapping or paralleling next to the second filter element 7200. The extension of the flow tube 7604 from the plane of the connection end cap 7430 to the free end 7930 relative to the second filter element 7200 is less than 50% of the length of the second filter element 7200 and at least greater than 10%, typically 15-30% of the overall length of the second filter element 7200.

The flow tube 7604 further includes a first o-ring seal member 7610. There is a second o-ring seal member 7612 on the flow tube 7604 that is axially spaced from the first seal member 7610. Between the first seal member 7610 and the second seal member 7612 is an opening defining the outlet port 7932. The first seal member 7610 is positioned closer to the first filter element 7100 than the seal member 7612 is spaced relative to the first filter element 7100. An end wall 7614 closes the flow tube 7604 between the first seal member 7610 and the second seal member 7612. The first seal member 7610 and second seal member 7612 and the end wall 7614 will seal off or block a port 7620 (FIG. 44) that leads to the filter tank 102 (FIG. 60). During servicing, the port, 7620 is opened. This is discussed further below.

Access cover 7510 for use with fluid filter cartridge 7000 is depicted in detail in FIGS. 38-42 and 45. The connection between the filter cartridge 7000 and access cover 7510 is described in further detail.

On the first end cap 7410, two radially outwardly projecting tabs 7432 are provided. The radially outward projecting tabs 7432 each has a first engagement element 7433 for engaging a second engagement element 7533 on access cover 7510 for creating a snap-fit connection. Each of the outwardly projecting tabs 7432 further has a release portion 7434 which is manipulable by a user to retract the first engagement element 7433 inwardly to release the snap-fit connection between the fluid filter cartridge 7000 and the access cover 7410.

Each of the projecting tabs 7432 has a living hinge 7436 forming a pivoting point about which the part of the tab 7432 with the first engagement element 7433 and the release portion 7434 can pivot when the release portion 7434 is manipulated by a user.

The access cover 7510 has an inner periphery 7511 with a radially inwardly extending ledge 7534 positioned along the inner periphery of the access cover 7510. The ledge 7534 forms the second engagement element 7533. The first engagement element 7433 slides relative to the ledge 7534, so that the access cover 7510 can rotate freely relative to the cartridge 7000.

The access cover 7510 may further include an engagement finger 7540 extending from an outer peripheral edge 7542 of the cover 7510. The finger 7540 has a tang 7544 which will positively engage a stop 7950 extending from the housing 7500.

The cover 7510 further includes a plurality of spaced vent holes 7552. When the cover 7510 is fully threaded and secured within the housing 7500, the vent holes 7552 are blocked or covered. When the cover 7510 is at least partially unthreaded from the remaining portion of the housing 7500, during servicing, the vent holes 7552 are uncovered and exposed to allow air to flow into the interior of the housing 7500.

The cover 7510 also includes an o-ring seal member 7556 around the outside radial periphery to form a seal with an inside surface of the housing 7500, when the cover 7510 is fully inserted and threaded within the housing 7500.

A seventh embodiment of a fluid filter arrangement includes a filter cartridge 8000, depicted in FIGS. 47-50. The filter cartridge 8000 is usable in the housing described with respect to the previous embodiment, housing 7500. The cartridge 8000 includes a first filter element 8100 and a second filter element 8200 arranged consecutively with respect to a longitudinal extension of the fluid filter cartridge 8000. The fluid filter cartridge 8000 can be installed in the housing 7500, as previously described, including the filter cartridge receiving space 7520 and access cover 7510 removably connected to the filter cartridge receiving space 7520.

The fluid filter cartridge 8000 comprises first filter element 8100 for separating water from fluid and second filter element 8200, which is a particle filter. Both filter elements 8100, 8200 are tubular filter elements with open filter interiors. Both filter elements 8100, 8200 comprise media packs with filter media 8111, 8211 surrounding the open filter interiors. A first end face of the filter media 8111 is covered by a first end cap 8410, which is a closed end cap. The other end face of the filter media 8100 of the first filter element 8100 is covered by a connection end cap 8430. The connection end cap 8430 also covers an end face of the filter media 8211 of the second filter element 8200. A second end face of the filter media 8211 of the second filter element 8200 is covered by a second end cap 8420, which is an open end cap. Seal member 8601 surrounds the outer periphery of the second filter element 8200 at or adjacent the connection end cap 8430 and creates a seal between the fluid filter cartridge 8000 and the filter cartridge receiving space, shown at 7520 of housing 7500 in the previous embodiment, in order to separate the outer flow paths of the first and second filter elements 8100, 8200. Both filter elements 8100, 8200 are configured for outside-in fluid flow. The upstream side of filter element 8100, 8200 is on the outer peripheries of the filter media packs of the filter media 8100, 8211.

Fluid filtered by the first filter element 8100 will exit the first filter element 8100 through an outflow path 8932a for a filtered fluid of the first filter element 8100, which is in fluid communication with an outlet port 8932 of the first filter element 8100 provided at the connection end cap 8430. When cartridge 8000 is operably installed in housing 7500, the outlet port 8932 is in fluid communication with a transfer pump 7050 (FIG. 60) through port 7530, which is shown in the embodiment of FIG. 32. The port 8932 is provided at the connection end cap 8430 and can be provided on a portion of the connection end cap 8430 that covers an end face of the first filter element 8100 but not an end face of the second filter element 8200. The outlet port 8932 may be part of an axially extending tube 8604, described below.

The fluid, after being filtered by first filter element 8100 and being directed by the transfer pump 7050 (FIG. 60), is then directed to the second filter element 8200, where it is directed through the media 8211. The fluid is filtered by media 8211 of the second filter element 8200 and enters a closed internal tube 8936 through a port 8934. Referring to the embodiment of FIG. 32, a standpipe 7938, which is part of the housing assembly, will be within the tube 8936, and a grommet 8940 will form a seal with the standpipe 7938. Within the standpipe 7938 there will be the outflow path 7931a for the filtered fluid of the second filter element 8200. This outflow path 7931a will be within the standpipe 7938 within the closed tube 8936.

As with previous embodiments, a water collecting space 8300 is provided for collecting the water separated from the fluid by the first filter element 8100. The water collecting space 8300 is separated from the fluid flow of the second filter element 8200 and surrounded by closed tube 8302. The embodiment of cartridge 8000, however, is different from previous embodiments in that the water collecting space 8300 is not within the open filter interior of the element 8200; rather, the water collecting space 8300 is outside of the filter interior of the second filter element 8200. Further details are described below.

The first filter element 8100 has its primary media 8111 for filtration. Inside of the media 8111 is a hydrophilic screen 8112 for forming water droplets. There is an open volume 8113 downstream of the hydrophilic screen 8112, where the water collects and drains by gravity to the water collecting space 8300. Downstream of the open volume 8113 is a hydrophobic screen 8114 for water separation. A standpipe 8115 is within and surrounded by the hydrophobic screen 8114. The filtered fuel enters the standpipe 8115 through the open end 8116. The outflow path 8932a is within the standpipe 8115.

The central axes of the first end cap 8410 and the connecting end cap 8430 and the longitudinal axis of the first filter element 8100 are aligned or identical. Further, the central axis of the second end cap 8420 and the central axis of the second filter element 8200 are aligned or identical.

However, the longitudinal axes of the first and second filter elements 8100, 8200 are offset or shifted in relation to each other. Also, the central axes of the first end cap 8410 and the connection end cap 8430 are shifted or offset in relation to the central axis of the second end cap 8420. In this way, the port 8932 provided at the connection end cap 8430 can be provided on a portion of the connection end cap 8430 that covers an end face of the first filter element 8100 but not an end face of the second filter element 8200.

Other features of the cartridge 8000 can be appreciated by review of FIGS. 47-50. The second filter element 8200 includes a seal member 8602 surrounding the outer periphery at or adjacent to the second end cap 8420. The seal member 8602 creates a seal between the fluid filter cartridge 8000 and the housing, shown in the previous embodiment at reference number 7500. The connection end cap 8430 includes a flow tube 8604 with an open channel 8606. An axis 8608 extends longitudinally through the channel 8606 and is parallel to the longitudinal axes of the first and second filter elements 8100, 8200. The flow tube 8604 extends axially relative to a remaining portion of the connection end cap 8430 and terminates at a free end 8930. The flow tube 8604 extends in a direction away from the first filter element 8100 in a direction toward and at least partially overlapping or paralleling next to the second filter element 8200. The extension of the flow tube 8604 from the plane of the connection end cap 8430 to the free end 8930 relative to the second filter element 8200 is less than 50% of the length of the second filter element 8200 and at least greater than 10%, typically 15-30% of the overall length of the second filter element 8200.

The flow tube 8604 further includes a first o-ring seal member 8610. There is a second o-ring seal member 8612 on the flow tube 8604 that is axially spaced from the first seal member 8610. Between the first seal member 8610 and the second seal member 8612 is an opening defining the outlet port 8932. The first seal member 8610 is positioned closer to the first filter element 8100 than the seal member 8612 is spaced relative to the first filter element 8100. An end wall 8614 closes the flow tube 8604 between the first seal member 8610 and the second seal member 8612. The first seal member 8610 and second seal member 8612 and the end wall 8614 will seal off or block a port 7620 (FIG. 44 of the previous embodiment) that leads to the filter tank 102 (FIG. 60). During servicing, the port 7620 is opened.

The first end cap 8410 includes two radially outwardly projecting tabs 8432. The projecting tabs 8432 each has a first engagement element 8433 for engaging engagement element 7533 on access cover 7510, described previously, for creating a snap-fit connection. Each of the outwardly projecting tabs 8432 further has a release portion 8434 which is manipulable by a user to retract the first engagement element 8433 inwardly to release the snap-fit connection between the fluid filter cartridge 8000 and the access cover 7410.

Each of the projecting tabs 8434 has a living hinge 8436 forming a pivoting point about which the part of the tab 8432 with the first engagement element 8433 and the release portion 8434 can pivot when the release portion 8434 is manipulated by a user.

As mentioned previously, in this embodiment, the water collecting space 8300 is outside of the second filter element 8200. This is further described with respect to FIGS. 50-59. First, the connection end cap 8430 is described in further detail with reference to FIGS. 53-56. The connection end cap 8430 includes a fuel filter tube 8800, which is in fluid communication with the standpipe 8115 of the first filter element 8100. The outflow path 8932a is within the fuel filter tube 8800. A channel extends between the fuel filter tube 8800 and the channel 8606 of the flow tube 8604. Therefore, the filtered fuel that flows from the first filter element 8100, flows through the path 8932a, into the channel 8802, and then into the channel 8606. Spaced from and adjacent to the fuel filter tube 8800 is a water port 8810. The water port 8810 allows the water that has collected within volume 8113 to flow through the port 8810, which is in communication with water flow channel 8812.

The water flow channel 8812 leads to a water tube 8814. The tube 8814 connects with the closed tube 8302 and is in fluid communication with the water collecting space 8300. Note that the tube 8814 can have the same longitudinal axis as the closed tube 8302.

FIGS. 57 and 58 show the closed fuel tube 8936 for the fuel extending axially from the second end cap 8420. Adjacent to the fuel tube 8936 is the closed water tube 8302. The water tube 8302 extends axially from the second end cap 8420.

The filter media 8211 of the second filter element 8200 is generally tubular in shape with an open filter interior 8850. The media 8211, shown as pleated media, will surround and enclose the fuel tube 8936, so that the fuel tube 8936 is within the open filter interior 8850. However, the water tube 8302 will not be within the open filter interior 8850, but will be outside of the open filter interior 8850. In the example shown in FIG. 59, the media 8211 will include a spaced gap 8860. The gap 8860 will be sized to allow the water tube 8302 to be fitted therewithin. In this example, the water tube 8302 will be between two opposing pleats 8862 and 8864.

FIGS. 61-65 illustrate a variation of the fluid filter arrangement 7 of FIGS. 30-46. The description of the arrangement of FIGS. 61-65 incorporates fully the description above of FIGS. 30-46 and is not again repeated herein. Like reference numerals will have like parts, and the following discussion will focus on the additional features of the arrangement of FIGS. 61-65 which are not part of the arrangement of FIGS. 30-46.

The filter cartridge of FIGS. 61 and 65 is illustrated herein at reference numeral 7000'. However, other reference numerals from the embodiment of FIGS. 30-46 are used to show the identical parts. The filter cartridge 7000' includes a first member 7702 of a projection/receiver rotational alignment arrangement 7704 (FIG. 65) on at least one of the first filter elements 7100 or second filter elements 7200. In the example shown in FIG. 61, the first member 7702 is part of the second filter element 7200.

The first member 7702 of the projection/receiver rotational alignment arrangement 7704 will engage a second member 7706 (FIG. 62) to assist in rotationally aligning the housing 7500 and the filter cartridge 7000, when the filter cartridge 7000 is being installed in the housing 7500. Many variations are possible.

The first member 7702 of the projection/receiver rotational alignment arrangement 7704 includes a receiver 7708 on the second filter element 7200. In the example shown in FIG. 61, the receiver 7708 is illustrated as an aperture or opening 7710 in the second end cap 7420 of the second filter element 7200.

Many variations of the receiver 7708 are possible. In the embodiment shown, the receiver 7708 comprises a segment-shaped opening 7712 of the second filter element 7200. The opening is a through opening providing access to the open filter interior of the second filter element 7200.

The second member 7706 of the projection/receiver rotational alignment arrangement 7704 comprises a projection member 7714 extending from the housing 7500. As can be seen in FIGS. 62-65, the projection member 7714 preferably extends from the bottom wall 7939 of the housing 7500.

The projection member 7714 will be porous to allow for the flow of water therethrough.

As can be seen in FIGS. 64 and 65, preferably the projection member 7714 is greater in height from the bottom wall 7939 than the standpipe 7938. In this way, when the filter cartridge 7000' is being mounted and oriented within the housing 7500, the projection/receiver rotational alignment arrangement 7704 can first be engaged in order to assist and ensure the proper alignment and engagement between the opening 7941 and the standpipe 7938 so that the grommet 7940 may form a seal between the standpipe 7938 and the opening 7941 of the second filter element 7200.

Preferably, the opening 7710 of the first member 7702 and the opening 7941 (which receives the standpipe 7938 forming part of the path for the filtered fuel) are shaped differently so that a user may not mistake the first member 7702 of the alignment arrangement 7706 for the opening 7941. As can be seen in FIG. 61, the segment shaped opening 7712 is different from the round opening 7941, and the projection member 7714 cannot be received by the opening 7941.

In this example, the projection member 7714 comprises a segment-shaped tube 7718. The segment-shaped tube 7718, as can be seen in FIG. 63 in top view, has a similar cross-sectional shape as the segment-shaped opening 7712 of the first member 7702. The segment-shaped tube 7718 is porous to allow the flow of water therethrough. As shown in FIGS. 62 and 63, the segment-shaped tube 7718 comprises four members spaced apart, each extending from the housing bottom 7939.

FIGS. 66-70 illustrate another variation on the filter cartridge of FIG. 34, illustrated herein at reference numeral 7000". It should be understood that the filter cartridge 7000" otherwise includes all of the features of the cartridge 7000 described above, and the description of these features will not again be repeated. Like reference numerals refer to like parts. In addition, filter cartridge 7000" can include the projection/receiver rotational arrangement 7704 as an optional feature, and is illustrated as such. It should be understood, however, that the arrangement 7704 is optional, and the filter cartridge 7000" could omit that arrangement and be otherwise identical to the cartridge 7000, with the exception of the following description.

The filter cartridge 7000" of FIGS. 66-70 has connection end cap 7430 connecting together first filter element 7100 and second filter element 7200. The connection end cap 7430 has a central axis 7750 (FIG. 69). The central axis 7750 extends orthogonal to a main extension plane of the connection end cap 7430 and through the geometric center. The axis 7750 is offset in relation to a central longitudinal axis 7752, 7754 of at least one or both of the first filter element 7100 and the second filter element 7200. The central longitudinal axis 7752 extends orthogonal to a main extension plane of the connection end cap 7430 and generally passes through the geometric center as measured from the outer diameter of the media 7111 for the first filter element 7100 and filter media 7211 of the second filter element 7200.

In the example shown in FIG. 69, the axis 7750 of the connection end cap 7430 is offset to both the axis 7752 of the first filter element 7100 and the axis 7754 of the second filter element 7200.

In this embodiment, the first filter element 7100 and the second filter element 7200 have their respective media 7111, 7211 formed generally in a cylindrical shape, such that the outer surface of the media 7111, 7211 forms a diameter. In this embodiment, the diameter of the first filter element 7100, as measured by the outer surface of the media 7111 is about equal to the diameter of the second filter element 7200 as measured by an outer surface of the media 7211.

The central longitudinal axis 7752 of the first filter element 7100 and the central longitudinal axis 7754 of the second filter element 7200 are aligned in this embodiment as can be seen in FIG. 69. These aligned axes 7752, 7754 are offset from the axis 7750 of the connection end cap 7430.

In this embodiment, the connection end cap 7430 is shown as generally circular in shape with a diameter. The diameter of the connection end cap 7430 is larger than the diameter of the first filter element 7100 and second filter element 7200, when the diameters of the elements 7100, 7200 are measured at the outer surface of the filter media 7111, 7211.

In the embodiment of FIGS. 66-70, the projecting tabs 7432 on the first end cap 7410 include at least one tab 7432' that is spaced apart by a distance D from the exterior outer surface of the filter media 7111 of the first filter element 7100. This allows the filter cartridge 7000" to operably fit within the housing 7500 and mateably engage the access cover 7510. As can be seen in FIG. 69, the tab 7432' is positioned spaced from the media 7111 such that a longitudinal extension 7756 projecting from the tab 7432 in a direction toward the second filter element 7200 will be radially beyond or outside of a radial most outward projection of the connection end cap 7430. The tube 7604 is positioned as part of the connection end cap 7430 and is radially spaced in the distance D between the tab 7432' and an outside diameter of the media 7111 of the first filter element 7100, while being axially spaced from the first end cap 7410 and tab 7432'.

The method for servicing a fluid filter arrangement as depicted in the figures preferably starts by removing an access cover 1510, 2510, 3510, 4510, 5510, 6510, 7510 together with a used filter cartridge 2000, 3000, 4000, 5000, 7000, 7000', 7000", 8000 from a filter cartridge receiving space 1520, 2520, 4520, 5520, 7520 of a housing. Subsequently, the used filter cartridge 2000, 3000, 4000, 5000, 7000, 7000', 7000", 8000 is removed from the access cover 1510, 2510, 3510, 4510, 5510, 6510, 7510 by releasing the snap-fit connection between the outwardly projecting tabs 4432, 5432, 7432, 8432 and the access cover 1510, 2510, 3510, 4510, 5510, 6510, 7510.

A new filter cartridge 2000, 3000, 4000, 5000, 7000, 7000', 7000", 8000 is then connected to the access cover 1510, 2510, 3510, 4510, 5510, 6510, 7510 by creating again a snap-fit connection between the outwardly projecting tabs 4432, 5432, 7432, 8432 of the filter cartridge 2000, 3000, 4000, 5000, 7000, 7000', 7000", 8000 and the access cover 1510, 2510, 3510, 4510, 5510, 6510, 7510. The filter cartridge 2000, 3000, 4000, 5000, 7000, 7000', 7000", 8000 is then inserted into the filter cartridge receiving space 1520, 2520, 4520, 5520, 7520 and finally the access cover 1510, 2510, 3510, 4510, 5510, 6510, 7510 is fastened on the filter cartridge receiving space 1520, 2520, 4520, 5520, 7520, preferably by screwing the access cover 1510, 2510, 3510, 4510, 5510, 6510, 7510 onto the filter cartridge receiving space 1520, 2520, 4520, 5520, 7520.

Since removing the access cover from the filter cartridge receiving space and the fastening of the access cover on the filter cartridge receiving space in preferred embodiments requires a rotational movement of the access cover, the snap-fit connection between the filter cartridge and the access cover in preferred embodiments is such that a translational or longitudinal movement relative of the filter cartridge to the access cover is prohibited, but a rotational movement of the access cover in relation to the filter cartridge is possible.

A method for servicing the fluid filter arrangement 7 is now discussed in further detail. This method is also applicable for the cartridges 7000', 7000", 8000, useable with the housing 7500. First, the access cover 7510 is at least partially removed from a remaining portion of the housing 7500. This is done by unscrewing the threaded engagement between the cover 710 and a remaining portion of the housing 7500. When this is done, the vent holes 7552 in the access cover 7510 are exposed. This allows air to flow into the interior volume of the housing 7500. This also breaks the seals between the cartridge 7000, 8000 and an interior wall of the housing 7500. Specifically, the seals at 7602, 8602, 7601, 8601, 7610, 8610, 7612, and 8612 are broken or unsealed. Also, the seal between the cover 7510 and the remaining portion of the housing 7500 at seal member 7556 is broken. This will also expose the port 7620 leading to the fuel tank 102 (FIG. 60).

In preferred implementations, the transfer pump 7050 (FIG. 60) is then reversed from its normal operation. The port to the pump is shown at 7530. In reversing operation of the pump, the pump now operates to push the fluid contents within the housing 7500, including both fuel and water, out of the housing 7500 and through port 7620 back to the fluid tank 102 (FIG. 60).

The filter cartridge 7000, 7000', 7000", 8000 still connected to the access cover 7510 may be lifted from the housing 7500 to be removed from the housing 7500. The old cartridge 7000, 7000', 7000", 8000 can then be disconnected from the access cover 7510 by pressing the release portions 7434, 8434 of the tabs 7432, 8432 inwardly to release the cartridge 7000, 7000', 7000", 8000 from the access cover 7510. A new cartridge 7000, 7000', 7000", 8000 can then be provided and connected to the access cover 7510. The access cover 7510 connected to the new cartridge 7000, 7000', 7000", 8000 is then placed into the housing 7500. If there is a projection/receiver rotational alignment arrangement 7704 present, the first member 7702 and second member 7706 are mateably engaged to each other. The stand pipe 7938 is placed through the grommet 7940, 8940 of the second element 7200, 8200. The flow tube 7604, 8604 is placed into the receiving area 7622 of the housing 7500. The access cover 7510 is then rotated to engage the threads of the housing 7500. The rotation allows the access cover 7510 to move relative to the cartridge 7000, 7000', 7000", 8000 and pushes the cartridge 7000, 7000', 7000", 8000 into place in the housing 7500 until the seal members 7602, 8602, 7601, 8601, 7610, 8610, 7612, 8612, 7556, and 8556 are engaged and forming seals. At this point, the tang 7544 of the finger 7540 engages the stop 7950 to indicate that the access cover 7510 is fully engaged and the element 7000, 7000', 7000", 8000 is properly situated within the housing 7500.

A method and system, including the hydraulics, for operating fluid filter arrangements described herein are described in commonly assigned U.S. provisional patent application 62/149,771, entitled "System and Methods for Servicing a Fluid Filtration System" filed on the same date as the present US provisional patent application, and incorporated herein by reference. An overview of the system is depicted in FIG. 60.

Referring to FIG. 60, a schematic is presented of a fuel delivery system 1 that includes the fluid filter arrangement 7. The fuel delivery system 1 can additionally include an internal combustion engine 100, a fuel reservoir tank 102, and a hydrocarbon injection system 104. As discussed previously, the fuel delivery system 1 may also include a reversible fuel transfer pump 7050 for pumping fuel from the reservoir tank 102, through the first and second filter elements 7100, 7200, and to the internal combustion engine 100. In the embodiment shown, the transfer pump 7050 is oriented such that the pump 7050 is downstream of the first filter element 7100 and upstream of the second filter element 7200 in a normal mode of operation. As shown, the transfer pump 7050 has a first port 7052 in fluid communication with the first filter element 7100 and a second port 7054 in fluid communication with the second filter element 7200.

In one aspect, the fluid filter arrangement 7 can be provided with a plurality of input and output ports to interconnect the fluid filter arrangement 7 with the other various components of the fuel delivery system, as explained below.

A first port 7522 may be provided in the housing 7500 of the fluid filter arrangement 7. The first port 7522 is in fluid communication with the filter cartridge receiving space 7520a, which is the upstream or unfiltered side of the filter media 7111 of the first filter element 7100. In the embodiment shown, a branch line 200 is connected to the first port 7522 to place the receiving space 7520a in fluid communication with a fuel reservoir tank 102. This configuration allows fuel drawn from the fuel reservoir tank 102 by the transfer pump 7050 to be directed to the first filter element 7100. In one aspect, a check valve 7706 can be provided between the first port 7522 and the receiving space 7520a to prevent fuel from flowing from the receiving space 7520a to the reservoir tank 102.

A second port 7524 may be provided in the housing 7500 of the fluid filter arrangement 7. Similar to the first port 7522, the second port 7524 is also shown as being in fluid communication with the receiving space 7520a. A branch line 202 may be provided and connected to the second port 7524 such that the receiving space 7520a is placed in fluid communication with a fuel recirculation port 204 and a high pressure return spring check valve assembly 108 associated with the internal combustion engine 100. This configuration allows unused fuel from the fuel rail of the internal combustion engine 100 to be returned to the fluid filter arrangement 7.

A third port 7532, discussed previously, may also be provided in the housing 7500 of the fluid filter arrangement 7. The third port 7532 is in fluid communication with the fuel outflow path 7931 of the fluid filter arrangement 7, and thus receives fuel that has been passed through both the first and second filter elements 7100, 7200. A branch line 206 may be provided and connected to the third port 7532 that places the outflow path 7931 in fluid communication with the fuel rail of the internal combustion engine 100. This configuration allows fully filtered fuel to be delivered to the fuel rail of the internal combustion engine 100. Accordingly, in a normal mode of operation, fuel is drawn from the reservoir tank 102 and through the first filter element 7100 via pathway 7933 and is then pumped through the second filter element 7200 via transfer pump 7050 and pathway 7931, where the filtered fuel can then be delivered to the internal combustion engine 100. Once delivered to the engine, the filtered fuel can be utilized or recirculated back to the fluid filter arrangement 7 via second port 7524.

A fourth port 7536 may also be provided in the housing 7500 of the fluid filter arrangement 7. The fourth port 7536 is in fluid communication with the pathway 7933 and the transfer pump first port 7052, which is on the upstream side of the transfer pump 7050, when in the normal mode of operation. The fourth port 7536 is also in fluid communication with the third port 7532 via branch line 208 which includes a spring check valve assembly 106. This configuration allows for some of the fuel leaving the third port 7532 to be recirculated back to the upstream side of the transfer pump 7050, when the fuel exceeds a predetermined pressure, as set by the spring check valve assembly 106. This operation protects the transfer pump 7050 and other system components from being exposed to unduly high pressures.

A fifth port 7538 may also be provided in the housing 7500 of the fluid filter arrangement 7. The fifth port 7538 is in fluid communication with the third port 7532 and is shown as being configured to receive a pressure sensor 7704. The pressure sensor 7704, at this location, can be used by a controller (not shown) to monitor the pressure of the filtered fuel being delivered to the internal combustion engine 100 via port 7532 in the normal mode of operation.

A sixth port 7528 may also be provided in the housing 7500 of the fluid filter arrangement 7. The sixth port 7528 is in fluid communication with the second port 7054 of the transfer pump 7050 at a location between the first and second filter elements 7100, 7200. As such, the sixth port 7528 receives fuel that has been filtered by the first filter element 7100, but not by the second filter element 7200 in the normal mode of operation. The sixth port 7528 can be placed in fluid communication with a hydrocarbon injection system 104 that is used to inject fuel into exhaust from the internal combustion engine for the purpose of reducing emissions.

A seventh port 7526 may also be provided in the housing 7500 of the fluid filter arrangement 7. As shown, the seventh port 7526 is in direct fluid communication with the previously discussed port 7620 and is also in fluid communication with the reservoir tank 102 via branch line 210. As such, when the rotation of the transfer pump 7050 reverses in the drain mode (with the filter cartridge 7000 being partially lifted from the housing 7500), fuel can be pumped from the interior portion 7520 (combined portions 7520*a*, 7520*b*, 7520*c* once seals 7601 and 7602 are broken), through ports 7530 and 7620 and back to the tank 102 via the seventh port 7526. The seventh port 7526 is also shown as being in fluid communication with a Venturi restriction 7710 and a spring check valve 7708 that allow for limited flow between the tank 102 and the second side 7054 of the transfer pump 7050.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

The invention claimed is:

1. A fluid filter cartridge comprising:
a first filter element and a second filter element;
the first and the second filter element being arranged consecutively with respect to a longitudinal extension of the fluid filter cartridge;
the first filter element having two opposite end faces, one of the end faces being covered by a connection end cap and the other end face being covered by a first end cap; and
the second filter element having two opposite end faces, one of the end faces being covered by the connection end cap and the other end face being covered by a second end cap;
at least one port being provided at the connection end cap in fluid communication with at least one of the first filter element and second filter element; and
a central axis of the connection end cap orthogonal to a main extension plane of the connection end cap is offset in relation to a central axis of the first end cap orthogonal to a main extension plane of the first end cap and/or a central axis of the second end cap orthogonal to a main extension plane of the second end cap.

2. The fluid filter cartridge according to claim 1, wherein the first filter element is an element for separating water from fluid; the second filter element is a tubular filter element with an open filter interior; and wherein a water collecting space for collecting water separated from the fluid by the first filter element is provided that is positioned at least partly within the open filter interior of the second filter element.

3. The fluid filter cartridge according to claim 1 wherein a diameter of the connection end cap is larger than a diameter of the first filter element and the second filter element.

4. The fluid filter cartridge according to claim 1 further including at least one outwardly projecting tab provided at the first end cap, the at least one tab having a first engagement element for engaging a second engagement element on an access cover of a housing for the fluid filter cartridge in a snap-fit connection.

5. The fluid filter cartridge according to claim 1 further including two spaced seal members on the at least one port.

6. The fluid filter cartridge according to claim 1, characterized by the first filter element and/or the second filter element being configured for outside-in fluid flow.

7. The fluid filter cartridge according to claim 1, wherein a sealing member is positioned on the outer periphery of the filter cartridge separating an outer flow path of the first filter element from an outer flow path of the second filter element.

8. The fluid filter cartridge according to claim 1, wherein the first filter element and the second filter element have different longitudinal extensions, wherein the longitudinal extension of the second filter element is larger than the longitudinal extension of the first filter element.

9. The fluid filter cartridge according to claim 1, wherein the water collecting space is positioned fully within the open filter interior of the second filter element.

10. The fluid filter cartridge according to claim 1, further including a water purification filter with a hydrocarbon remover positioned at least partly within the open filter interior of the second filter element.

11. The fluid filter cartridge according to claim 1, wherein a diameter of the first filter element and a diameter of the second filter element are different.

12. The fluid filter cartridge according to claim 1, wherein the at least one port faces in a direction towards the first or the second end cap.

13. The fluid filter cartridge according to claim 1, wherein the at least one port is provided on a portion of the connection end cap that is covering an end face of the first filter element but not covering an end face of the second filter element.

14. The fluid filter cartridge according to claim 1, further including a first member of a projection/receiver rotational alignment arrangement on at least one of the first filter element or second filter element.

15. The fluid filter cartridge according to claim 14, wherein the first member of a projection/receiver rotational alignment arrangement includes a receiver on the second filter element.

* * * * *